(12) United States Patent
Takashina et al.

(10) Patent No.: US 8,230,761 B2
(45) Date of Patent: Jul. 31, 2012

(54) ENGINE AND POWER TRANSMISSION DEVICE

(75) Inventors: Yukimasa Takashina, Osaka (JP); Yoshifumi Konishi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 935 days.

(21) Appl. No.: 12/203,689

(22) Filed: Sep. 3, 2008

(65) Prior Publication Data

US 2009/0301429 A1    Dec. 10, 2009

(30) Foreign Application Priority Data

| Jun. 10, 2008 | (JP) | 2008-152337 |
| Jun. 10, 2008 | (JP) | 2008-152338 |
| Jul. 7, 2008 | (JP) | 2008-177290 |
| Jul. 10, 2008 | (JP) | 2008-180408 |
| Aug. 6, 2008 | (JP) | 2008-203315 |

(51) Int. Cl.
*F16H 37/06* (2006.01)
*B60K 17/06* (2006.01)

(52) U.S. Cl. .......... 74/664; 180/364

(58) Field of Classification Search .......... 74/664, 74/665 GB; 475/200; 180/364–369
See application file for complete search history.

(56) References Cited

U.S. PATENT DOCUMENTS

| 4,344,760 A * | 8/1982 | Kulikowski | 440/3 |
| 6,848,530 B2 * | 2/2005 | Tani | 180/292 |
| 6,910,982 B2 * | 6/2005 | Okada et al. | 475/83 |
| 6,990,757 B2 * | 1/2006 | Takemura et al. | 37/347 |
| 7,147,076 B2 * | 12/2006 | Izumi | 180/250 |
| 2005/0233857 A1 * | 10/2005 | Horiuchi et al. | 477/120 |

FOREIGN PATENT DOCUMENTS

| JP | S60-1028 A | 1/1985 |
| JP | S62-31520 A | 2/1987 |
| JP | H05-71451 A | 3/1993 |
| JP | H07-18955 U | 4/1995 |
| JP | 2003-154857 A | 5/2003 |
| JP | 2005-48632 A | 2/2005 |

OTHER PUBLICATIONS

English Language Summary of Notice of Reasons for Refusal in JP Appl. No. 2008-152337, dated Feb. 28, 2012.
English Language Summary of Summary of Notice of Reasons for Refusal in JP Appl. No. 2008-152338, dated Feb. 28, 2012.

* cited by examiner

*Primary Examiner* — Tisha Lewis
(74) *Attorney, Agent, or Firm* — Sterne, Kessler, Goldstein & Fox PLLC

(57) ABSTRACT

An engine includes a crankshaft which is disposed in a substantially horizontal direction, a first power transmission device, an input shaft, a first output shaft, a second power transmission device, and a power transmission case. The input shaft is disposed below the crankshaft in parallel with the crankshaft, and the input shaft receives a power from the crankshaft through the first power transmission device. The first output shaft supplies the power from the input shaft, and the first output shaft is disposed perpendicular to the crankshaft. The second power transmission device transmits the power of the input shaft to the first output shaft. The power transmission case accommodates the input shaft, the first output shaft, and the second power transmission device therein.

30 Claims, 48 Drawing Sheets

ENGINE AND POWER TRANSMISSION DEVICE

BACKGROUND OF THE INVENTION

1. Field of the Invention

The present invention relates to a technology of an engine (internal combustion engine) including a crankshaft in a substantially horizontal direction, more particularly to a technology to transmit a power of the crankshaft to a shaft which is provided in a direction perpendicular to the crankshaft.

2. Related Art

Conventionally, for example, Japanese Utility Model Publication Laid-Open No. 60-10427 discloses a technology of the engine which transmits the power of the crankshaft to the shaft provided in the direction perpendicular to the crankshaft.

A vehicle provided with the conventional engine will be described with reference to FIG. 48. Referring to FIG. 48, a work vehicle 901 is an Ackerman steering lawnmower, and the work vehicle 901 includes an engine 905 and a mower 907. The engine 905 includes a crankshaft 924 in a lengthwise horizontal direction, and the mower 907 includes an input shaft 906 which is disposed in a direction perpendicular to the crankshaft 924. A crank pulley 924a is fixed to the crankshaft 924 of the engine 905, and an input pulley 906a is fixed to the input shaft 906 of the mower 907. A counter shaft 980 is disposed in the crosswise horizontal direction below the engine 905, and a pair of right and left counter pulleys 980a is fixed to the counter shaft 980. A belt 981 is entrained about the crank pulley 924a, the pair of right and left counter pulleys 980a, and the input pulley 906a, and the power of the crankshaft 924 of the engine 905 is transmitted to the crank pulley 924a, the belt 981, the counter pulley 980a, the belt 981, the input pulley 906a, and the input shaft 906 to drive a rotary blade 907a of the mower 907.

However, in the conventional engine 905, it is necessary to ensure a space where the counter shaft 980 and the pair of right and left counter pulleys 980a are provided and a space where the belt 981 is entrained about the crank pulley 924a and the input pulley 906a with the counter pulleys 980a interposed between the crank pulley 924a and the input pulley 906a, which results in a problem in that the space limitations obstruct miniaturization of the vehicle. Additionally, there arises a problem of deteriorated working efficiency because of the need to entrain the belt 981 about the pulleys 924a, 980a, and 906a after the engine 905 is attached to the vehicle.

SUMMARY OF THE INVENTION

In accordance with a first aspect of the present invention, an engine includes a crankshaft which is disposed in a substantially horizontal direction; first power transmission means; an input shaft which is disposed below the crankshaft in parallel with the crankshaft, the input shaft receiving a power from the crankshaft through the first power transmission means; a first output shaft which is disposed perpendicular to the crankshaft to supply the power from the input shaft; second power transmission means for transmitting the power of the input shaft to the first output shaft; and a power transmission case which accommodates the input shaft, the first output shaft, and the second power transmission means therein. Therefore, the power transmission case is compactly formed to realize a compact engine, so that the miniaturization of the vehicle can easily be achieved. Additionally, the efficiency of attaching work is improved, because the power transmission case can previously be attached to the engine to form a modular structure.

In the engine according to the first aspect, preferably the first output shaft is disposed within a range onto which the engine is projected in a planar view. Therefore, the first output shaft is compactly disposed to realize the compact engine, so that the miniaturization of the vehicle can easily be achieved.

Preferably the engine according to the first aspect includes an oil pan which is located in a lower portion of the engine, wherein the power transmission case is attached to the oil pan. Therefore, the efficiency of attaching work is improved, because the power transmission case can easily be attached to the engine by utilizing the oil pan. The power transmission case becomes the same vibrating system as the engine, which allows a vibration-proofing countermeasure to be simplified to easily achieve cost reduction.

In the engine according to the first aspect, preferably a notch is formed in a lower portion of the oil pan, and the power transmission case is disposed in the notch. Therefore, the power transmission case is compactly disposed to realize the compact engine, so that the miniaturization of the vehicle can easily be achieved.

Preferably the engine according to the first aspect includes an oil pan which is located in a lower portion of the engine, wherein the power transmission case is attached to a cylinder block of the engine while fastened along with the oil pan. Therefore, the efficiency of attaching work is improved, because the power transmission case and the oil pan can simultaneously be attached to the cylinder block. Assurance of the attachment is improved because the power transmission case is attached to the cylinder block having high rigidity. The power transmission case becomes the same vibrating system as the engine, which allows the vibration-proofing countermeasure to be simplified to easily achieve the cost reduction.

Preferably the engine according to the first aspect includes an oil pan which is located in a lower portion of the engine, wherein the oil pan and the power transmission case are integrally molded. The power transmission case and the oil pan can integrally be formed to neglect the attaching work of the power transmission case. Therefore, the number of components is decreased while the efficiency of the attaching work is improved, so that the cost reduction can easily be achieved. The power transmission case becomes the same vibrating system as the engine, which allows the vibration-proofing countermeasure to be simplified to easily achieve the cost reduction.

In the engine according to the first aspect, preferably a first output member is provided on the first output shaft, a second output shaft is coaxially connected to the first output shaft, the second output shaft receiving the power of the first output shaft, and a second output member is provided on the second output shaft. Therefore, because the first and second output members are individually connected to the drive objects, the powers of the first and second output shafts can be supplied to the plural drive objects to improve usability of the engine.

In the engine according to the first aspect, more preferably a clutch is interposed in at least one of a gap between the first output member and the first output shaft and a gap between the second output member and the second output shaft. Therefore, the usability of the engine is improved, because the engine whose power can be supplied to the plural drive objects can switch between the transmission and cutoff of the power to at least one of the drive objects.

In the engine according to first aspect, more preferably the clutch can be attached to the power transmission case. The efficiency of the attaching work is improved, because the clutch can previously be attached to the engine to form the modular structure. The clutch can be attached to the engine with a simple configuration by utilizing the power transmission case. The power transmission case becomes the same vibrating system as the engine, which allows the vibration-proofing countermeasure to be simplified to easily achieve the cost reduction.

In the engine according to first aspect, preferably the first power transmission means is formed by an endless belt mechanism. Therefore, because the power of the crankshaft is transmitted to the input shaft by the simple power transmission means which is of the endless belt mechanism, the cost reduction can easily be achieved and the efficiency of the attaching work of the power transmission means can be improved.

More preferably the engine according to the first aspect includes a tension member which imparts a tension to an endless belt of the endless belt mechanism. Therefore, the tension is imparted to the endless belt to neglect a labor hour for adjusting the tension of the endless belt, so that the usability of the engine can be improved.

In the engine according to first aspect, preferably a power taking-out PTO shaft is provided coaxially to at least one of the crankshaft and the input shaft. Therefore, the power of the work device can be taken out, so that the usability of the engine can be improved.

In the engine according to first aspect, preferably the input shaft includes a cooling fan. Therefore, the cooled wind can be sent to efficiently cool the engine.

In accordance with a second aspect of the present invention, an engine includes a crankshaft which is disposed in a substantially horizontal direction; a cooling fan which is disposed above the crankshaft to cool the engine, the cooling fan being located on one of sides of the engine; a first endless belt mechanism which is disposed on one of sides of the engine to transmit a power of the crankshaft to the cooling fan; an input shaft which is disposed below the crankshaft in parallel with the crankshaft; a first output shaft which is disposed perpendicular to the crankshaft to supply the power from the input shaft; and a second endless belt mechanism which is disposed on one of sides of the engine to transmit the power of the crankshaft to the input shaft, the second endless belt mechanism being located outside of the first endless belt mechanism. Therefore, the vehicle is easily miniaturized because the endless belt of the endless belt mechanism is shortened to achieve the compact engine, and the efficiency of the attaching work is improved because the endless belt can easily be entrained. The endless belt mechanism is located outside the accessory drive endless belt mechanism, so that the endless belt can easily be removed to improve the usability of the engine.

In accordance with a third aspect of the present invention, an engine includes a crankshaft which is disposed in a substantially horizontal direction; a cooling fan which is disposed above the crankshaft to cool the engine, the cooling fan being located on one of sides of the engine; a first endless belt mechanism which is disposed on one of sides of the engine to transmit a power of the crankshaft to the cooling fan; an input shaft which is disposed below the crankshaft in parallel with the crankshaft; a first output shaft which is disposed perpendicular to the crankshaft to supply the power from the input shaft; and a second endless belt mechanism which is disposed on one of sides of the engine to transmit the power of the crankshaft to the input shaft, the second endless belt mechanism being located inside of the first endless belt mechanism. Therefore, the vehicle is easily miniaturized because the endless belt of the endless belt mechanism is shortened to achieve the compact engine, and the efficiency of the attaching work is improved because the endless belt can easily be entrained. Because the endless belt mechanism is located inside the accessory drive endless belt mechanism which drives the cooling fan, the cooling fan does not interfere with the endless belt mechanism. Therefore, the vehicle can easily be miniaturized because the position of the cooling fan is lowered to achieve the compact engine.

In accordance with a fourth aspect of the present invention, an engine includes a crankshaft which is disposed in a substantially horizontal direction; a flywheel which is disposed on one of sides of the engine; an input shaft which is disposed below the crankshaft in parallel with the crankshaft; a first output shaft which is disposed perpendicular to the crankshaft to supply a power from the input shaft; and an endless belt mechanism which is disposed on one of sides of the engine to transmit the power of the crankshaft to the input shaft, the endless belt mechanism being located outside of the flywheel. Therefore, the vehicle is easily miniaturized because the: endless belt of the endless belt mechanism is shortened to achieve the compact engine, and the efficiency of the attaching work is improved because the endless belt can easily be entrained. The endless belt mechanism is located outside the flywheel, so that the endless belt can easily be removed to improve the usability of the engine.

In accordance with a fifth aspect of the present invention, an engine includes a crankshaft which is disposed in a substantially horizontal direction; a flywheel which is disposed on one of sides of the engine; an input shaft which is disposed below the crankshaft in parallel with the crankshaft; a first output shaft which is disposed perpendicular to the crankshaft to supply a power from the input shaft; and an endless belt mechanism which is disposed on one of sides of the engine to transmit the power of the crankshaft to the input shaft, the endless belt mechanism being located inside of the flywheel. Therefore, the vehicle is easily miniaturized because the endless belt of the endless belt mechanism is shortened to achieve the compact engine, and the efficiency of the attaching work is improved because the endless belt can easily be entrained. Because the endless belt mechanism is located inside the flywheel, the input shaft does not interfere with the flywheel. Therefore, the vehicle can easily be miniaturized because a wheel base between the crankshaft and the input shaft is shortened irrespective of an outer diameter of the flywheel to achieve the compact engine.

In the engine according to the fifth aspect, preferably the first output shaft is disposed within a range onto which the engine is projected in a planar view. Therefore, the first output shaft is compactly disposed to realize a compact engine, so that the miniaturization of the vehicle can easily be achieved.

In the engine according to the fifth aspect, preferably a first output member is provided on the first output shaft, a second output shaft is coaxially connected to the first output shaft, the second output shaft receiving the power of the first output shaft, and a second output member is provided on the second output shaft. Therefore, because the first and second output members are individually connected to the drive objects, the powers of the first and second output shafts can be supplied to the plural drive objects to improve usability of the engine.

In the engine according to the fifth aspect, more preferably a clutch is interposed in at least one of a gap between the first output member and the first output shaft and a gap between the second output member and the second output shaft. Therefore, the usability of the engine is improved, because the engine whose power can be supplied to the plural drive objects can switch between the transmission and cutoff of the power to at least one of the drive objects.

Preferably the engine according to the fifth aspect includes a tension member which imparts a tension to an endless belt of the endless belt mechanism. Therefore, the tension is imparted to the endless belt to neglect a labor hour for adjusting the tension of the endless belt, so that the usability of the engine can be improved.

In the engine according to the fifth aspect, preferably the input shaft includes the cooling fan. Therefore, the cooled wind can be sent to efficiently cool the engine.

In accordance with a sixth aspect of the present invention, an engine includes a crankshaft which is disposed in a substantially horizontal direction; first power transmission means; an input shaft which is disposed below the crankshaft in parallel with the crankshaft, the input shaft receiving a power from the crankshaft through the first power transmission means; an output shaft which is disposed perpendicular to the crankshaft to supply the power from the input shaft; second power transmission means for transmitting the power of the input shaft to the output shaft; a power transmission case which accommodates the input shaft, the output shaft, and the second power transmission means therein; and a bracket, wherein the power transmission case is attached to a cylinder block of the engine with the bracket interposed therebetween. Therefore, the power transmission case is compactly formed to realize a compact engine, so that the miniaturization of the vehicle can easily be achieved. The efficiency of the attaching work is improved, because the power transmission case can previously be attached to the engine to form the modular structure. The power transmission case can be attached to the engine with a simple configuration by utilizing the cylinder block. The assurance of the attachment is improved because the power transmission case is attached to the cylinder block having high rigidity. The power transmission case becomes the same vibrating system as the engine, which allows the vibration-proofing countermeasure to be simplified to easily achieve the cost reduction.

In the engine according to the sixth aspect, preferably the power transmission case and the bracket are integrally molded. Therefore, the efficiency of the attaching work is improved because the power transmission case and the bracket can be attached to the cylinder block at one-time attaching work. The integrally molding decreases the number of components, so that the cost reduction can easily be achieved.

Preferably the engine according to the sixth aspect includes a clutch which connects and disconnects the power from the output shaft, wherein the clutch can be attached to the bracket. Therefore, the transmission and cutoff of the power from the output shaft to the drive object can be switched, so that the usability of the engine can be improved. The efficiency of the attaching work is improved, because the clutch can previously be attached to the engine to form the modular structure. The clutch can be attached to the engine with a simple configuration by utilizing the bracket. The clutch becomes the same vibrating system as the engine, which allows the vibration-proofing countermeasure to be simplified to easily achieve the cost reduction.

In accordance with a seventh aspect of the present invention, an engine includes a crankshaft which is disposed in a substantially horizontal direction; a flywheel which is disposed on one of sides of the engine; first power transmission means; an input shaft which is disposed below the crankshaft in parallel with the crankshaft, the input shaft receiving a power from the crankshaft through the first power transmission means; an output shaft which is disposed perpendicular to the crankshaft to supply the power from the input shaft; second power transmission means for transmitting the power of the input shaft to the output shaft; a power transmission case which accommodates the input shaft, the output shaft, and the second power transmission means therein; and a bracket, wherein the power transmission case is attached onto the flywheel side of the engine while the bracket is interposed between the power transmission case and the flywheel. Therefore, the power transmission case is compactly formed to realize a compact engine, so that the miniaturization of the vehicle can easily be achieved. The efficiency of the attaching work is improved, because the power transmission case can previously be attached to the engine to form the modular structure. In a case where the drive object is disposed on the flywheel of the engine, a transmission distance from the output shaft to the drive object is shortened, so that the power can efficiently be transmitted from the output shaft to the drive object. The power transmission case becomes the same vibrating system as the engine, which allows the vibration-proofing countermeasure to be simplified to easily achieve the cost reduction.

In the engine according to the seventh aspect, preferably a starter motor for starting the engine is attached to the bracket. Therefore, the bracket dedicated to the starter motor is not required, and the number of components is decreased, so that the cost reduction can easily be achieved.

Preferably the engine according to the seventh aspect includes a clutch which connects and disconnects the power from the output shaft, wherein the clutch can be attached to the power transmission case. Therefore, the usability of the engine is improved because the transmission and cutoff of the power from the output shaft to the drive object can be switched. The efficiency of the attaching work is improved, because the clutch can previously be attached to the engine to form the modular structure. The clutch can be attached to the engine with a simple configuration by utilizing the power transmission case. The clutch becomes the same vibrating system as the engine, which allows the vibration-proofing countermeasure to be simplified to easily achieve the cost reduction.

Preferably the engine according to the seventh aspect includes a clutch which connects and disconnects the power from the output shaft, wherein the clutch can be attached to the bracket. Therefore, the usability of the engine is improved because the transmission and cutoff of the power from the output shaft to the drive object can be switched. The efficiency of the attaching work is improved, because the clutch can previously be attached to the engine to form the modular structure. The clutch can be attached to the engine with a simple configuration by utilizing the bracket. The clutch becomes the same vibrating system as the engine, which allows the vibration-proofing countermeasure to be simplified to easily achieve cost reduction.

In the engine according to the seventh aspect, preferably the power transmission case is eccentrically disposed in the horizontal direction with respect to the crankshaft. Therefore, the power transmission case is disposed in the upper portion as much as possible while the flywheel is avoided, so that the compact engine can be formed to easily achieve the miniaturization of the vehicle.

In accordance with an eighth aspect of the present invention, a power transmission device includes a power transmission case attached to a work vehicle; a drive shaft which is disposed in parallel with a horizontal crankshaft of an engine mounted on the work vehicle, the drive shaft being accommodated in the power transmission case; a driven shaft which is disposed perpendicular to the crankshaft, the driven shaft being accommodated in the power transmission case; a gear train which is accommodated in the power transmission case to transmit a power of the drive shaft to the driven shaft; a first endless belt mechanism which is interposed between the crankshaft and the drive shaft to transmit the power of the crankshaft to the drive shaft; and a second endless belt mechanism which is interposed between the driven shaft and a vertical input shaft of a work device or an axle drive device to transmit the power of the driven shaft to the input shaft, the work device or the axle drive device being attached to the work vehicle. Therefore, the belt which is of the endless belt constituting the first endless belt mechanism and second endless belt mechanism is not twisted while assembled in the work vehicle, so that shortening of a serviceable lifetime can be prevented. The need to twist the belt does not arise in assembling the belt in the work vehicle, so that the improvement of the work efficiency can be achieved. Additionally, the power transmission case is not directly attached to the engine, so that the generation of trouble with the power transmission device caused by the vibration of the engine can be prevented.

In the power transmission device according to the eighth aspect, preferably the power transmission case is attached to a vehicle frame of the work vehicle. Therefore, the power transmission case can be attached to the work vehicle with a simple configuration by utilizing the vehicle frame. The power transmission device is attached to the vehicle frame having high rigidity, whereby the power transmission device can more strongly be attached to the work vehicle.

In the power transmission device according to the eighth aspect, preferably the power transmission case is attached to a vehicle frame of the work vehicle with a support member interposed therebetween. Therefore, even if the power transmission case cannot directly be attached to the vehicle frame, the power transmission case can be attached to the work vehicle with the support member interposed therebetween. Additionally, the power transmission device is indirectly attached to the vehicle frame having high rigidity, whereby the power transmission device can more strongly be attached to the work vehicle.

In the power transmission device according to the eighth aspect, preferably the power transmission case is attached to an axle support case of the work vehicle. Therefore, the power transmission case can be attached to the work vehicle with a simple configuration by utilizing the axle support case. Additionally, the power transmission device is attached to the axle support case having high rigidity, whereby the power transmission device can more strongly be attached to the work vehicle.

In the power transmission device according to the eighth aspect, preferably the second endless belt mechanism includes a clutch which connects and disconnects transmission of the power from the driven shaft to the input shaft. Therefore, the usability of the engine can be improved because the transmission and cutoff of the power to the work device and axle drive device which are of the drive object of the engine can be switched.

In the power transmission device according to the eighth aspect, preferably the clutch is attached to the power transmission case. The clutch becomes the same vibrating system as the engine, which allows the vibration-proofing countermeasure to be simplified to easily achieve the cost reduction.

Other and further objects, features, and advantages of the present invention will appear more fully from the following description.

DETAILED DESCRIPTION OF THE INVENTION

Figure 1:
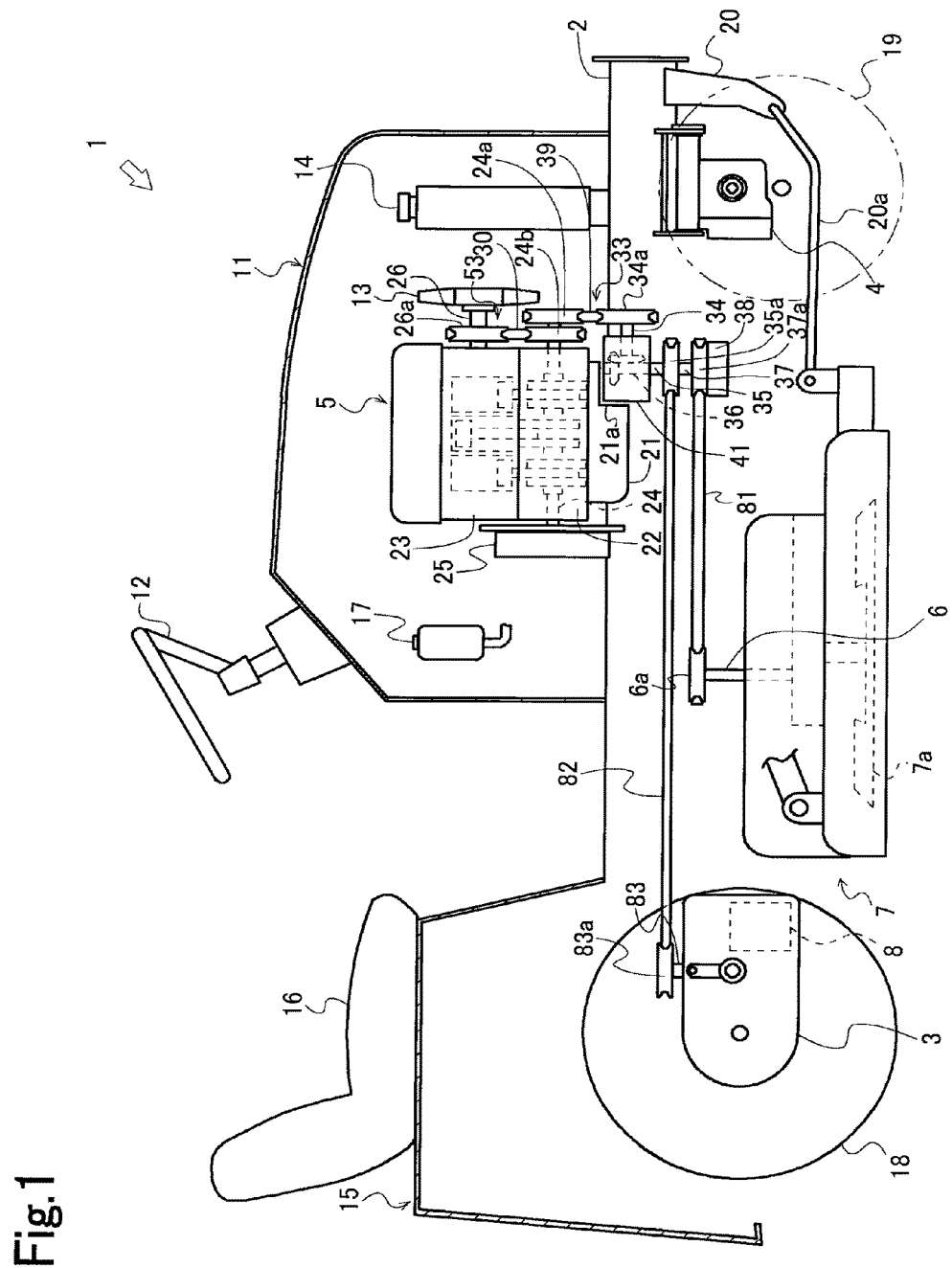
FIG. 1 is a side view showing a work vehicle provided with an engine according to a first embodiment of the present invention.

An entire configuration of a work vehicle 1 provided with an engine 5 according to a first embodiment of the present invention. Referring to FIG. 1, the work vehicle 1 is an Ackerman steering lawnmower, and the work vehicle 1 includes a vehicle frame 2, a rear axle drive device 3 which is supported in a rear portion of the vehicle frame 2, a front axle support device 4 which is supported in a front portion of the vehicle frame 2, the engine 5 which is supported by the vehicle frame 2 between the rear axle drive device 3 and the front axle support device 4, and a mower 7 which is suspended below the vehicle frame 2 while being able to be moved up and down.

A hydraulic motor 8 is accommodated in the rear axle drive device 3, and the hydraulic motor 8 is liquid-connected to a hydraulic pump (not shown) while being able to be driven by the hydraulic pump.

The engine 5 is accommodated in a hood 11, a steering wheel 12 is extended above and behind from a dashboard located immediately behind the hood 11, and a radiator 14 is mounted on the vehicle frame 2 located immediately before the engine 5. In the hood 11, a reservoir 17 is provided at the back of the engine 5 to replenish a work machine moving-up-and-down hydraulic cylinder with a working fluid.

A rear cover 15 is mounted in a rear portion of the vehicle frame 2, and a driver seat 16 is mounted on the rear cover 15. The rear axle drive device 3 is provided in the rear cover 15.

The mower 7 is provided below the vehicle frame 2 between a rear wheel 18 and a front wheel 19. The rear wheel 18 is driven by the rear axle drive device 3, and the front wheel 19 is driven by the front axle support device 4. Right and left mower hangers 20 are connected to front end portions of right and left side plates of the vehicle frame 2, respectively. The mower hangers 20 are connected to a front end of the mower 7 with link rods 20a interposed therebetween, whereby the mower 7 is suspended while being able to be moved up and down.

Figure 2:
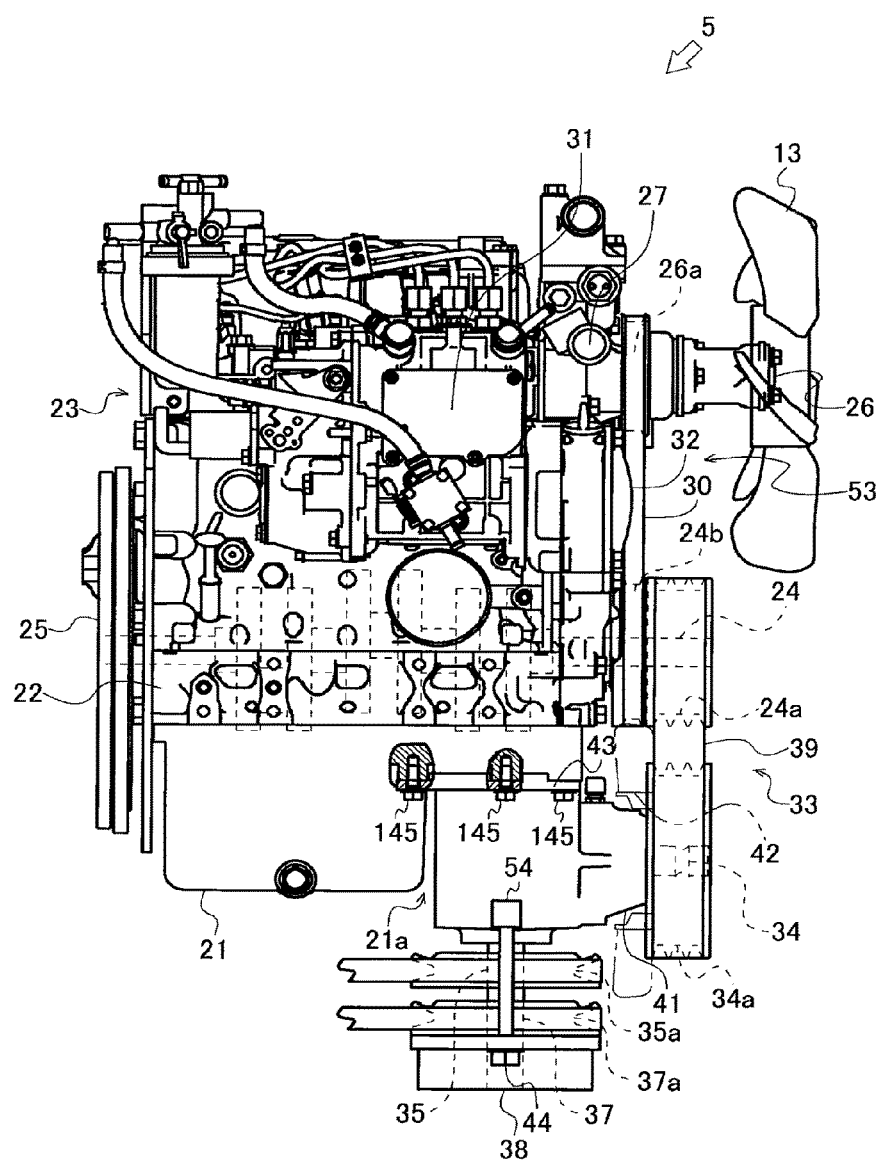
FIG. 2 is a partially sectional side view showing the engine of the first embodiment of the present invention.
Figure 3:
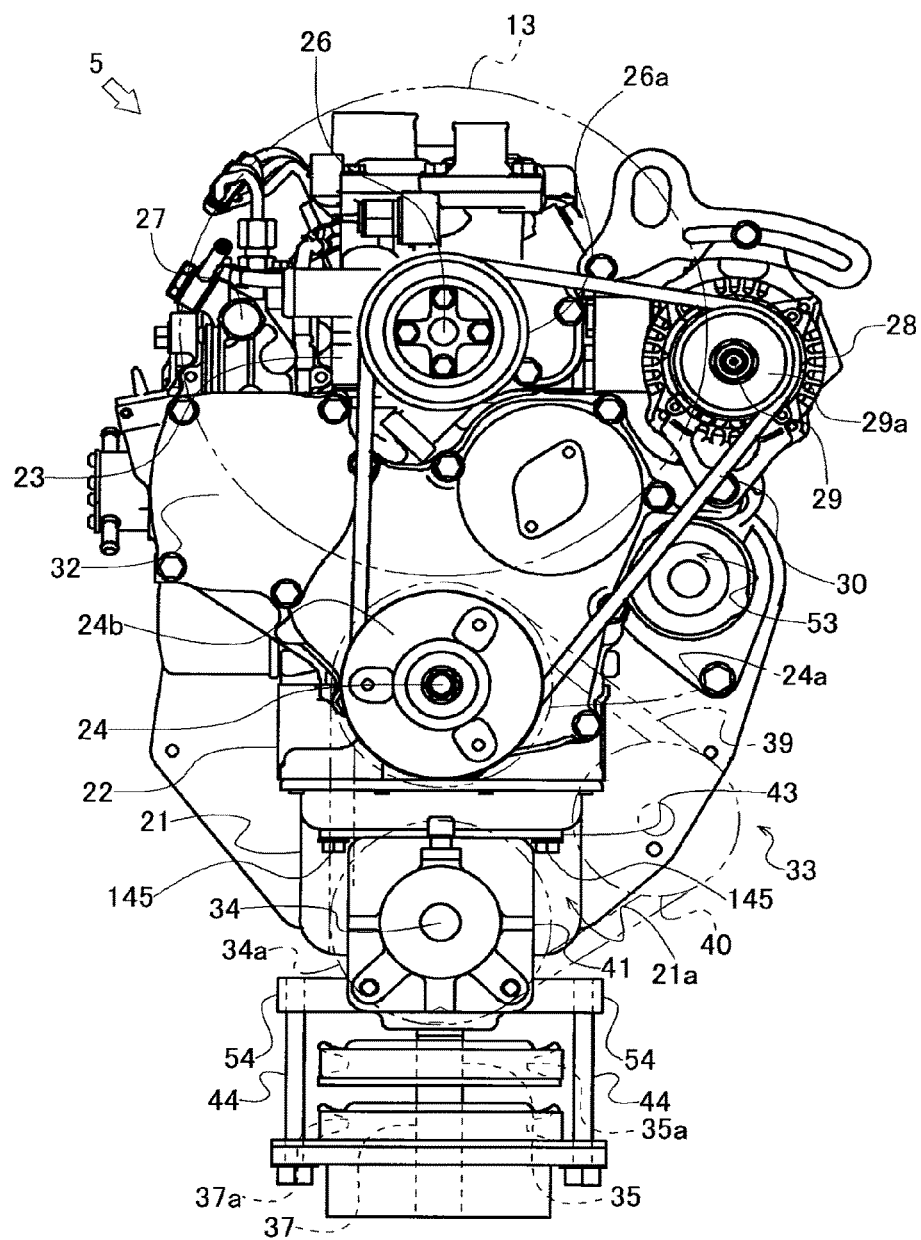
FIG. 3 is a front view showing the engine of FIG. 2.

The engine 5 of the first embodiment of present invention will be described with reference to FIGS. 1 to 9. Referring to FIGS. 2 and 3, the engine 5 includes an oil pan 21, a cylinder block 22, and a cylinder head 23. The oil pan 21 is located in the lower portion of the engine 5, the cylinder block 22 is located above the oil pan 21, and the cylinder head 23 is located above the cylinder block 22.

A crankshaft 24 is installed in the lengthwise horizontal direction in the cylinder block 22, and front and rear end portions of the crankshaft 24 are projected from front and rear faces of the cylinder block 22. A flywheel 25 is fixed to the rear end portion of the crankshaft 24, and a first crank pulley 24a and a second crank pulley 24b are sequentially fixed from the front to the front end portion of the crankshaft 24.

A cooling fan 13 is disposed above the crankshaft 24, a pulley 26a is fixed to a fan shaft 26 of the cooling fan 13, and a cooling water pump 27 is attached to the fan shaft 26. An alternator 28 is disposed on the right of the cooling fan 13, and a pulley 29a is fixed to an alternator shaft 29 of the alternator 28.

A belt 30 is entrained about the second crank pulley 24b of the crankshaft 24, the pulley 26a of the fan shaft 26, and the pulley 29a of the alternator shaft 29 to form an accessory drive belt mechanism 53. The power is transmitted from the crankshaft 24 through the belt 30 to drive the cooling fan 13, the cooling water pump 27, and the alternator 28.

A gear case 32 which accommodates a gear group (not shown) which is disposed on the front face side of the cylinder head 23. The gear case drives a fuel injection pump 31 and a cam shaft (not shown).

A notch 21a is formed below the front portion of the oil pan 21. The notch 21a is a space where a front corner portion located below the oil pan 21 is cut out into a substantially rectangular shape in a lateral view. A gearbox 41 which constitutes the power transmission case is disposed in the notch 21a.

The gearbox 41 is disposed in a substantially crosswise central portion of the notch 21a of the oil pan 21. That is, the gearbox 41 is disposed in the substantially crosswise central portion of the engine 5. The gearbox 41 accommodates an input shaft 34, a first output shaft 35, and bevel gears 36 (see FIG. 5). The power from the crankshaft 24 is fed into the input shaft 34 through a belt mechanism 33. The first output shaft 35 supplies the power from the input shaft 34. The bevel gears 36 transmit the power of the input shaft 34 to the first output shaft 35.

The input shaft 34 is disposed below the crankshaft 24 in parallel (lengthwise horizontal direction) with the crankshaft 24. The input shaft 34 is accommodated in the gearbox 41 so as to be projected from the front portion of the gearbox 41, and the input shaft 34 is rotatably supported by the gearbox 41 with a bearing interposed therebetween (see FIG. 5).

An input pulley 34a is fixed to the front end portion of the input shaft 34. A cooling fan 42 (see FIG. 5) is attached onto the rear side of the input pulley 34a, and the cooling fan 42 can send cooling wind rearward to efficiently cool the oil pan 21.

Figure 4:
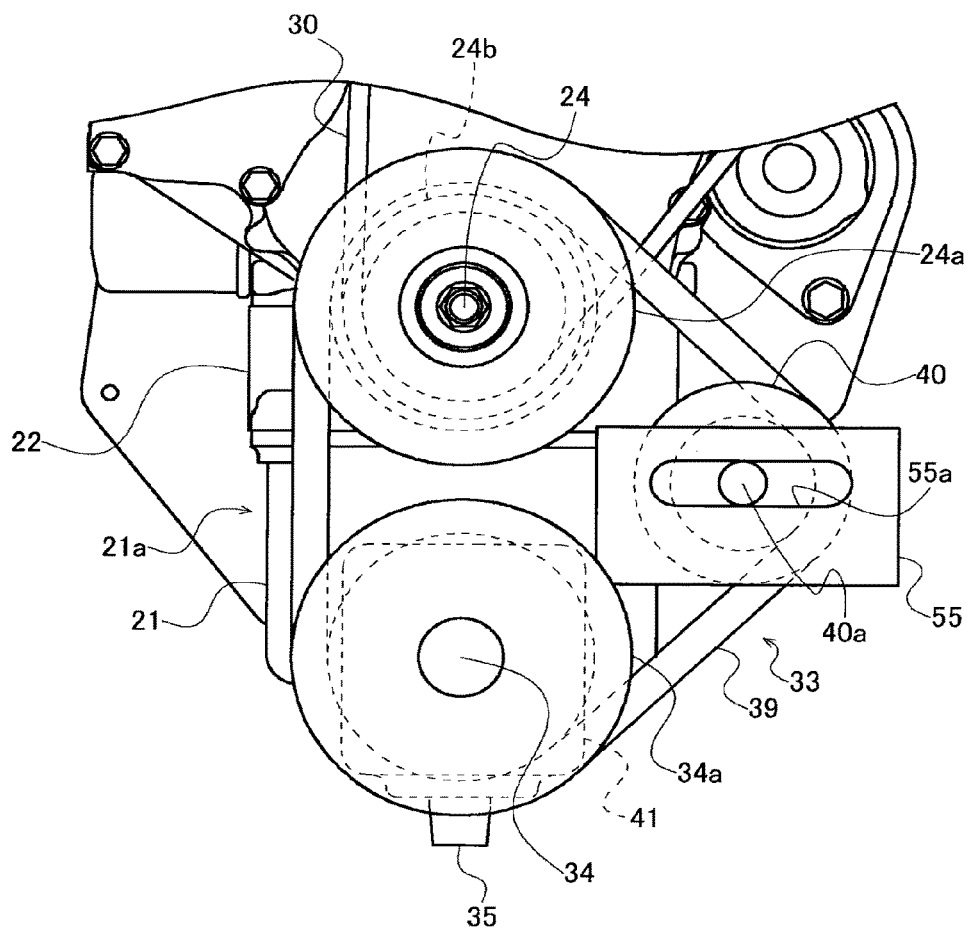
FIG. 4 is a front view showing a belt mechanism.

Referring to FIG. 4, a belt 39 is entrained about the input pulley 34a of the input shaft 34 and the first crank pulley 24a of the crankshaft 24 to form the belt mechanism 33. A tension pulley 40 abuts on an inner peripheral side of the belt 39, and the tension pulley 40 constitutes a tension member which imparts the tension to the belt 39. The tension pulley 40 is biased rightward by an elastic member (not shown) such as a spring, thereby imparting the tension to the belt 39. The tension pulley 40 is attached to the cylinder block 22 or the like with a bracket 55 interposed therebetween. A long hole 55a is opened in a crosswise direction of the bracket 55, and a pulley shaft 40a of the tension pulley 40 is slidably disposed in the long hole 55a.

Referring to FIGS. 2 and 3, the first output shaft 35 is disposed perpendicular (vertical direction) to the crankshaft 24. That is, the first output shaft 35 is also disposed perpendicular to the input shaft 34. The first output shaft 35 is disposed within a lengthwise direction of the engine 5 while disposed in the substantially crosswise central portion of the gearbox 41. That is, the first output shaft 35 is disposed within a range onto which the engine 5 is projected in a planar view. The first output shaft 35 is accommodated in the gearbox 41 so as to be projected from the bottom of the gearbox 41, and the first output shaft 35 is rotatably supported by the gearbox 41 with a bearing interposed therebetween (see FIG. 5).

Figure 5:
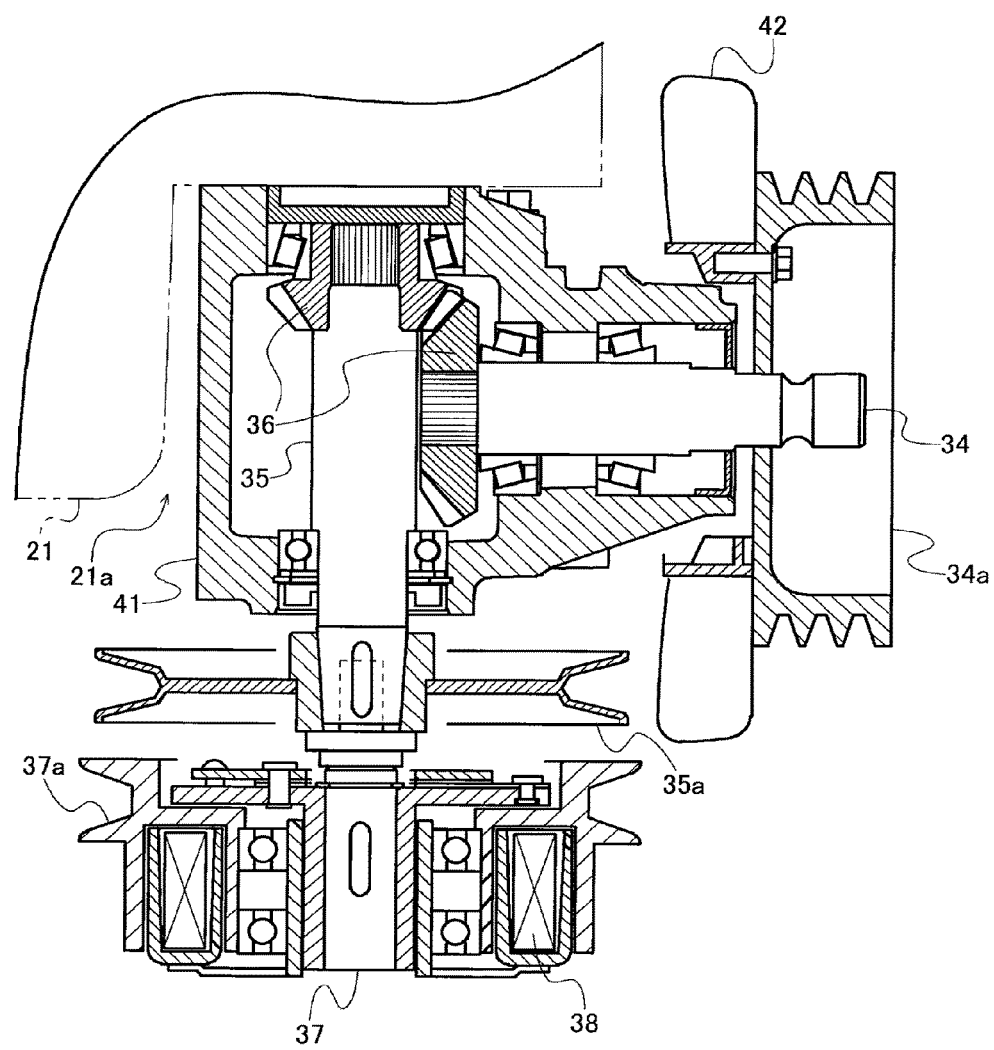
FIG. 5 is a sectional side view showing a gearbox.

Referring to FIG. 5, the bevel gears 36 are used to transmit the power of the input shaft 34 to the first output shaft 35. In the gearbox 41, one of the bevel gears 36 is fixed to the end portion (rear end portion) of the input shaft 34, and the other bevel gear 36 engaged with one of the bevel gears 36 is fixed to the end portion (upper end portion) of the first output shaft 35.

A first output pulley 35a which constitutes a first output member is fixed to the lower end portion of the first output shaft 35 in a key-fitting manner, and a second output shaft 37 is coaxially and detachably connected to the first output shaft 35. A belt 82 is entrained about the first output pulley 35a and a pulley 83a of the rear axle drive device 3 (see FIG. 1).

A second output pulley 37a which constitutes a second output member is provided on the second output shaft 37 with an electromagnetic clutch 38 interposed therebetween. A belt 81 is entrained about the second output pulley 37a and the pulley 6a of the mower 7 (see FIG. 1). The electromagnetic clutch 38 constitutes a clutch which switches between transmission and cutoff of the power from the second output shaft 37 to the second output pulley 37a. The clutch is not limited to the electromagnetic clutch, but a hydraulic clutch may be used as the clutch.

In the above-described configuration, as shown in FIGS. 1 to 3, the power of the crankshaft 24 of the engine 5 is transmitted to the first crank pulley 24a, the belt 39, the input pulley 34a, the input shaft 34, the bevel gear 36, and the first output shaft 35. The power of the first output shaft 35 is transmitted to the first output pulley 35a, the belt 82, the pulley 83a, and the input shaft 83 to drive a hydraulic pump (not shown) of driving the hydraulic motor 8. The power of the first output shaft 35 is transmitted to the second output shaft 37, the second output pulley 37a, the belt 81, the input pulley 6a, and the input shaft 6 to drive the rotary blade 7a of the mower 7.

Figure 6:
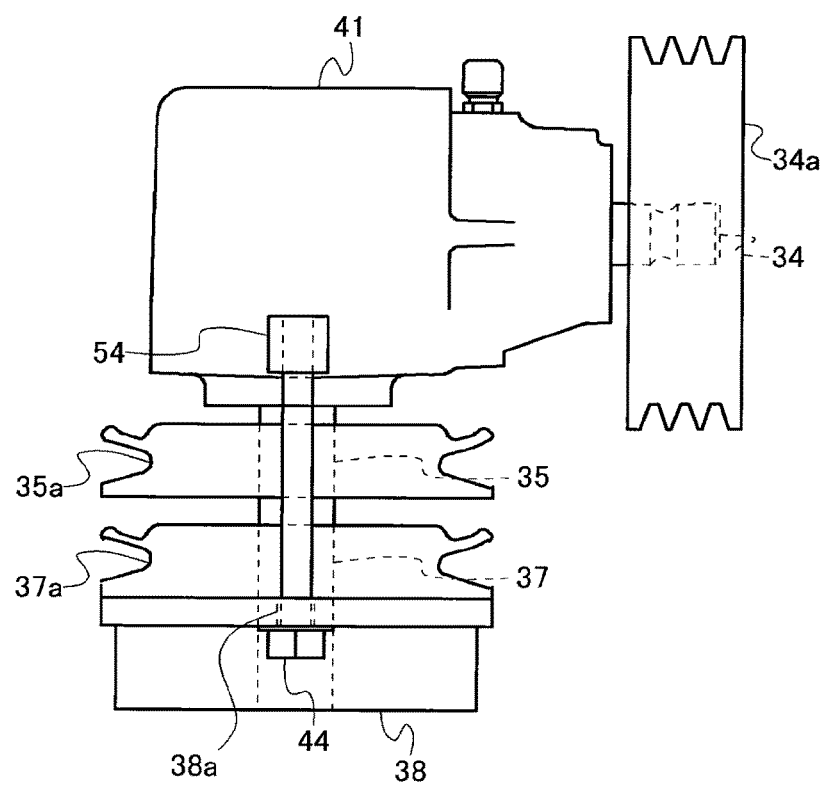
FIG. 6 is a side view showing a state in which an electromagnetic clutch is attached to the gearbox.

Referring to FIG. 6, a boss 54 is provided in right and left side face in the bottom of the gearbox 41 in order to attach the electromagnetic clutch 38. A thread grooves is formed in the inner peripheral surface of the boss 54. In the electromagnetic clutch 38, a bolt hole 38a is made at a position overlapping the boss 54 in the planar view.

In the configuration of FIG. 6, a bolt 44 is screwed from the bottom of the bolt hole 38a while the boss 54 of the gearbox 41 and the bolt hole 38a of the electromagnetic clutch 38 are matched with each other in the planar view, which allows the electromagnetic clutch 38 to be attached to the gearbox 41.

Figure 7:
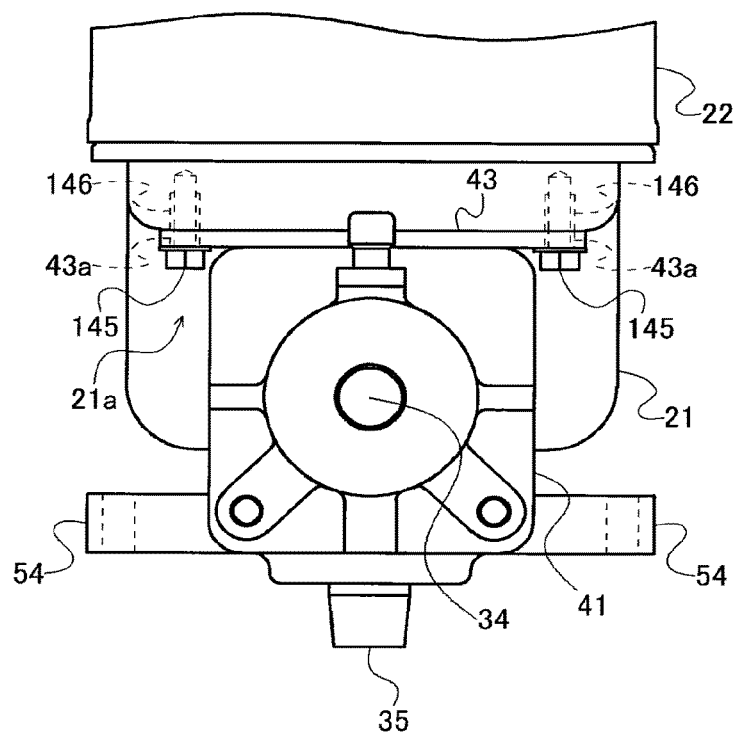
FIG. 7 is a front view showing a state in which the gearbox is attached to an oil pan.
Figure 8:
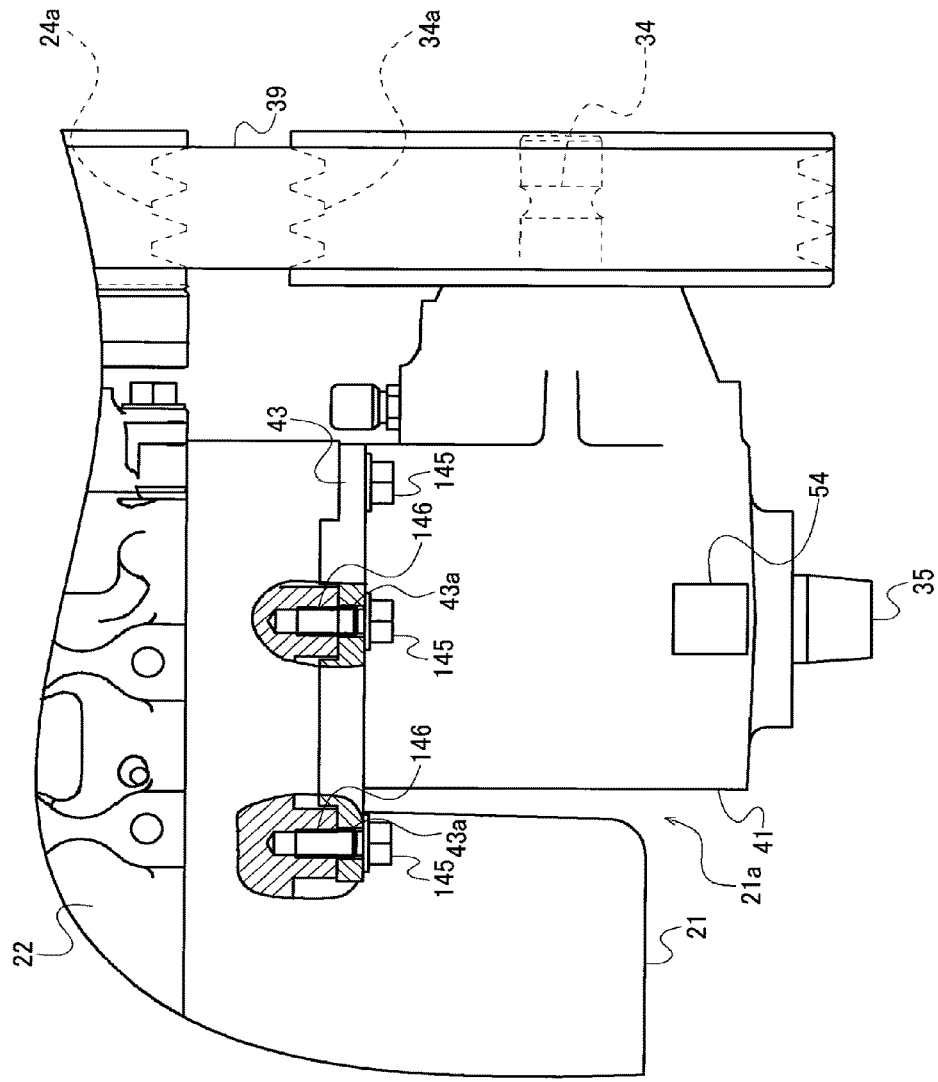
FIG. 8 is a partially sectional side view showing a state in which the gearbox of FIG. 7 is attached to the oil pan.

Referring to FIGS. 7 and 8, an attaching portion 43 is provided on the top of the gearbox 41, and the gearbox 41 is attached to the oil pan 21 by bolts 145 through the attaching portion 43. The attaching portion 43 is fixed to (or integrally molded along with the gearbox 41) the top of the gearbox 41, and the right and left end portions of the attaching portion 43 are projected from the right and left side faces of the gearbox 41 in the front view. Plural bolt holes 43a (in the first embodiment, each three holes on one side) are made at appropriate intervals in the lengthwise direction of each of the right and left end portions of the attaching portion 43. On the other hand, in the planar view, plural bolt holes 146 (same number as the bolt hole 43a) are made at positions overlapping the bolt holes 43a of the attaching portion 43 on both sides of the lower surface of the oil pan 21 in the notch 21a. The bolt hole 146 is made upward to a midpoint (to an extent in which the bolt hole 146 does not pierce through the oil pan 21) of the oil pan 21 from the lower surface of the oil pan 21.

In the configuration of FIGS. 7 and 8, the gearbox 41 is disposed in the notch 21a, the bolts 145 are screwed from the bottoms of the bolt holes 43a while the bolt holes 43a of the attaching portion 43 and the bolt holes 146 of the oil pan 21 are matched with one another, which allows the gearbox 41 to attached to the oil pan 21. The gearbox 41 is securely and detachably attached to the oil pan 21 by the plural bolts 145 (in the first embodiment, each three holes on one side).

Figure 9:
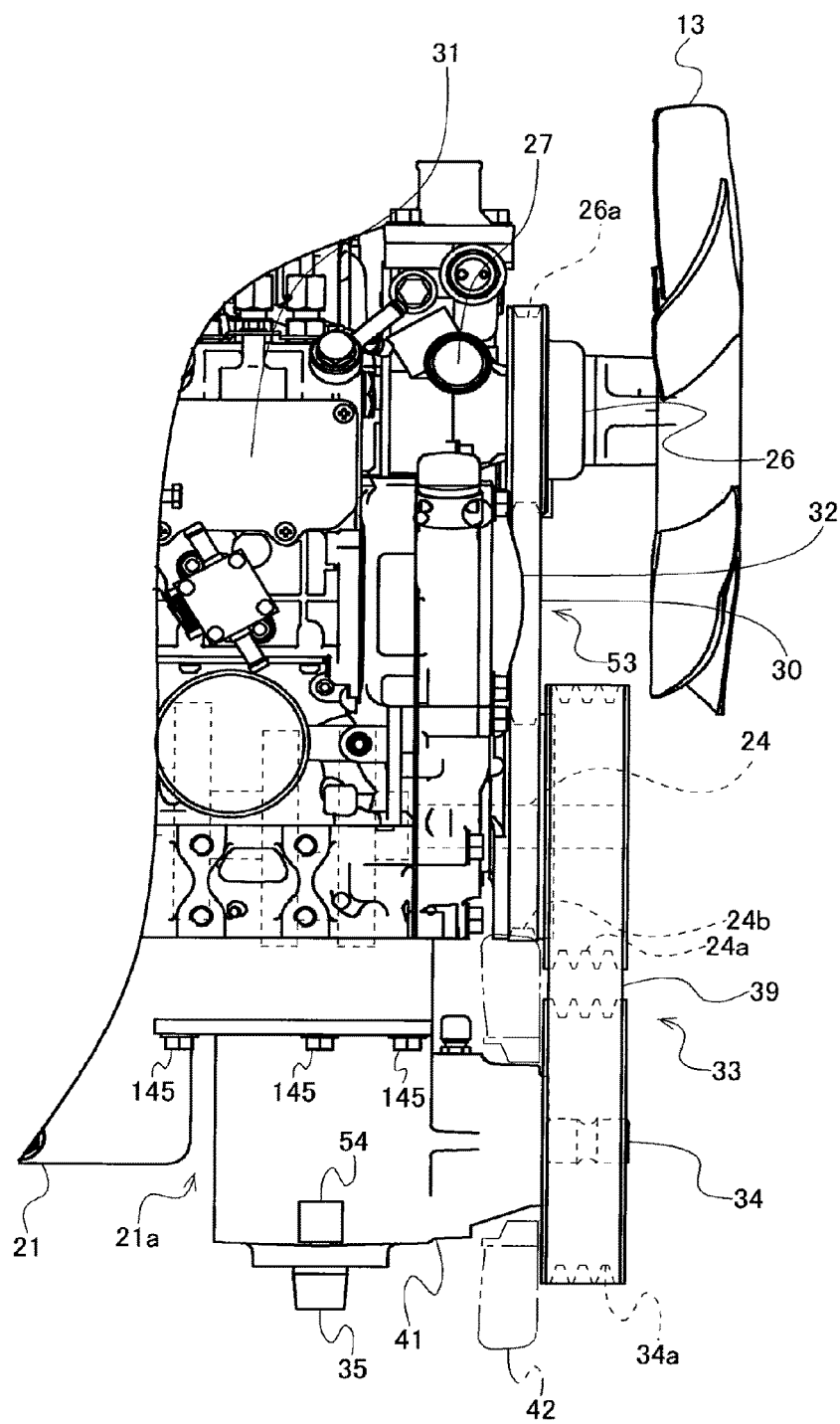
FIG. 9 is a side view showing a belt mechanism and an accessory drive belt mechanism of the first embodiment of the present invention.

At this point, as shown in FIG. 9, in the engine 5 of the first embodiment, the first crank pulley 24a and the second crank pulley 24b are sequentially disposed from the front of the front end portion of the crankshaft 24. That is, the first crank pulley 24a is disposed outside the second crank pulley 24b, and the belt mechanism 33 is disposed outside the accessory drive belt mechanism 53 on the front side of the engine 5.

Thus, the engine 5 of the first embodiment of the present invention includes the crankshaft 24 which is disposed in the substantially horizontal direction; the belt mechanism 33; the input shaft 34 which is disposed below the crankshaft 24 in parallel with the crankshaft 24, the input shaft 34 receiving the power from the crankshaft 24 through the belt mechanism 33; the first output shaft 35 which is disposed perpendicular to the crankshaft 24 to supply the power from the input shaft 34; the bevel gear 36 which transmits the power of the input shaft 34 to the first output shaft 35; and the gearbox 41 which accommodates the input shaft 34, the first output shaft 35, and the bevel gear 36 therein. According to the configuration of the engine of the first embodiment, the gearbox 41 is compactly formed to realize the compact engine 5, so that the miniaturization of the vehicle can easily be achieved. Additionally, the efficiency of the attaching work is improved because the gearbox 41 can previously be attached to the engine 5 to form the modular structure.

The first output shaft 35 is disposed within the range onto which the engine 5 is projected in the planar view. Therefore, the first output shaft 35 is compactly formed to realize the compact engine 5, so that the miniaturization of the vehicle can easily be achieved.

The oil pan 21 is provided in the lower portion of the engine 5, and the gearbox 41 is attached to the oil pan 21. Therefore, the efficiency of the attaching work is improved because the gearbox 41 can easily be attached to the engine 5 by utilizing the oil pan 21. The gearbox 41 becomes the same vibrating system as the engine 5, which allows a vibration-proofing countermeasure to be simplified to easily achieve the cost reduction.

The notch 21a is formed in a lower portion of the oil pan 21, and the gearbox 41 is disposed in the notch 21a. Therefore, the gearbox 41 is compactly disposed to realize the compact engine 5, so that the miniaturization of the vehicle can easily be achieved.

The first output pulley 35a is provided on the first output shaft 35, the second output shaft 37 which receives the power of the first output shaft 35 is coaxially connected to the first output shaft 35, and the second output pulley 37a is provided on the second output shaft 37. Therefore, because the first and second output pulleys 35a and 37a are individually connected to the drive objects, the powers of the first and second output shafts 35 and 37 can be supplied to the plural drive objects to improve usability of the engine 5.

The electromagnetic clutch 38 is interposed between the second output pulley 37a and the second output shaft 37. Therefore, the usability of the engine 5 is improved because the engine 5 whose power can be supplied to the plural drive objects can switch between the transmission and the cutoff of the power to at least one of the drive objects.

The electromagnetic clutch 38 can be attached to the gearbox 41. Therefore, the efficiency of the attaching work is improved because the electromagnetic clutch 38 can previously be attached to the engine 5 to form the modular structure. The electromagnetic clutch 38 can be attached to the engine 5 with a simple configuration by utilizing the gearbox 41. The electromagnetic clutch 38 becomes the same vibrating system as the engine 5, which allows the vibration-proofing countermeasure to be simplified to easily achieve the cost reduction.

The first power transmission means is formed by the belt mechanism 33. Therefore, because the power of the crankshaft 24 is transmitted to the input shaft 34 by the simple power transmission means which is of the belt mechanism, the cost reduction can easily be achieved and the efficiency of the assembling work of the power transmission means can be improved.

The engine 5 includes the tension pulley 40 which imparts the tension to the belt 39 of the belt mechanism 33. Therefore, the tension is imparted to the belt 39 to neglect the labor hour for adjusting the tension of the belt 39, so that the usability of the engine 5 can be improved.

The input shaft 34 includes the cooling fan 42. Therefore, the cooled wind can be sent to efficiently cool the engine 5.

Furthermore, the engine includes the crankshaft 24 which is disposed in the substantially horizontal direction; the cooling fan 13 which is disposed above the crankshaft 24, the cooling fan 13 being located on one of sides of the engine 5; the accessory drive belt mechanism 53 which is disposed on one of sides of the engine 5 to transmit the power of the crankshaft 24 to the cooling fan 13; the input shaft 34 which is disposed below the crankshaft 24 in parallel with the crankshaft 24; the first output shaft 35 which is disposed perpendicular to the crankshaft 24 to supply the power from the input shaft 34; and the belt mechanism 33 which is disposed on one of sides of the engine 5 to transmit the power of the crankshaft 24 to the input shaft 35, the belt mechanism 33 being located outside of the accessory drive belt mechanism 53. Therefore, the vehicle is easily miniaturized because the belt 39 of the belt mechanism 33 can be shortened to achieve the compact engine 5, and the efficiency of the attaching work is improved because the belt 39 can easily be entrained. The belt mechanism 33 is located outside the accessory drive endless belt mechanism 53, so that the belt 39 can easily removed to improve the usability of the engine 5.

An engine 5 according to a second embodiment of the present invention will be described with reference to FIGS. 10 to 12.

Figure 10:
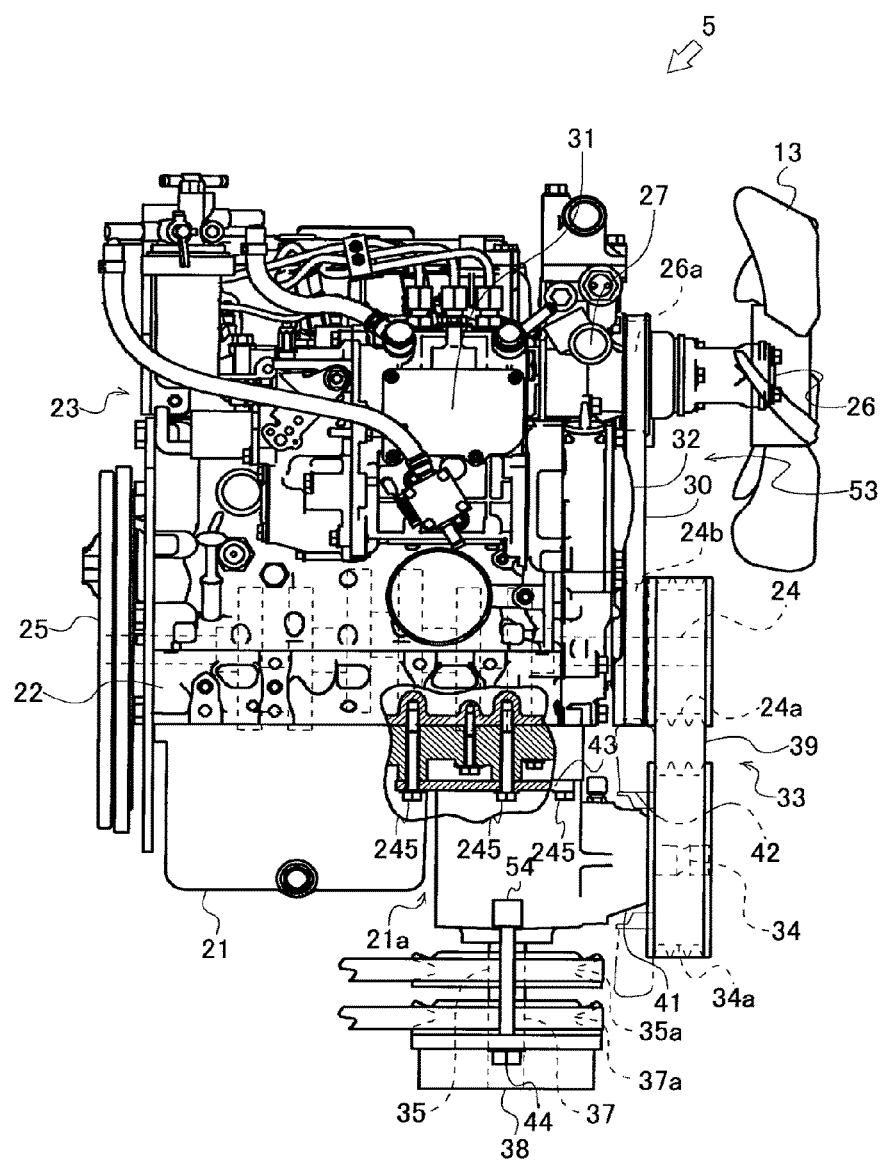
FIG. 10 is a partially sectional side view showing an engine according to a second embodiment of the present invention.
Figure 11:
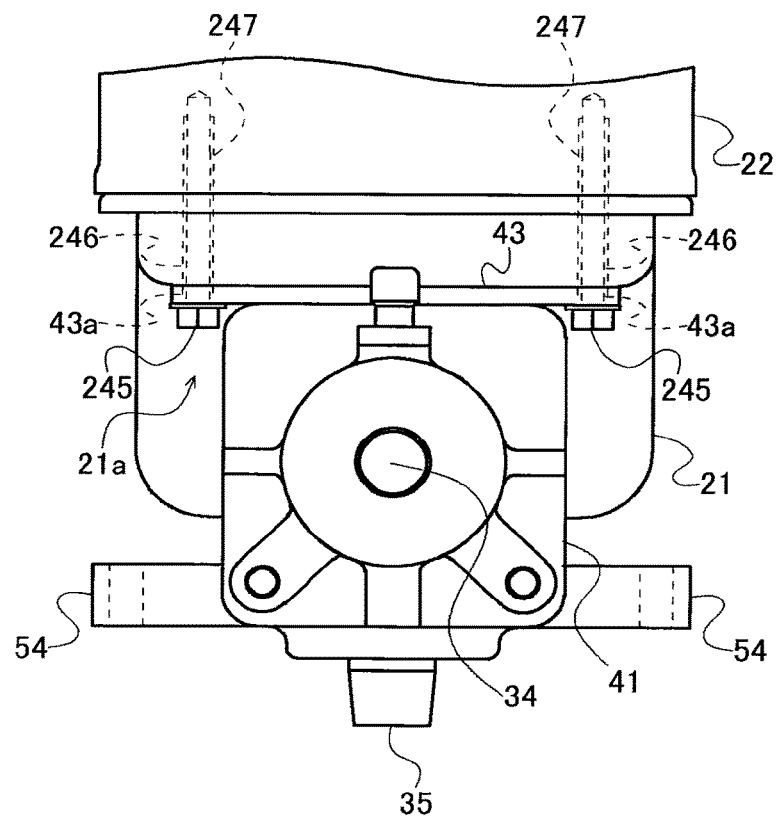
FIG. 11 is a front view showing a state in which a gearbox is attached to a cylinder block while fastened along with the oil pan.
Figure 12:
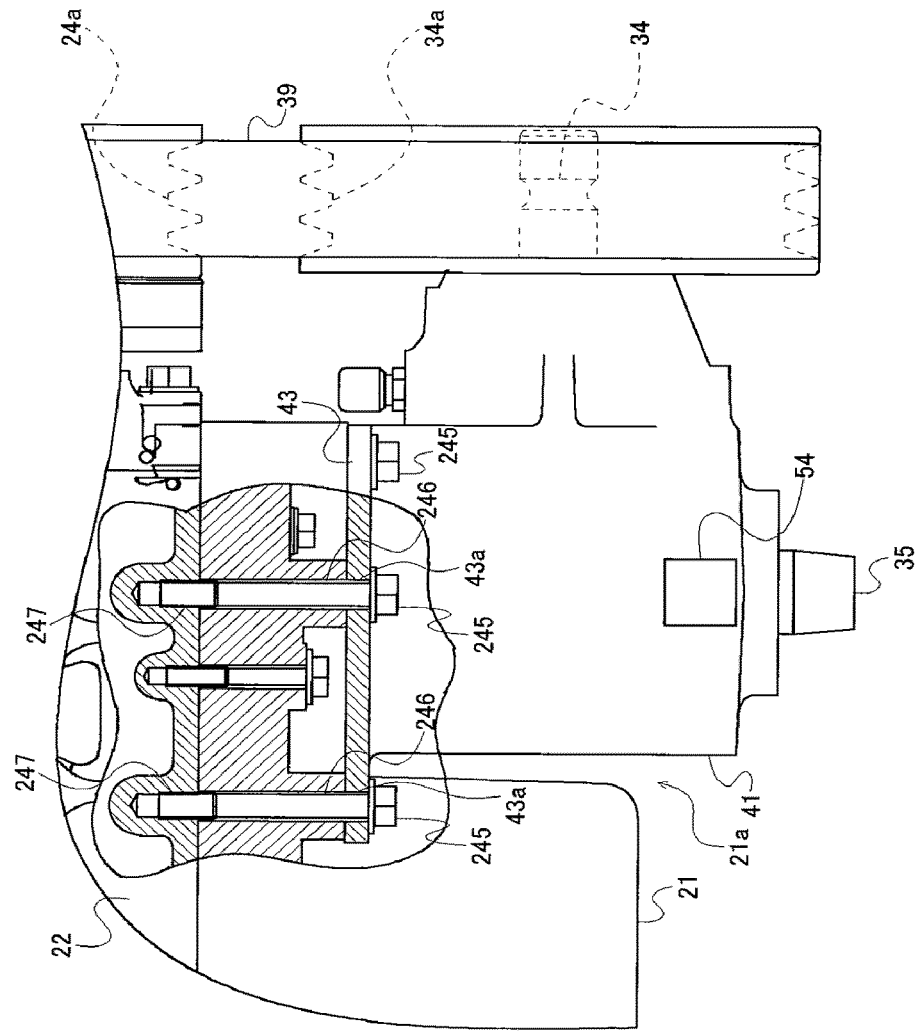
FIG. 12 is a partially sectional side view showing a state in which the gearbox of FIG. 11 is attached to the cylinder block while fastened along with the oil pan.

Referring to FIG. 10 to 12, in the engine 5 of the second embodiment, using bolts 245 having a length from the lower surface of the attaching portion 43 to the cylinder block 22, the gearbox 41 is attached to the cylinder block 22 while fastened along with the oil pan 21. On right and left sides in the lower surface of the oil pan 21 in the notch 21a, bolt holes 246 are made at positions overlapping the bolt holes 43a of the attaching portion 43 in the planar view. The bolt hole 246 pierces upward through the oil pan 21 from the lower surface of the oil pan 21 to the cylinder block 22. On right and left sides of the cylinder block 22, bolt holes 247 are made at positions overlapping the bolt hole 246 of the oil pan 21 in the planar view.

In the above-described configuration, the gearbox 41 is disposed in the notch 21a, and the bolts 245 are screwed from below the bolt hole 43a while the bolt holes 43a of the attaching portion 43, the bolt holes 246 of the oil pan 21, and the bolt holes 247 of the cylinder block 22 are matched with one another. Therefore, the gearbox 41 can be attached to the cylinder block 22 while fastened along with the oil pan 21. The gearbox 41 is securely and detachably attached to the cylinder block 22 by the plural bolts 245 (in the second embodiment, each three holes on one side).

Thus, in the engine of the second embodiment of the present invention, the oil pan 21 is provided in the lower portion of the engine 5, and the gearbox 41 is attached to the cylinder block 22 of the engine 5 while fastened along with the oil pan 21. Therefore, the efficiency of the attaching work is improved because the gearbox 41 and the oil pan 21 can simultaneously be attached to the cylinder block 22. The assurance of the attachment is improved because the gearbox 41 is attached to the cylinder block 22 having high rigidity. The gearbox 41 becomes the same vibrating system as the engine 5, which allows the vibration-proofing countermeasure to be simplified to easily achieve the cost reduction.

An engine 5 according to a third embodiment of the present invention will be described with reference to FIGS. 13 and 14.

Figure 13:
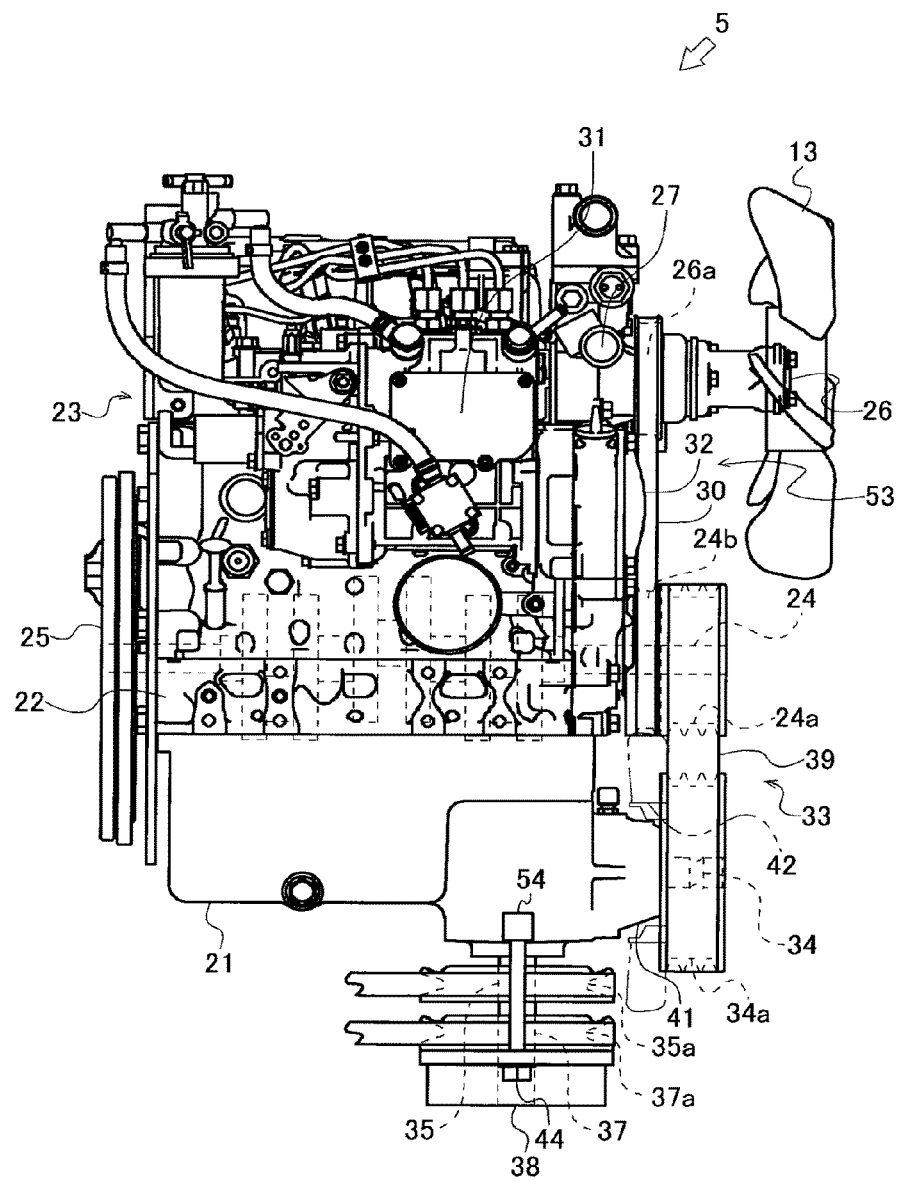
FIG. 13 is a partially sectional side view showing an engine according to a third embodiment of the present invention.
Figure 14:
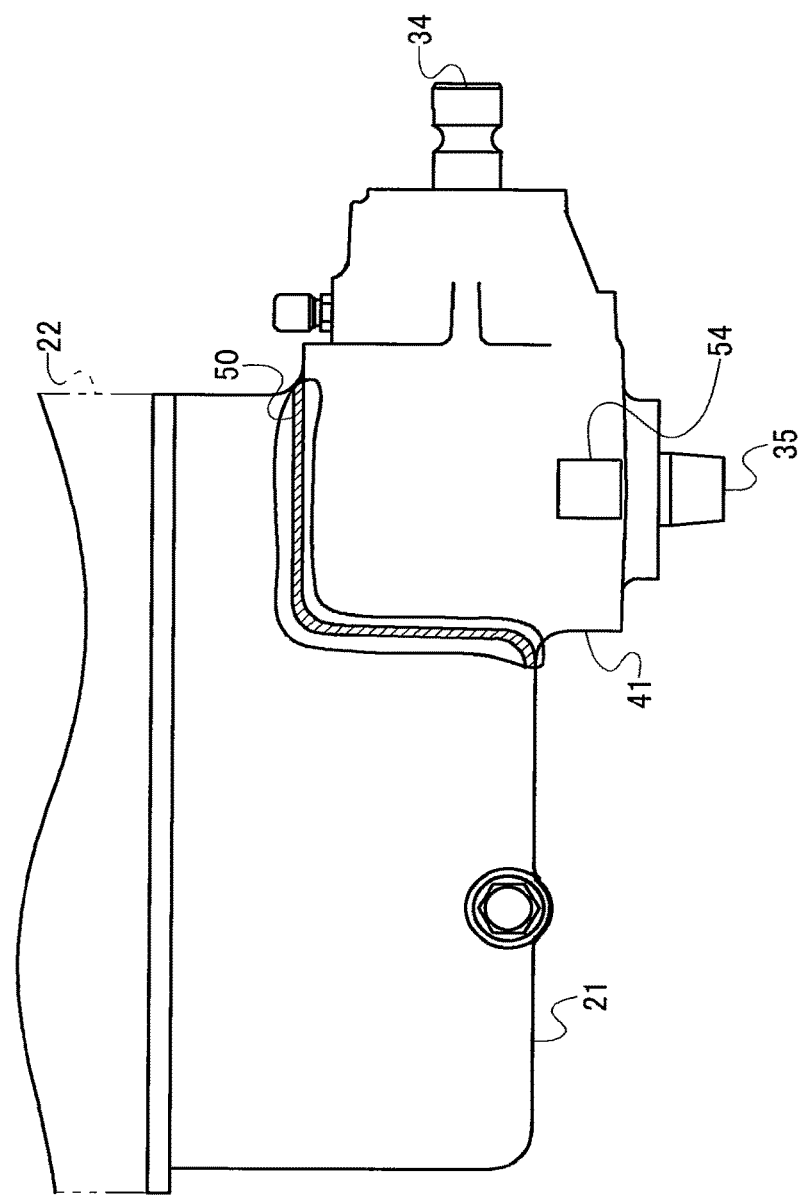
FIG. 14 is a partially sectional side view showing an integrally-molded gearbox and oil pan.

Referring to FIGS. 13 and 14, in the engine 5 of the third embodiment, the gearbox 41 is disposed in a front lower corner portion of the oil pan 21, and the oil pan 21 and the gearbox 41 are integrally molded. An inside of the oil pan 21 and an inside of the gearbox 41 are partitioned by a partition wall 50 to prevent the oil from flowing into the gearbox 41 from the oil pan 21.

Thus, in the engine 5 of the third embodiment of the present invention, the oil pan 21 is provided in the lower portion of the engine 5, and the oil pan 21 and the gearbox 41 are integrally molded. The gearbox 41 and the oil pan 21 can integrally be formed to neglect the attaching work of the gearbox 41. Therefore, the number of components is decreased while the efficiency of the attaching work is improved, so that the cost reduction can easily be achieved. The gearbox 41 becomes the same vibrating system as the engine 5, which allows the vibration-proofing countermeasure to be simplified to easily achieve the cost reduction.

An engine 5 according to a fourth embodiment of the present invention will be described with reference to FIGS. 15 to 17.

Figure 15:
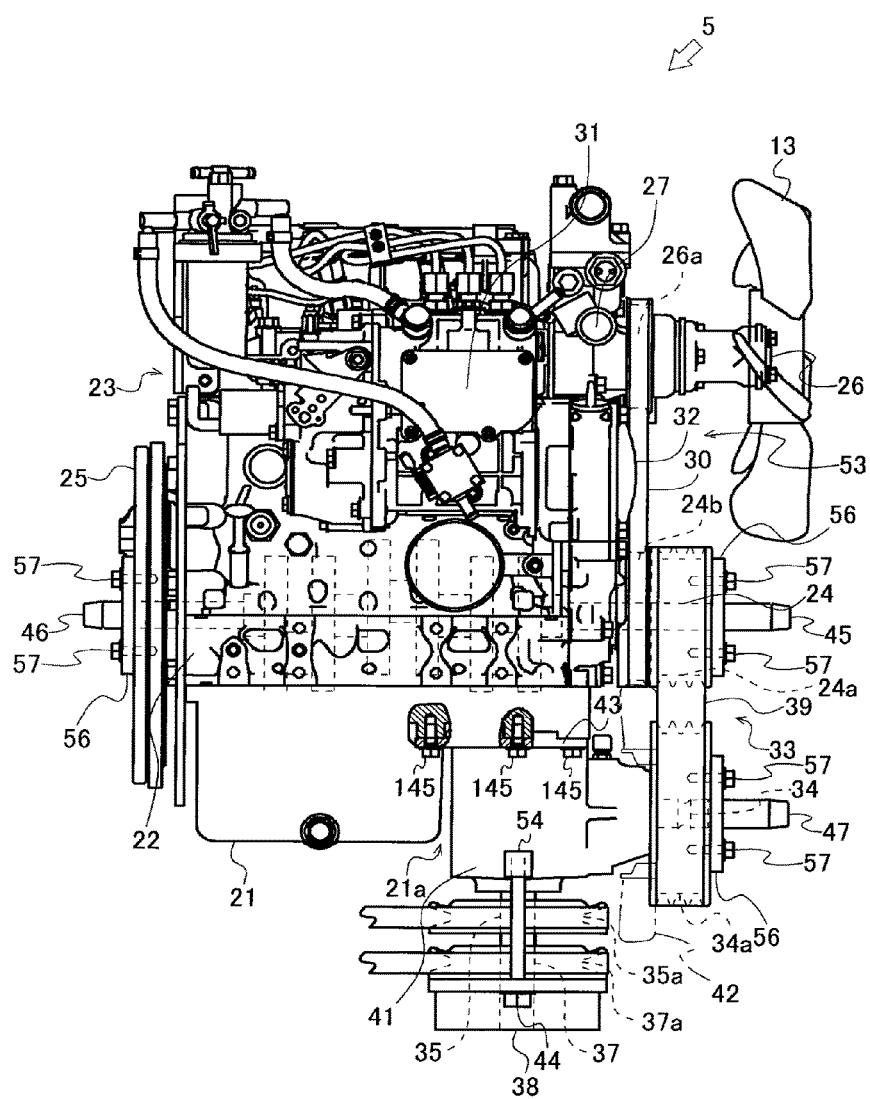
FIG. 15 is a partially sectional side view showing an engine according to a fourth embodiment of the present invention.
Figure 16:
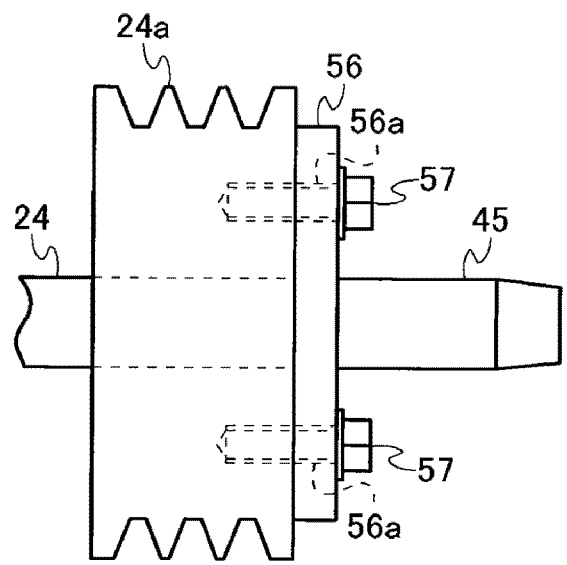
FIG. 16 is a side view showing a connection portion of a PTO shaft and a front end portion of a crankshaft.
Figure 17:
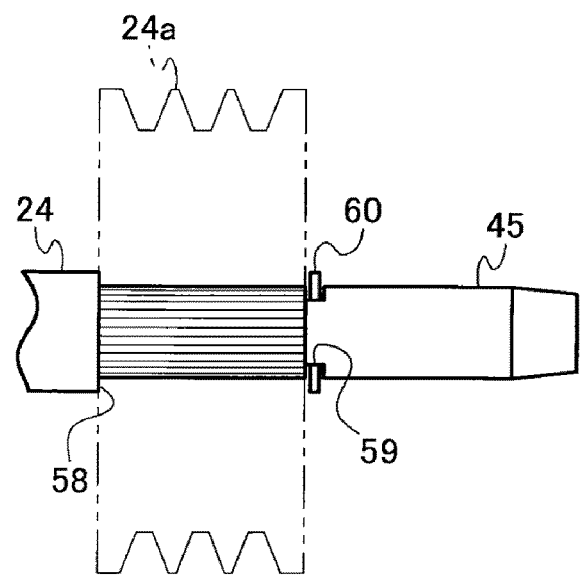
FIG. 17 is a side view showing a connection portion of a PTO shaft and a front end portion of a crankshaft according to a modification of the fourth embodiment.

Referring to FIGS. 15 and 16, in the engine 5 of the fourth embodiment, PTO shafts 45 and 46 are respectively provided on the front and rear end portions of the crankshaft 24, and a PTO shaft 47 is provided on the front end portion of the input shaft 34.

The PTO shafts 45, 46, and 47 constitute the power taking-out shaft, the PTO shafts 45 and 46 are disposed in coaxial with the crankshaft 24, and the PTO shaft 47 is disposed in coaxial with the input shaft 34. The PTO shafts 45, 46, and 47 are projected from attaching plates 56 which is of the plate-like member. Because the configurations of the PTO shafts 45, 46, and 47 are substantially similar to one another, the PTO shaft 45 connected to the front end portion of the crankshaft 24 will be described here by way of example while the detailed description is neglected for the PTO shafts 46 and 47.

As shown in FIG. 16, in the attaching plate 56, plural bolt holes 56a are made around the PTO shaft 45. On the other hand, in the first crank pulley 24a, plural bolt holes (not shown) are made at positions overlapping the bolt holes 56a of the attaching plate 56 in the planar view. In the configuration of FIG. 16, the PTO shafts 45 and 46 are coaxially disposed onto the front and rear end portions of the crankshaft 24, the PTO shaft 47 is coaxially disposed onto the front end portion of the input shaft 34, the bolts 57 are screwed in the bolt holes 56a while the first crank pulley 24a, the flywheel 25, the bolt hole of the input pulley 34a, and the bolt hole 56a of the attaching plate 56 are matched with one another. This enables the PTO shafts 45, 46, and 47 to be attached to the first crank pulley 24a, the flywheel 25, and the input pulley 34a with the attaching plates 56 interposed therebetween, respectively. The configuration in which the PTO shafts 45, 46, and 47 are respectively connected to the shafts is not limited to the fourth embodiment. For example, a configuration in which the connection is established by coupling may be adopted.

The PTO shafts 45, 46, and 47 can also be configured as follows. As shown in FIG. 17, in the front end portion of the crankshaft 24, the PTO shaft 45 is integrally molded, and the first crank pulley 24a is fixed by spline fitting. A step portion 58 is formed in the crankshaft 24 located inside the first crank pulley 24a. In the step portion 58, an outer diameter of the crankshaft 24 is largely formed to regulate the inward movement of the first crank pulley 24a. A groove portion 59 is formed in the crankshaft 24 located outside the first crank pulley 24a, and a retaining ring 60 is fitted in the groove portion 59 to regulate the outward movement of the first crank pulley 24a.

Thus, in the engine 5 of the fourth embodiment of the present invention, the power taking-out PTO shafts 45, 46, and 47 are provided coaxially to the crankshaft 24 and the input shaft 34. Therefore, the power of the work device can be taken out, so that the usability of the engine 5 can be improved.

An engine 5 according to a fifth embodiment of the present invention will be described with reference to FIGS. 18 and 19.

Figure 18:
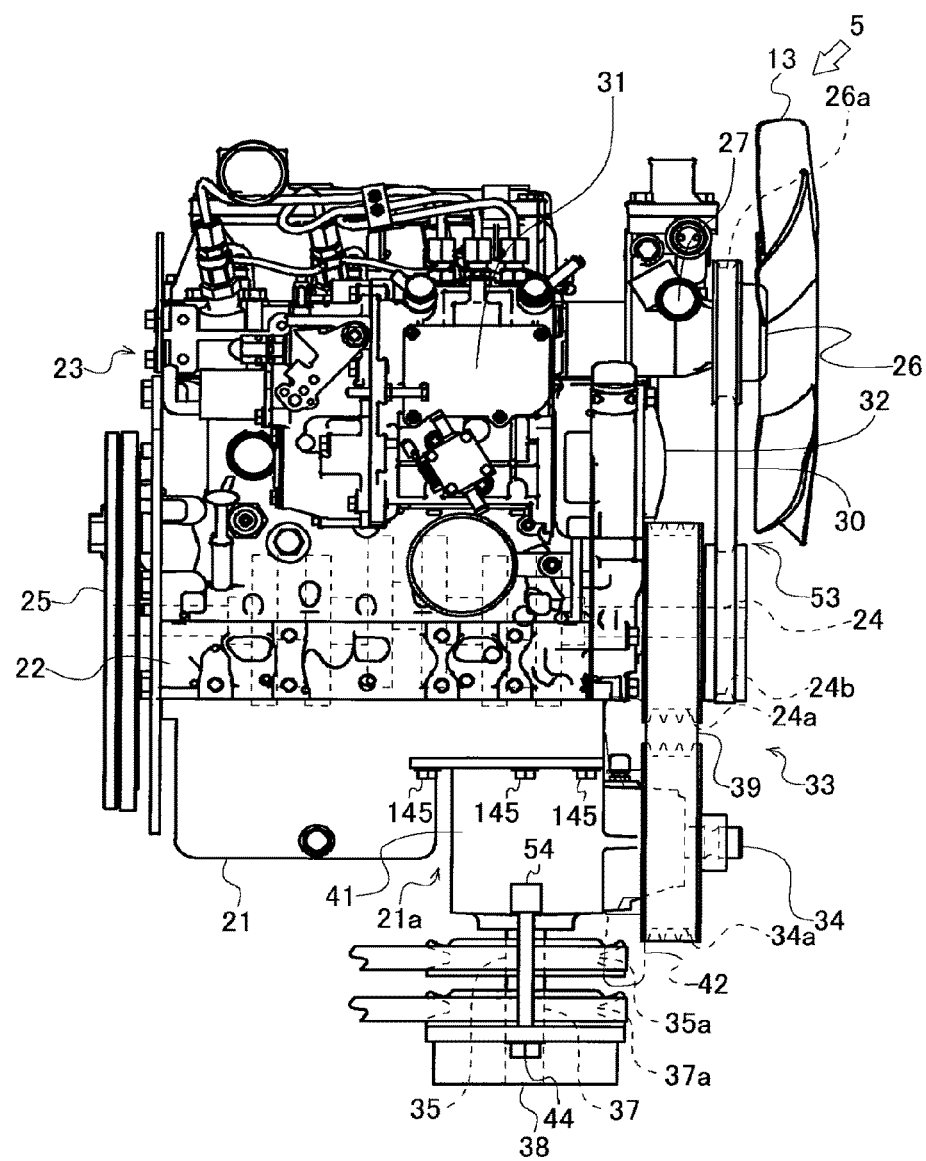
FIG. 18 is a side view showing an engine according to a fifth embodiment of the present invention.
Figure 19:
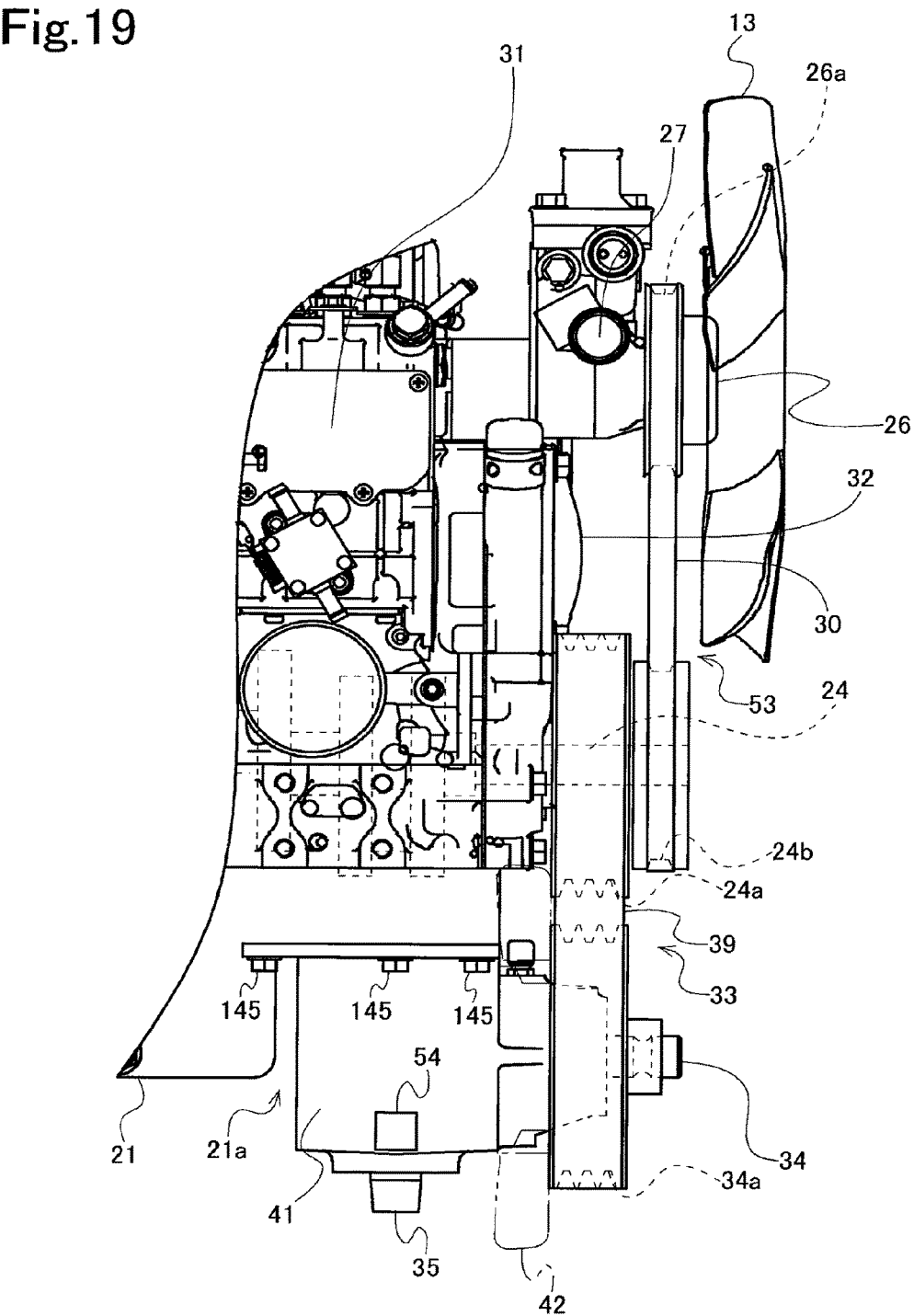
FIG. 19 is a side view showing a belt mechanism and an accessory drive belt mechanism of the fifth embodiment of the present invention.

Referring to FIGS. 18 and 19, in the engine 5 of the fifth embodiment, the second crank pulley 24b and the first crank pulley 24a are sequentially fixed from the front to the front end portion of the crankshaft 24. That is, the first crank pulley 24a is disposed inside the second crank pulley 24b.

The belt 30 is entrained about the second crank pulley 24b of the crankshaft 24, the pulley 26a of the fan shaft 26, and the pulley 29a of the alternator shaft 29 to form the accessory drive belt mechanism 53, and the belt 39 is entrained inside the accessory drive belt mechanism 53 about the input pulley 34a of the input shaft 34 and the first crank pulley 24a of the crankshaft 24 to form the belt mechanism 33.

Thus, the engine 5 of the fifth embodiment of the present invention includes the crankshaft 24 which is disposed in the substantially horizontal direction; the cooling fan 13 which is disposed above the crankshaft 24 to cool the engine 5, the cooling fan 13 being located on one of sides of the engine 5; the accessory drive belt mechanism 53 which is disposed on one of sides of the engine 5 to transmit the power of the crankshaft 24 to the cooling fan 13; the input shaft 34 which is disposed below the crankshaft 24 in parallel with the crankshaft 24; the first output shaft 35 which is disposed perpendicular to the crankshaft 24 to supply the power from the input shaft 34; and the belt mechanism 33 which is disposed on one of sides of the engine 5 to transmit the power of the crankshaft 24 to the input shaft 34, the belt mechanism 33 being located inside of the accessory drive belt mechanism 53. Therefore, the vehicle is easily miniaturized because the belt 39 of the belt mechanism 33 can be shortened to achieve the compact engine 5, and the efficiency of the attaching work is improved because the belt 39 can easily be entrained. The belt mechanism 33 is located inside the accessory drive endless belt mechanism 53 which drives the cooling fan 13, so that the cooling fan 13 does not interfere with the belt mechanism 33. Therefore, the vehicle can easily be miniaturized because the position of the cooling fan 13 is lowered to achieve the compact engine 5.

An engine 5 according to a sixth embodiment of the present invention will be described with reference to FIGS. 20 to 23.

Figure 20:
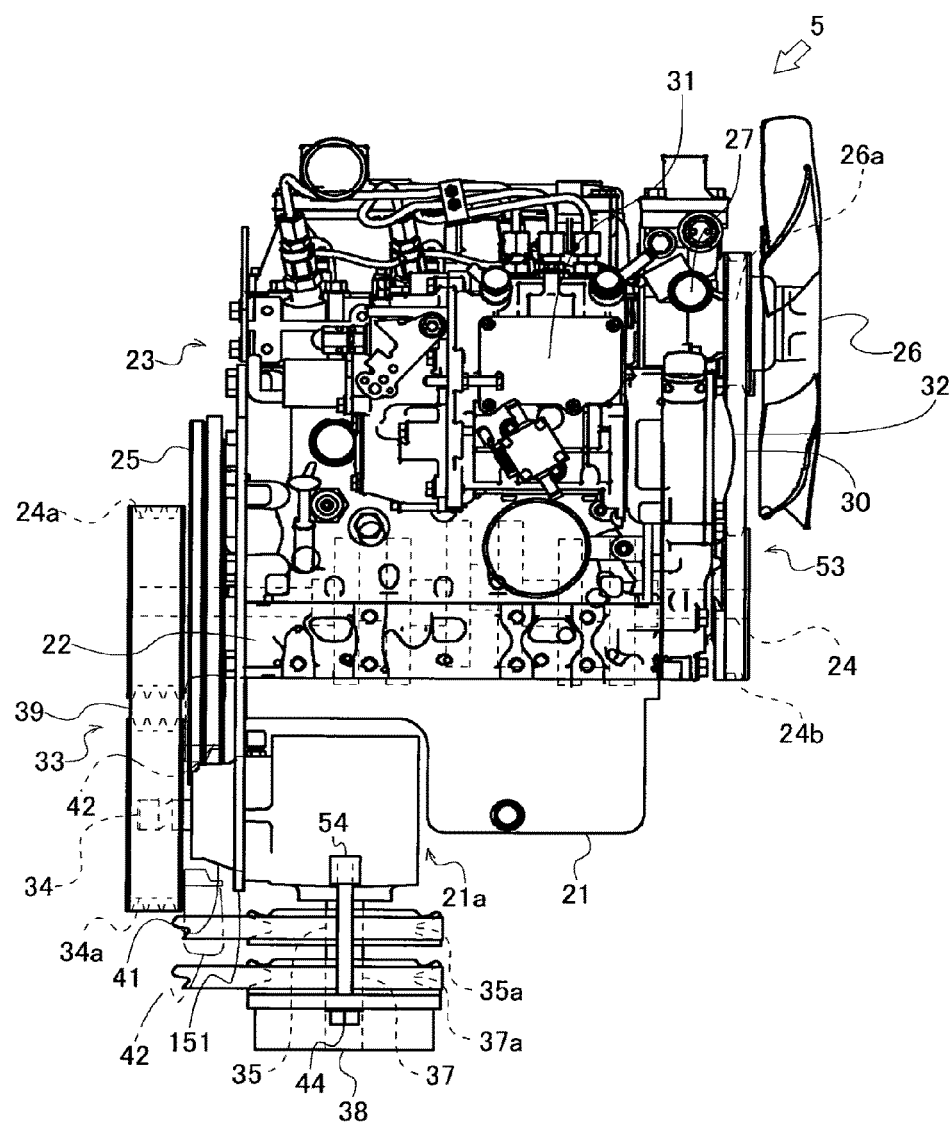
FIG. 20 is a side view showing an engine according to a sixth embodiment of the present invention.
Figure 21:
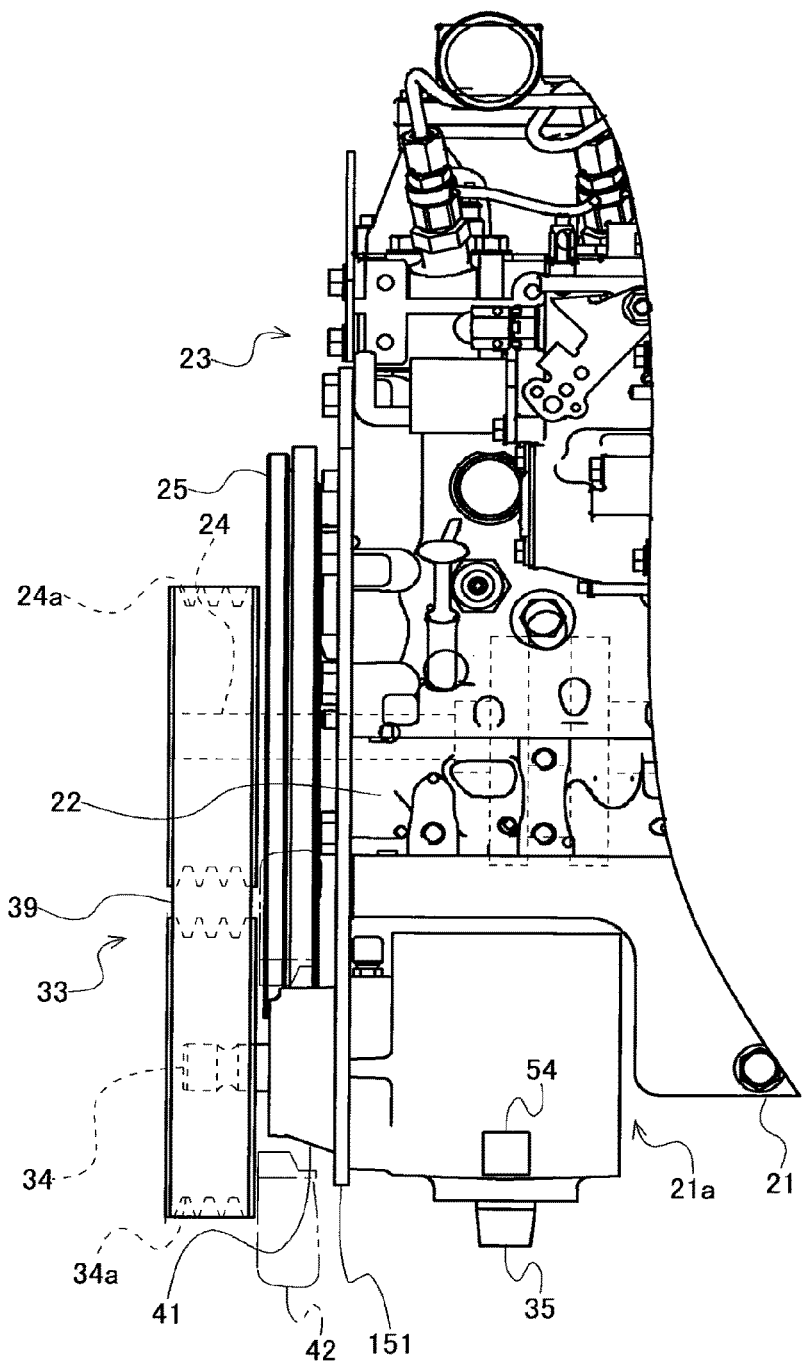
FIG. 21 is a side view showing a belt mechanism of the sixth embodiment of the present invention.
Figure 22:
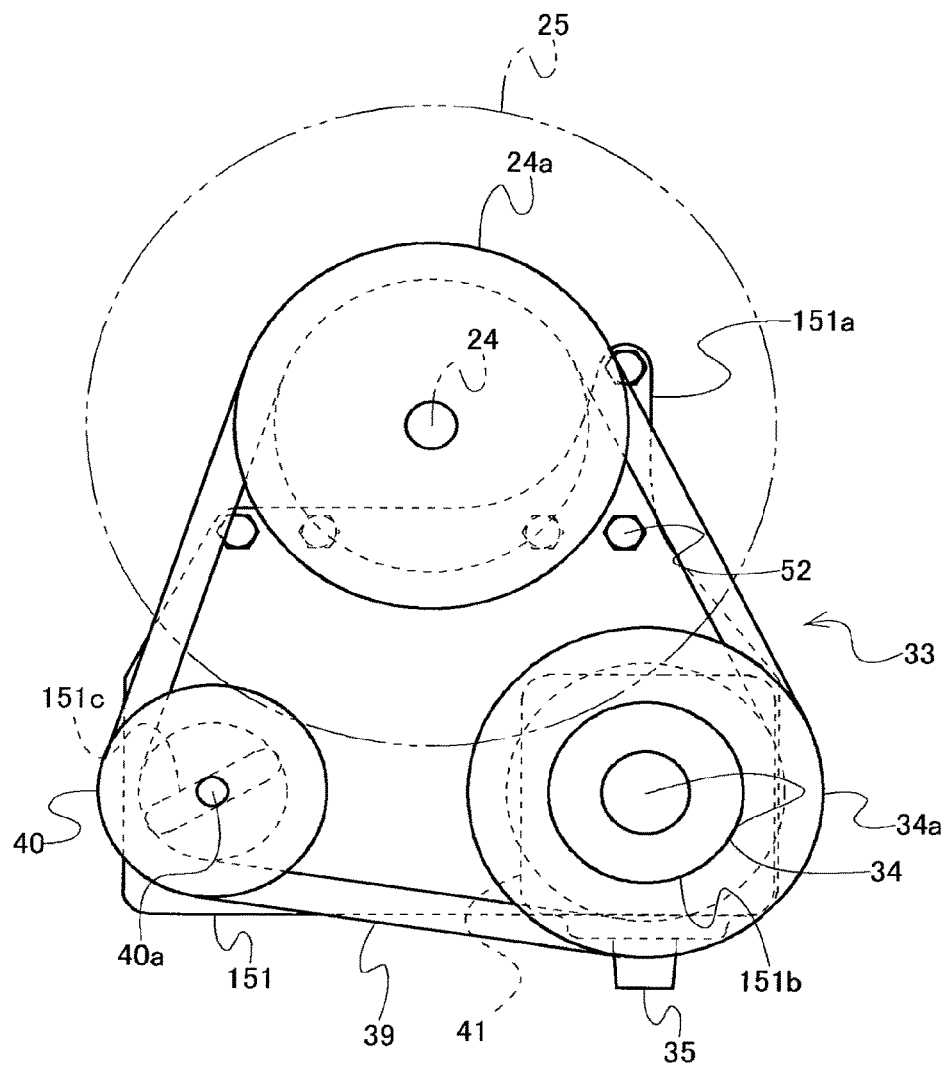
FIG. 22 is a front view showing the belt mechanism of FIG. 21.

Referring to FIGS. 20 to 22, in the engine 5 of the sixth embodiment, the second crank pulley 24b is fixed to the front end portion of the crankshaft 24, and the first crank pulley 24a and the flywheel 25 are sequentially fixed from the rear to the rear end portion of the crankshaft 24. That is, the first crank pulley 24a is disposed outside the flywheel 25.

The notch 21a is formed on the rear lower side of the oil pan 21. The notch 21a is a space where the front lower corner portion of the oil pan 21 is cut out into a substantially rectangular shape in the lateral view, and the gearbox 41 is disposed in the notch 21a. The input shaft 34 is projected rearward from the gearbox 41, and the input pulley 34a is fixed to the rear end portion of the input shaft 34. That is, the input pulley 34a is disposed outside the flywheel 25.

Thus, the belt 39 is entrained outside the flywheel 25 about the input pulley 34a of the input shaft 34 and the first crank pulley 24a of the crankshaft 24 to form the belt mechanism 33.

Figure 23:
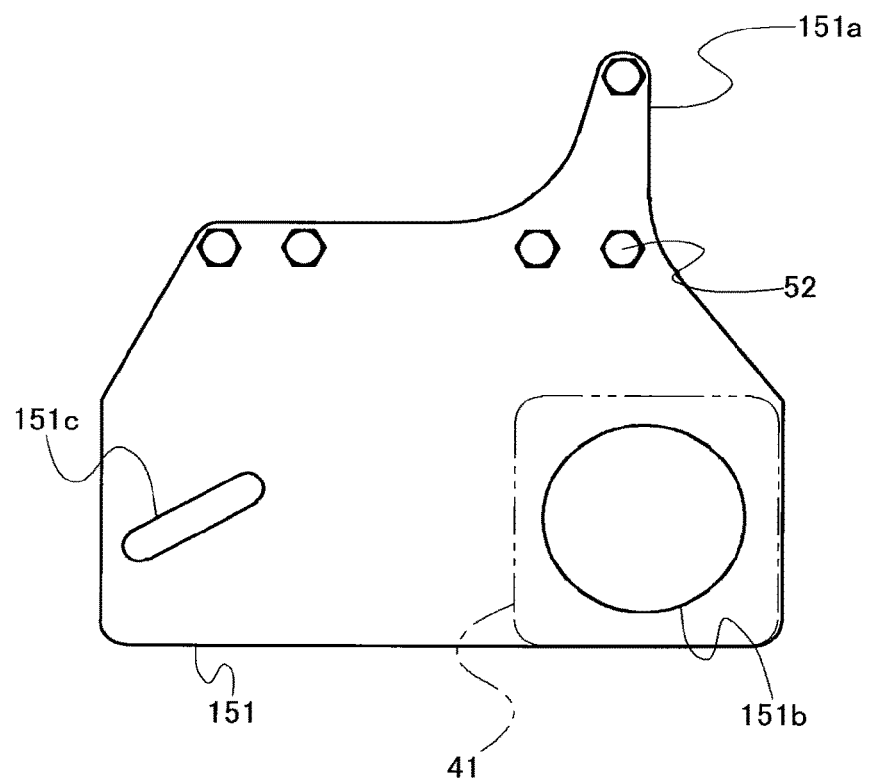
FIG. 23 is a front view showing a gearbox attaching bracket of the sixth embodiment of the present invention.

At this point, the gearbox 41 is attached to the cylinder block 22 with a bracket 151 interposed therebetween. As shown in FIGS. 22 and 23, the bracket 151 is a plate-like member which is formed into a substantially trapezoidal shape in the rear view, and an upper right portion of the bracket 151 is extended upward to form an arm portion 151a. The bracket 151 is securely and detachably attached to the rear face of the cylinder block 22 by plural bolts 52 (in the sixth embodiment, five bolts).

An attaching hole 151b is made in the lower right portion of the bracket 151 in order to attach the gearbox 41. The attaching hole 151b is formed into a shape (substantially circular shape) in which the gearbox 41 is fitted. The attaching hole 151b is located at a position biased (in the sixth embodiment, rightward) in the crosswise direction with respect to the crankshaft 24. Therefore, the gearbox 41 is disposed upward as much as possible while avoiding the flywheel 25, which allows the engine 5 to be compactly formed (height of the engine 5 is lowered).

A long hole 151c is made in an obliquely lower left direction in the lower left portion of the bracket 151, and the pulley shaft 40a of the tension pulley 40 is slidably disposed in the long hole 151c. The tension pulley 40 constitutes the tension member which imparts the tension to the belt 39, and the tension pulley 40 is biased toward the lower left direction by an elastic member (not shown) such as a spring while abutting on the inner peripheral side of the belt 39.

Thus, the engine 5 of the sixth embodiment of the present invention includes the crankshaft 24 which is disposed in the substantially horizontal direction; the flywheel 25 which is disposed on one of sides of the engine 5; the input shaft 34 which is disposed below the crankshaft 24 in parallel with the crankshaft 24; the first output shaft 35 which is disposed perpendicular to the crankshaft 24 to supply the power from the input shaft 34; and the belt mechanism 33 which is disposed on one of sides of the engine 5 to transmit the power of the crankshaft 24 to the input shaft 34, the belt mechanism 33 being located outside of the flywheel 25. Therefore, the vehicle is easily miniaturized because the belt 39 of the belt mechanism 33 can be shortened to achieve the compact engine 5, and the efficiency of the attaching work is improved because the belt 39 can easily be entrained. The belt mechanism 33 is located outside the flywheel 25, so that the belt 39 can easily be removed to improve the usability of the engine 5.

An engine 5 according to a seventh embodiment of the present invention will be described with reference to FIGS. 24 to 27.

Figure 24:
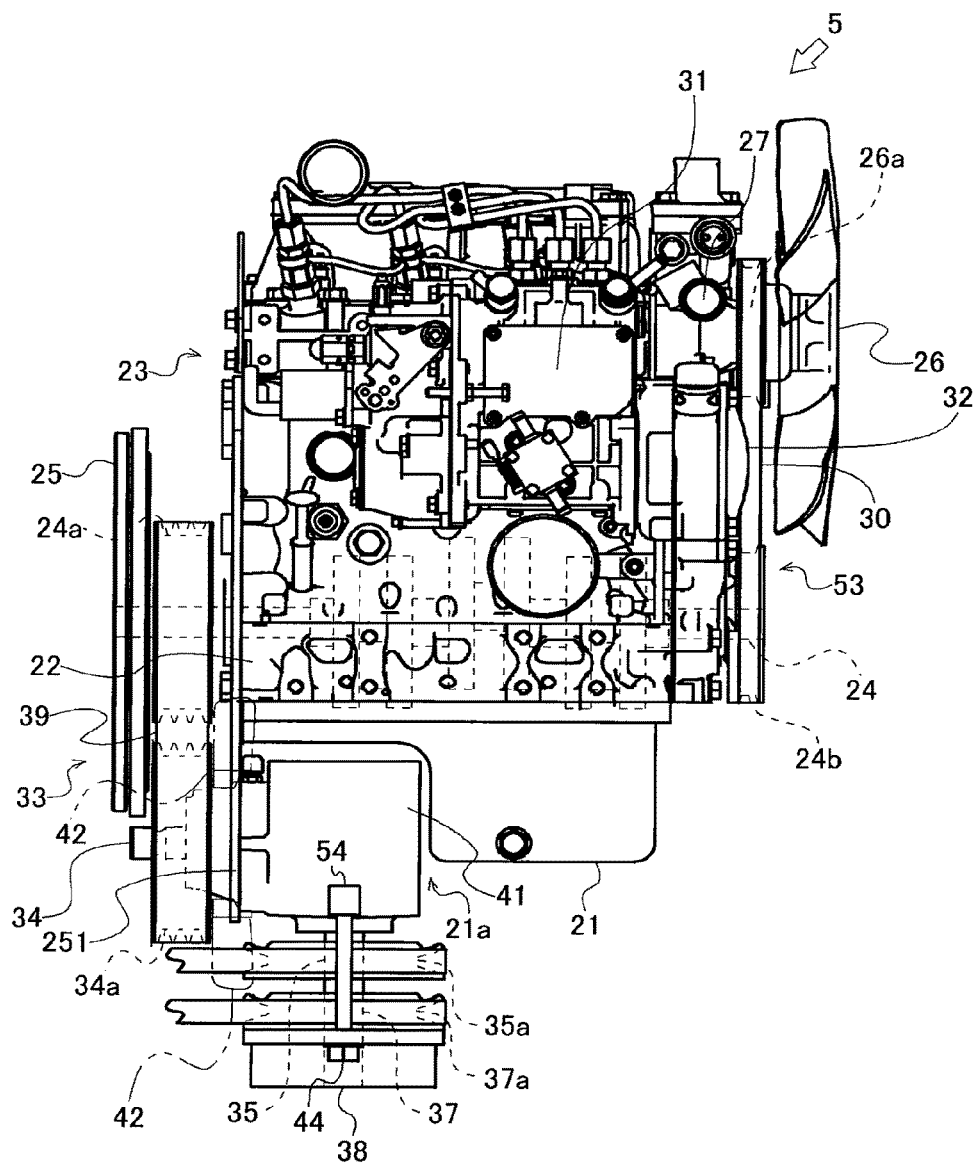
FIG. 24 is a side view showing an engine according to a seventh embodiment of the present invention.
Figure 25:
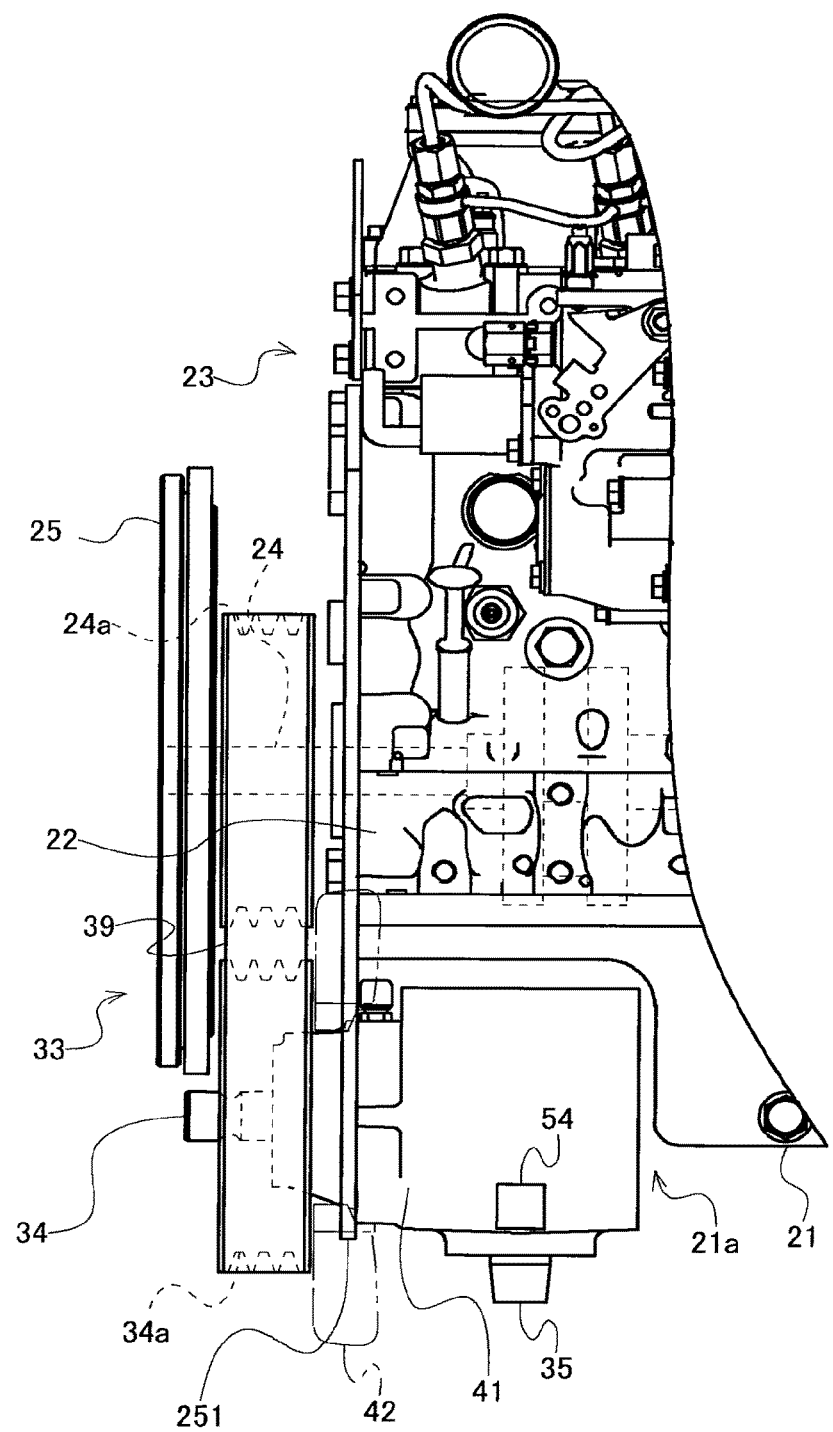
FIG. 25 is a side view showing a belt mechanism of the seventh embodiment of the present invention.
Figure 26:
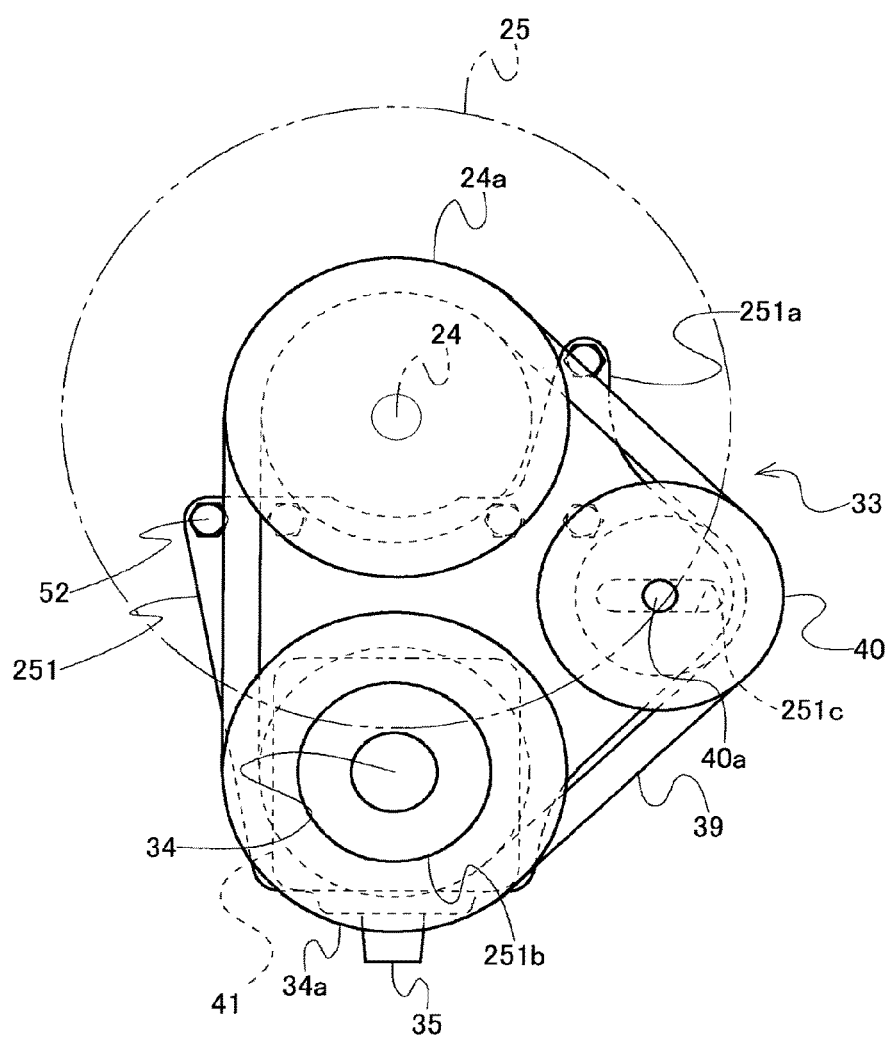
FIG. 26 is a front view showing the belt mechanism of FIG. 25.

Referring to FIGS. 24 to 26, in the engine 5 of the seventh embodiment, the second crank pulley 24b is fixed to the front end portion of the crankshaft 24, and the flywheel 25 and the first crank pulley 24a are sequentially fixed from the rear to the rear end portion of the crankshaft 24. That is, the first crank pulley 24a is disposed inside the flywheel 25.

The notch 21a is formed on the rear lower side of the oil pan 21. The notch 21a is a space where the front lower corner portion of the oil pan 21 is cut out into the substantially rectangular shape in the lateral view, and the gearbox 41 is disposed in the notch 21a. The input shaft 34 is projected rearward from the gearbox 41, and the input pulley 34a is fixed to the rear end portion of the input shaft 34. That is, the input pulley 34a is disposed inside the flywheel 25.

Thus, the belt 39 is entrained inside the flywheel 25 about the input pulley 34a of the input shaft 34 and the first crank pulley 24a of the crankshaft 24 to form the belt mechanism 33.

Figure 27:
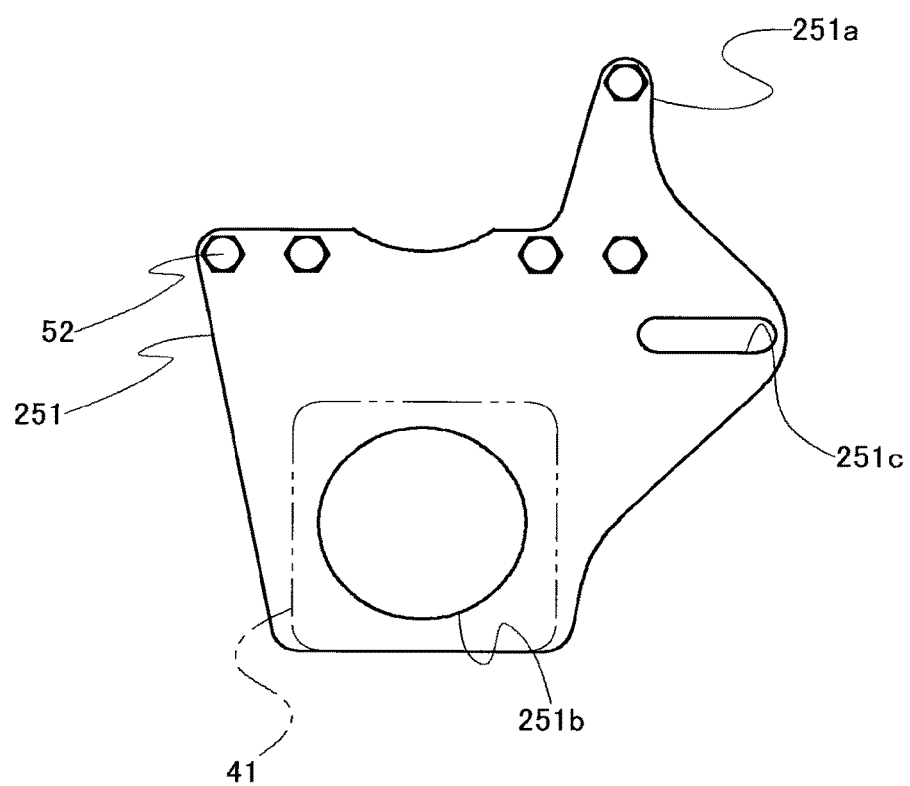
FIG. 27 is a front view showing a gearbox attaching bracket of the seventh embodiment of the present invention.

At this point, the gearbox 41 is attached to the cylinder block 22 with a bracket 251 interposed therebetween. As shown in FIGS. 26 and 27, the bracket 251 is a plate-like member which is formed into a substantially reversely trapezoidal shape in the rear view, and an upper right portion of the bracket 251 is extended upward to form an arm portion 251a. The bracket 251 is securely and detachably attached to the rear face of the cylinder block 22 by the plural bolts 52 (in the seventh embodiment, five bolts).

An attaching hole 251b is made in the lower portion of the bracket 251 in order to attach the gearbox 41. The attaching hole 251b is formed into a shape (substantially circular shape) in which the gearbox 41 is fitted. The attaching hole 251b is located at a position where the crosswise center of the attaching hole 251b is matched with the crankshaft 24. Therefore, the gearbox 41 is disposed at the position where the crosswise center (input shaft 34) of the gearbox 41 is matched with the crankshaft 24.

A long hole 251c is made in the crosswise direction in the right portion of the bracket 251, and the pulley shaft 40a of the tension pulley 40 is slidably disposed in the long hole 251c. The tension pulley 40 constitutes the tension member which imparts the tension to the belt 39, and the tension pulley 40 is biased rightward by the elastic member (not shown) such as spring while abutting on the inner peripheral side of the belt 39.

Thus, the engine 5 of the seventh embodiment of the present invention includes the crankshaft 24 which is disposed in the substantially horizontal direction; the flywheel 25 which is disposed on one of sides of the engine 5; the input shaft 34 which is disposed below the crankshaft 24 in parallel with the crankshaft 24; the first output shaft 35 which is disposed perpendicular to the crankshaft 24 to supply the power from the input shaft 34; and the belt mechanism 33 which is disposed on one of sides of the engine 5 to transmit the power of the crankshaft 24 to the input shaft 34, the belt mechanism 33 being located inside of the flywheel 25. Therefore, the vehicle is easily miniaturized because the belt 39 of the endless belt mechanism 33 can be shortened to achieve the compact engine 5, and the efficiency of the attaching work is improved because the belt 39 can easily be entrained. Because the belt mechanism 33 is located inside the flywheel 25, the input shaft 34 does not interfere with the flywheel 25. Therefore, the vehicle can easily be miniaturized because a wheel base between the crankshaft 24 and the input shaft 34 is shortened irrespective of the outer diameter of the flywheel 25 to achieve the compact engine 5.

An engine 5 according to an eighth embodiment of the present invention will be described with reference to FIGS. 28 to 30.

Figure 28:
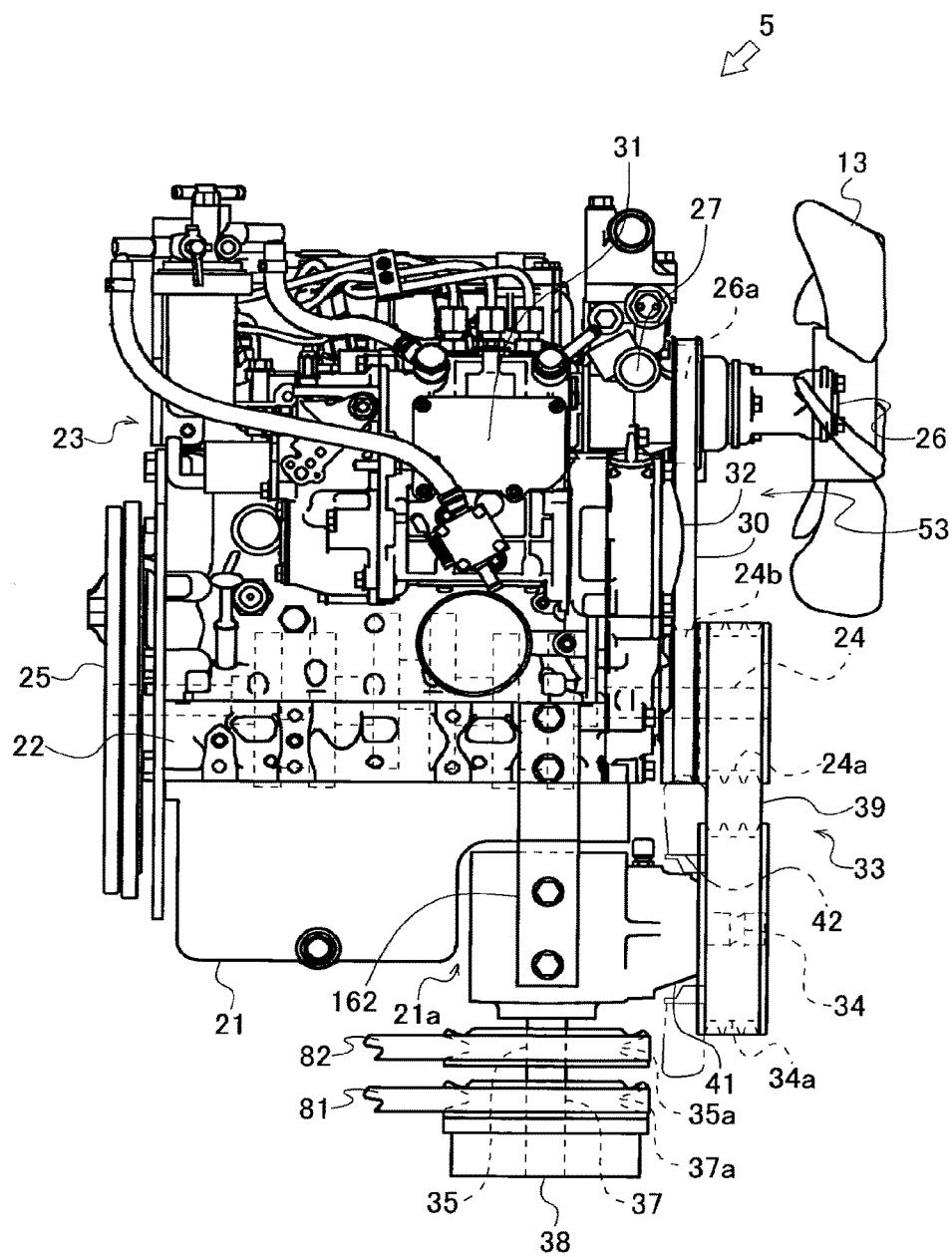
FIG. 28 is a side view showing an engine according to an eighth embodiment of the present invention.
Figure 29:
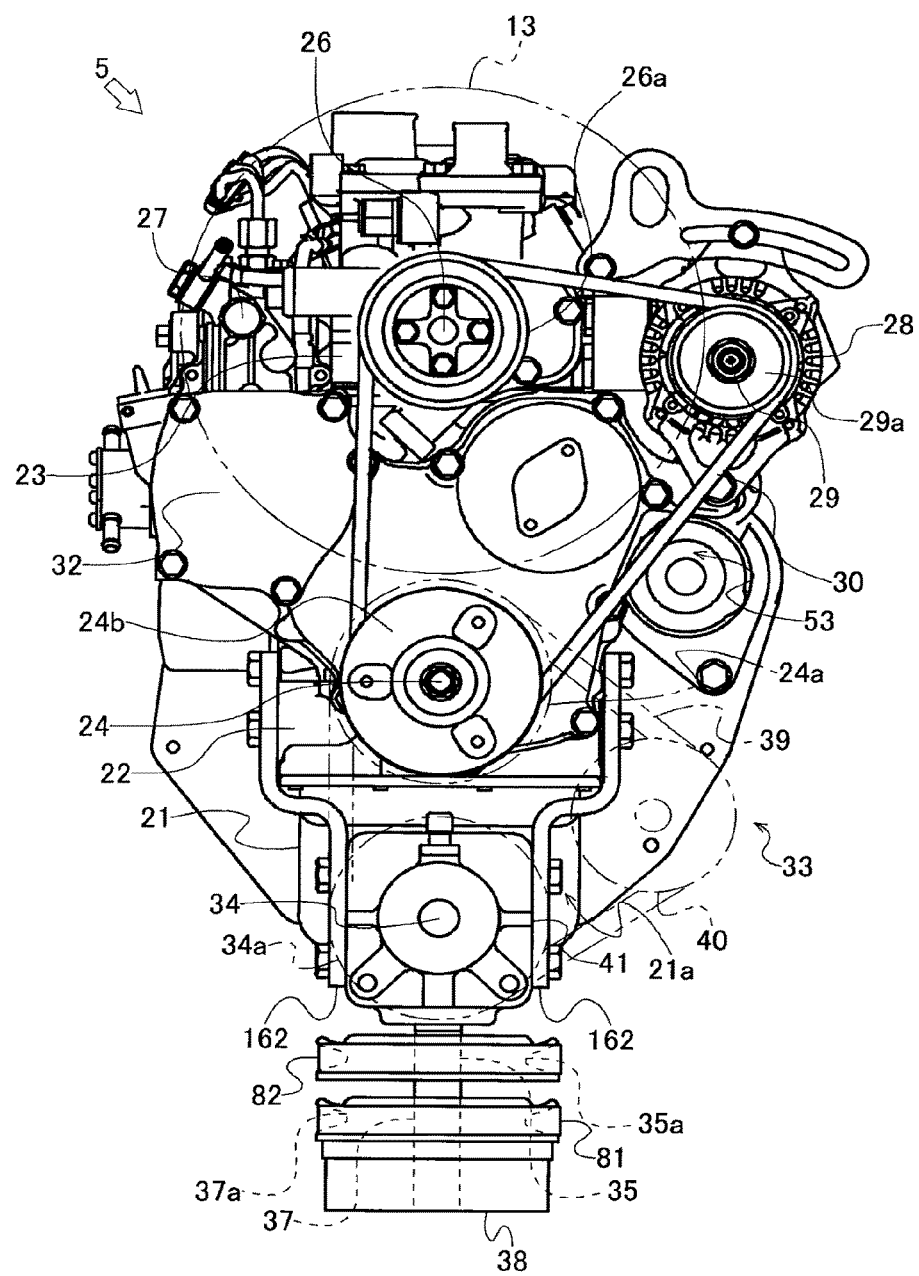
FIG. 29 is a front view showing the engine of FIG. 28.
Figure 30:
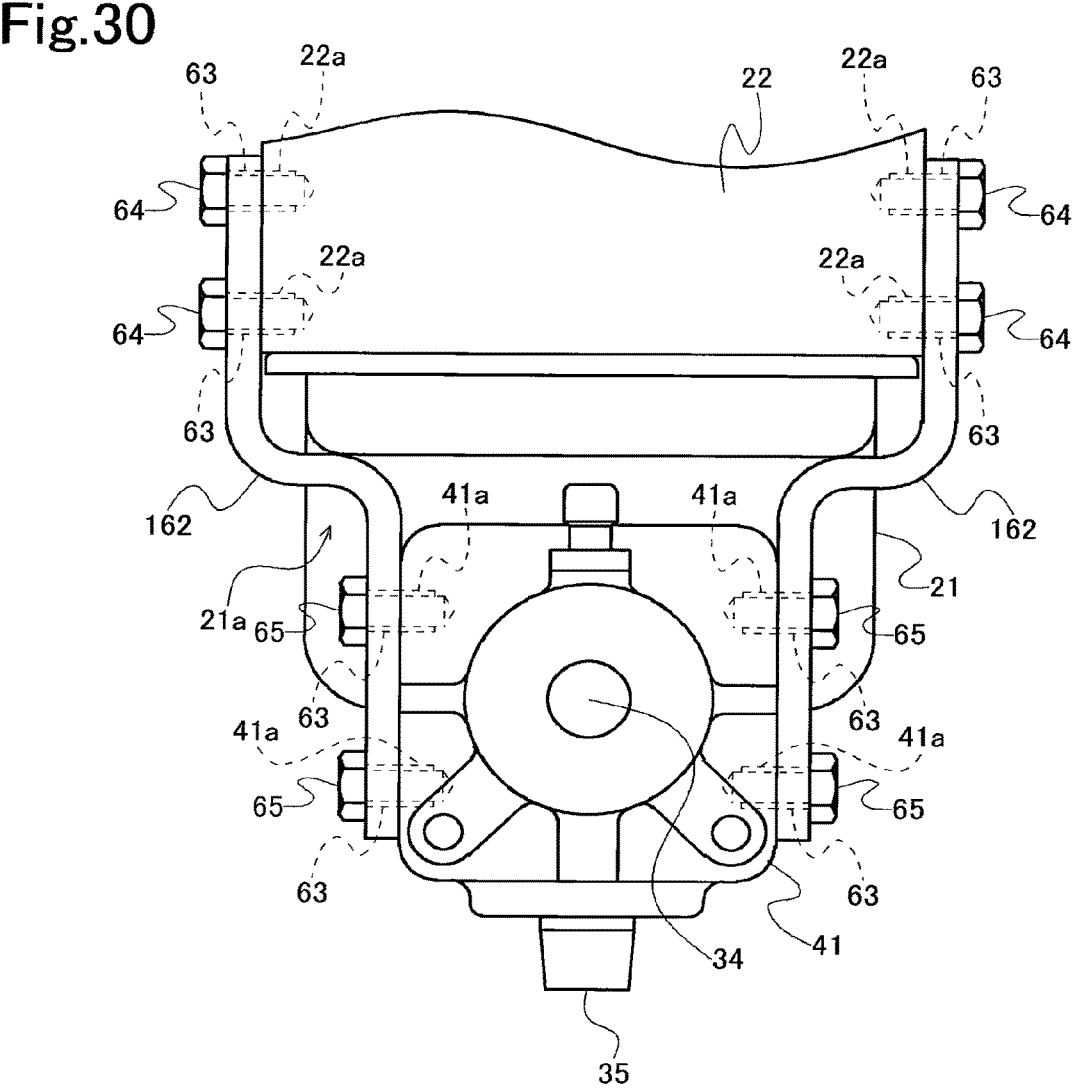
FIG. 30 is a front view showing a bracket of the eighth embodiment of the present invention.

Referring to FIGS. 28 to 30, in the engine 5 of the eighth embodiment, the gearbox 41 is attached to the cylinder block 22 with a pair of right and left brackets 162 interposed therebetween. Because the pair of right and left bracket 162 is formed in a substantially bilaterally symmetric manner, one of the brackets 162 will be described unless otherwise state.

The bracket 162 is used to attach the gearbox 41 to the cylinder block 22. The brackets 162 are extended upward from both right and left sides of the gearbox 41. The bracket 162 includes a plate-like member which is formed into a substantial crank shape in the front view. Specifically, the bracket 162 is extended upward (vertical direction) along the side face of the gearbox 41, vertically folded along the lower surface of the oil pan 21 in the notch 21a, and extended outward (horizontal direction). Then the bracket 162 is substantially vertically folded along the side face of the cylinder block 22 and extended upward (vertical direction).

Plural bolt holes 63 (in the eighth embodiment, four bolt holes) are vertically made at appropriate intervals in the bracket 162. Each two bolt holes 63 are made across the outward (horizontal direction) extended portion of the bracket 162. That is, each two bolt hole 63 are made on the side of the cylinder block 22 and the side of the gearbox 41.

On the other hand, in the side face of the cylinder block 22, two bolt holes 22a are made at positions overlapping the two bolt holes 63 on the upper side of the bracket 162 in the lateral view. In the side face of the gearbox 41, two bolt holes 41a are made at positions overlapping the two bolt holes 63 on the lower side of the bracket 162 in the lateral view.

In the above-described configuration, the gearbox 41 is attached to the cylinder block 22 with the bracket 162 interposed therebetween. That is, bolts 64 are screwed from the outside while the two bolt holes 63 on the upper side of the bracket 162 and the bolt holes 22a of the cylinder block 22 are matched with one another, which allows the bracket 162 to be attached to the cylinder block 22. Then bolts 65 are screwed from the outside while the two bolt holes 63 on the lower side of the bracket 162 and the bolt holes 41a of the gearbox 41 are matched with one another, which allows the bracket 162 to be attached to the gearbox 41.

The shape of the bracket 162 is not limited to the eighth embodiment. For example, the bracket 162 is formed by folding the bracket 162 into a substantial U-shape in the front view, the both side plates are attached to the cylinder block 22, and a bottom plate may be attached to the upper surface (or lower surface) of the gearbox 41. The numbers of bolts 64 and bolt holes 22a, 41a, and 63 are not limited to the eighth embodiment.

Thus, the engine 5 of the eighth embodiment includes the crankshaft 24 which is disposed in the substantially horizontal direction; the belt mechanism 33; the input shaft 34 which is disposed below the crankshaft 24 in parallel with the crankshaft 24, the input shaft 34 receiving the power from the crankshaft 24 through the belt mechanism 33; the first output shaft 35 which is disposed perpendicular to the crankshaft 24 to supply the power from the input shaft 34; the bevel gear 36 which transmits the power of the input shaft 34 to the first output shaft 35; the gearbox 41 which accommodates the input shaft 34, the output shaft 35, and the bevel gear 36 therein; and the bracket 162, wherein the gearbox 41 is attached to the cylinder block 22 of the engine 5 with the bracket 162 interposed therebetween. Therefore, the gearbox 41 is compactly formed to realize the compact engine 5, so that the miniaturization of the vehicle can easily be achieved. The efficiency of the attaching work is improved because the gearbox 41 can previously be attached to the engine 5 to form the modular structure. The gearbox 41 can be attached to the engine 5 with a simple configuration by utilizing the cylinder block 22. The assurance of the attachment is improved because the gearbox 41 is attached to the cylinder block 22 having high rigidity. The gearbox 41 becomes the same vibrating system as the engine 5, which allows the vibration-proofing countermeasure to be simplified to easily achieve the cost reduction.

An engine 5 according to a ninth embodiment of the present invention will be described with reference to FIG. 31.

Figure 31:
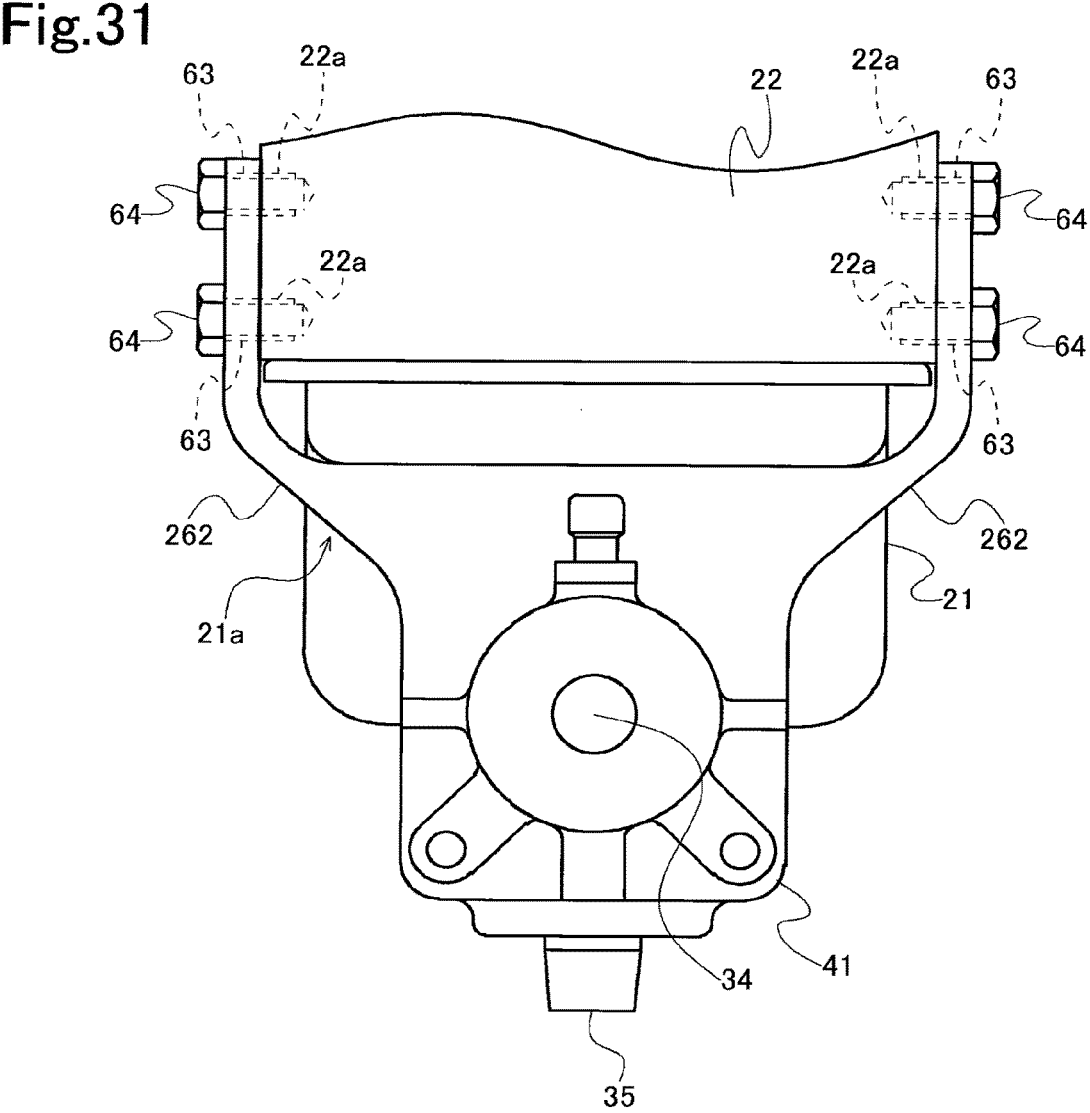
FIG. 31 is a front view showing a bracket according to a ninth embodiment of the present invention.

Referring to FIG. 31, in the engine 5 of the ninth embodiment, the gearbox 41 is attached to the cylinder block 22 with a pair of right and left brackets 262 interposed therebetween, and the bracket 262 and the gearbox 41 are integrally molded. Because the pair of right and left bracket 262 is formed in the substantially bilaterally symmetric manner, one of the brackets 262 will be described unless otherwise state.

The brackets 262 are extended upward from both right and left sides of the gearbox 41. The bracket 262 is integrally molded when the gearbox 41 is molded by casting. The bracket 262 includes a plate-like member which is formed into a substantial J-shape (or substantial L-shape) in the front view. Specifically, the bracket 262 is extended outward (horizontal direction) from the upper portion of the gearbox 41 along the lower face of the oil pan 21 in the notch 21a, and the bracket 262 is substantially vertically folded along the side face of the cylinder block 22 and extended upward (vertical direction).

The plural bolt holes 63 (in the ninth embodiment, two bolt holes) are vertically made at appropriate intervals in the bracket 262. The bolt holes 63 are made on the side of the cylinder block 22.

In the configuration of FIG. 31, the bolts 64 are screwed from the outside while the two bolt holes 63 of the bracket 262 and the bolt holes 22a of the cylinder block 22 are matched with one another, which allows the gearbox 41 to be attached to the cylinder block 22 with the bracket 262 interposed therebetween.

Thus, in the engine 5 of the ninth embodiment, the gearbox 41 and the bracket 262 are integrally molded. The efficiency of the attaching work is improved because the gearbox 41 and the bracket 262 can be attached to the cylinder block 22 at one-time attaching work. The cost reduction can easily be achieved because the integrally molding decreases the number of components.

An engine 5 according to a tenth embodiment of the present invention will be described with reference to FIG. 32.

Figure 32:
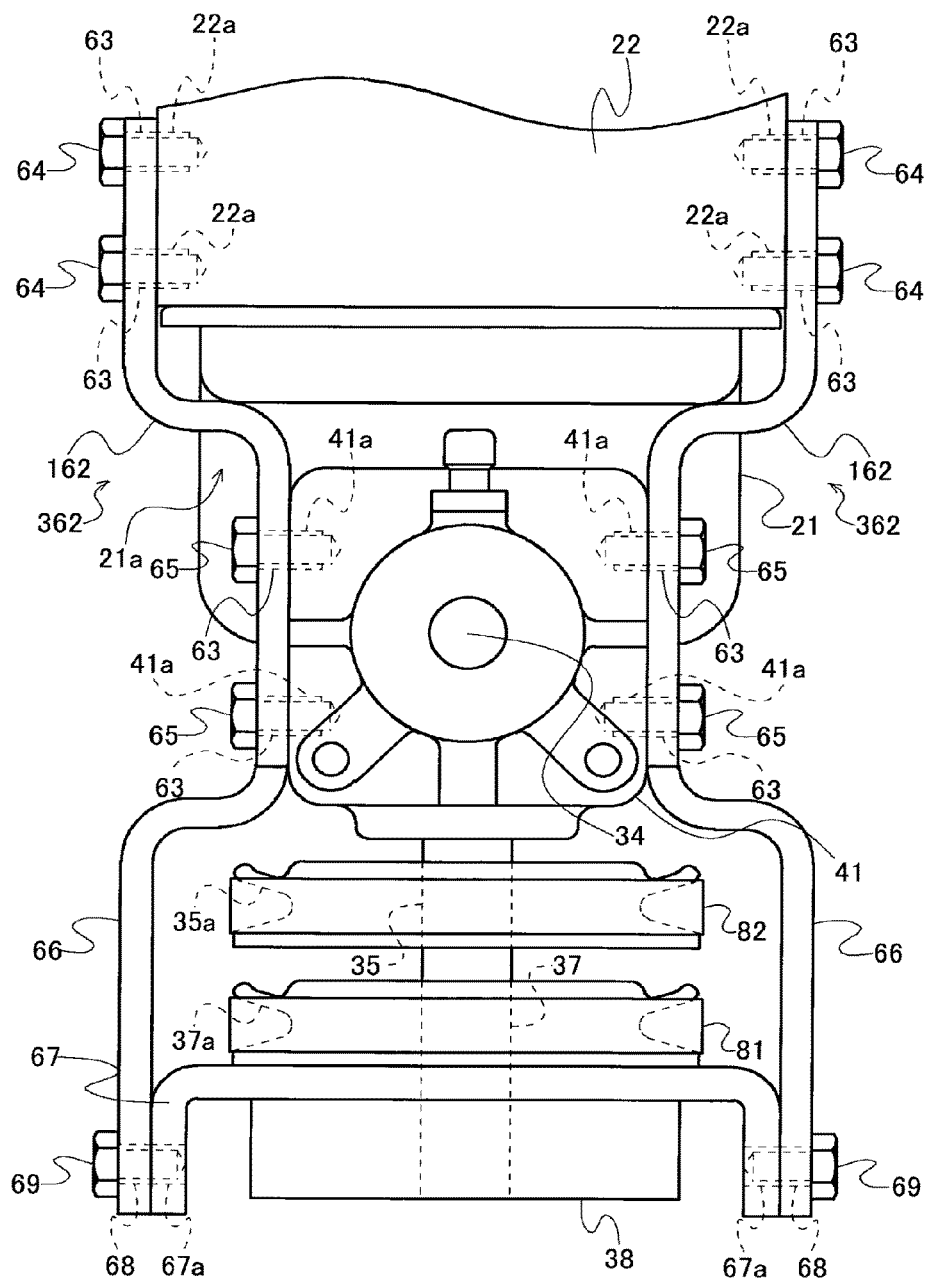
FIG. 32 is a front view showing a bracket according to a tenth embodiment of the present invention.

Referring to FIG. 32, in the engine 5 of the tenth embodiment, the gearbox 41 is attached to the cylinder block 22 with a pair of right and left brackets 362 interposed therebetween, and the pair of right and left brackets 362 includes a pair of brackets 162 with which the gearbox 41 is attached and a pair of right and left brackets 66 with which the electromagnetic clutch 38 is attached. Because the pair of right and left bracket 362 is formed in a substantially bilaterally symmetric manner, one of the brackets 362 will be described unless otherwise state.

The brackets 362 are disposed on both sides of the gearbox 41. The bracket 66 is fixed to the lower end portion of the bracket 162 (or integrally molded along with the bracket 162). The brackets 66 are extended downward from both right and left sides of the gearbox 41. The bracket 66 includes a plate-like member which is formed into the substantially reversal L-shape (or substantial J-shape) in the front view. Specifically, the bracket 66 is extended outward (horizontal direction) from the lower end portion of the bracket 162, substantially vertically folded, and extended downward (vertical direction). The leading end portion of the extended bracket 66 is located below the electromagnetic clutch 38. That is, the brackets 362 are vertically formed in a substantially symmetric manner in relation to the gearbox 41.

The electromagnetic clutch 38 is disposed between the pair of right and left brackets 66. The electromagnetic clutch 38 is attached to an attaching seat 67. Right and left end portions of the attaching seat 67 are substantially vertically folded downward, and bolt holes 67a are made in the folded portion of the attaching seat 67. On the other hand, in the lower portion of the bracket 66, bolt holes 68 are made at positions overlapping the bolt holes 67a of the attaching seat 67 in the lateral view.

In the configuration of FIG. 32, bolts 69 are screwed from the outside while the bolt holes 67a of the attaching seat 67 of the electromagnetic clutch 38 and the bolt holes 68 of the bracket 66 are matched with one another, which allows the electromagnetic clutch 38 to be attached to the bracket 362.

Thus, the engine 5 of the tenth embodiment includes the electromagnetic clutch 38 which transmits and cuts off the power from the first output shaft 35, and the electromagnetic clutch 38 can be attached to the bracket 362. Therefore, the usability of the engine 5 is improved because the transmission and cutoff of the power from the first output shaft 35 to the drive object can be switched. The efficiency of the attaching work is improved because the electromagnetic clutch 38 can previously be attached to the engine 5 to form the modular structure. The electromagnetic clutch 38 can be attached to the engine 5 with a simple configuration by utilizing the bracket 362. The electromagnetic clutch 38 becomes the same vibrating system as the engine 5, which allows the vibration-proofing countermeasure to be simplified to easily achieve the cost reduction.

Figure 33:
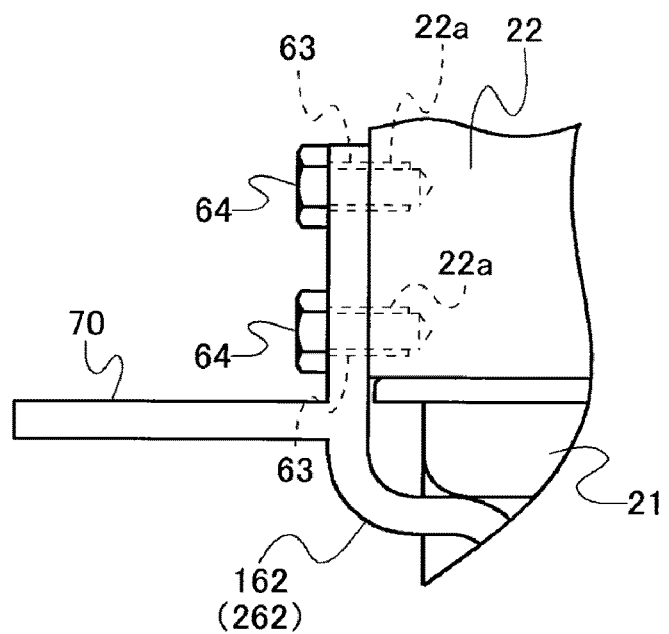
FIG. 33 is a partially enlarged front side view showing a bracket according to a modification of the tenth embodiment of the present invention.

As shown in FIG. 33, the bracket 162 (262) and an engine leg 70 which supports the engine 5 can integrally molded. Therefore, the efficiency of the attaching work is improved because the engine leg 70 and the bracket 162 (262) can be attached to the cylinder block 22 by the one-time attaching work, and the cost reduction is easily achieved because the number of components is decreased.

An engine 5 according to an eleventh embodiment of the present invention will be described with reference to FIGS. 34 and 35.

Figure 34:
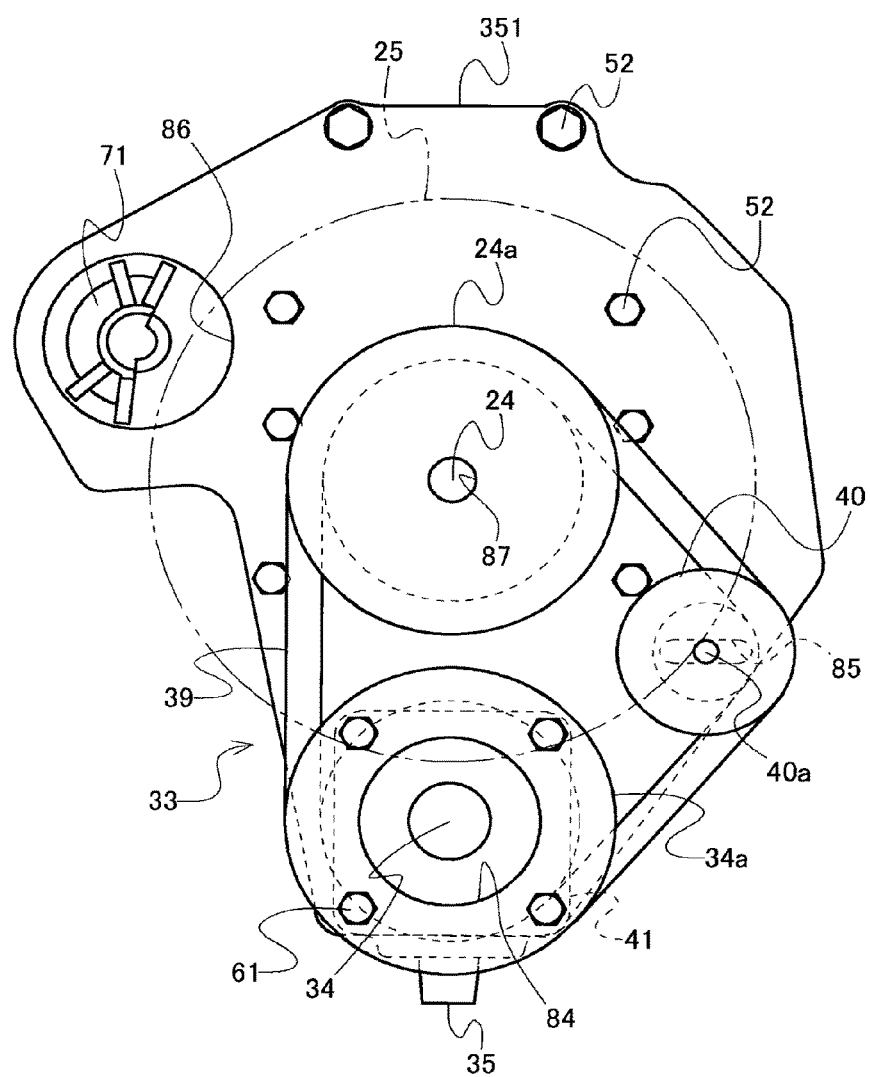
FIG. 34 is a rear view showing a state in which a gearbox is attached to an engine while a bracket is interposed therebetween in an eleventh embodiment of the present invention.
Figure 35:
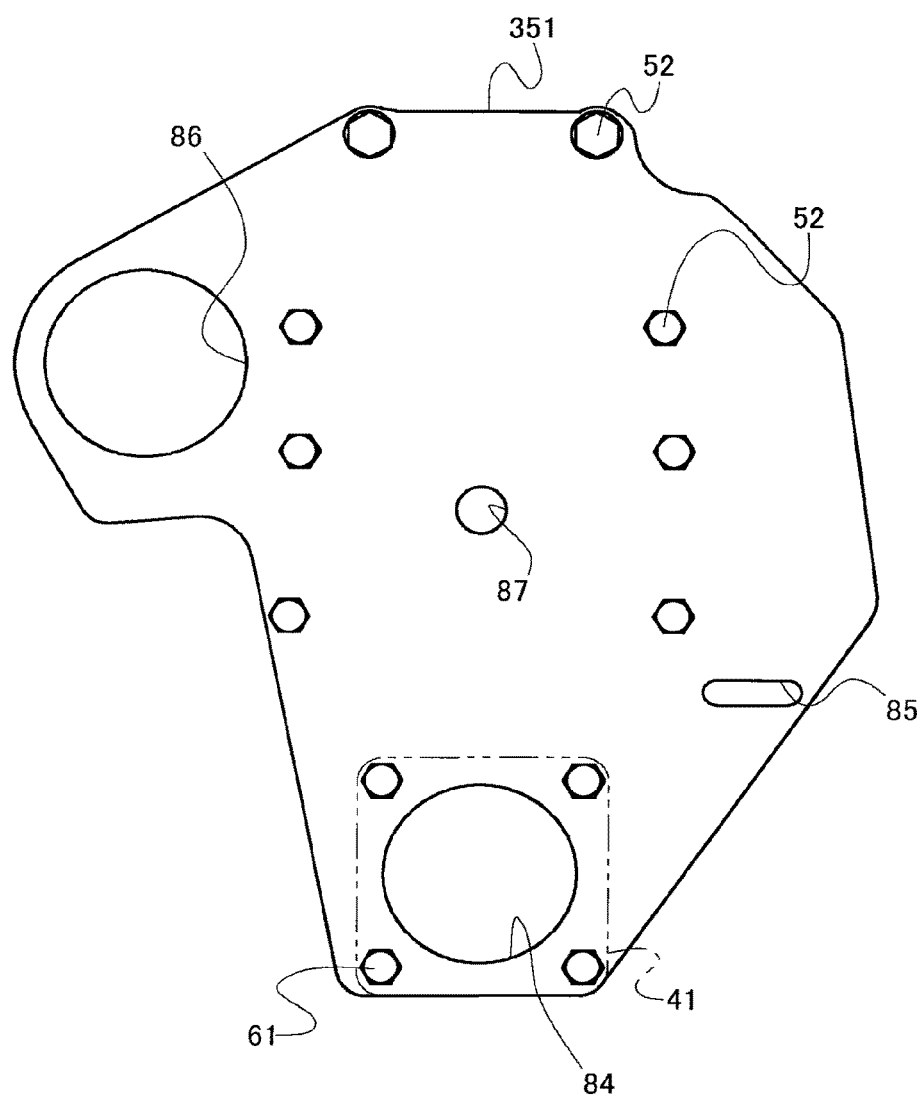
FIG. 35 is a rear view showing the bracket of the eleventh embodiment of the present invention.

Referring to FIGS. 34 and 35, in the engine 5 of the eleventh embodiment, a bracket 351 is a plate-like member which is used to attach the gearbox 41 to the rear face (side on which the flywheel 25 is disposed in the front and rear faces of the engine 5) of the engine 5. The bracket 351 is securely and detachably attached to the rear face (see FIG. 2) of the cylinder block 22 by the plural bolts 52 (in the eleventh embodiment, eight bolts). Each four bolts 52 are disposed across the crankshaft 24. The bracket 351 is vertically extended from the crankshaft 24, the upper left portion of the bracket 351 is extended leftward, and the right portion of the bracket 351 is formed into a substantially arc shape in the rear view.

A through-hole 87 is made in the substantially central portion of the bracket 351, and the crankshaft 24 pierces through the through-hole 87. An attaching hole 84 is made below the through-hole 87 in the lower portion of the bracket 351 in order to attach the gearbox 41. The attaching hole 84 is formed into a shape (substantially circular shape) in which the gearbox 41 is fitted. The attaching hole 84 is disposed at a position where the crosswise center of the attaching hole 84 is matched with the crankshaft 24, and therefore the gearbox 41 is disposed at a position where the crosswise center (input shaft 34) of the gearbox 41 is matched with the crankshaft 24. The gearbox 41 is securely and detachably attached to the front face of the bracket 351 by plural bolts 61 (in the eleventh embodiment, four bolts) while attached into the attaching hole 84.

A long hole 85 is made in the crosswise direction in the right portion (between the crankshaft 24 and the input shaft 34) of the bracket 351, and the pulley shaft 40a of the tension pulley 40 is slidably disposed in the long hole 85. The tension pulley 40 constitutes the tension member which imparts the tension to the belt 39, and the tension pulley 40 is biased rightward by the elastic member (not shown) such as spring while abutting on the inner peripheral side of the belt 39.

An attaching hole 86 is made in the upper left portion (obliquely upper left of the crankshaft 24) of the bracket 351 in order to attach the starter motor 71 for starting the engine 5. The attaching hole 86 is made into a shape (substantially circular shape) in which the starter motor 71 is fitted.

Thus, the engine 5 of the eleventh embodiment includes the crankshaft 24 which is disposed in the substantially horizontal direction; the flywheel 25 which is disposed on one of sides of the engine 5; the belt mechanism 33; the input shaft 34 which is disposed below the crankshaft 24 in parallel with the crankshaft 24, the input shaft 34 receiving the power from the crankshaft 24 through the belt mechanism 33; the first output shaft 35 which is disposed perpendicular to the crankshaft 24 to supply the power from the input shaft 34; the bevel gear 36 which transmits the power of the input shaft 34 to the first output shaft 35; the gearbox 41 which accommodates the input shaft 34, the output shaft 35, and the bevel gear 36 therein; and the bracket 351, wherein the gearbox 41 is attached onto the side of the flywheel 25 of the engine 5 while the bracket 351 is interposed between the gearbox 41 and the flywheel 25. Therefore, the gearbox 41 is compactly formed to realize the compact engine 5, so that the miniaturization of the vehicle can easily be achieved. The efficiency of the attaching work is improved because the gearbox 41 can previously be attached to the engine 5 to form the modular structure. In a case where the drive object is disposed on the side of the flywheel 25 of the engine 5, the transmission distance from the first output shaft 35 to the drive object can be shortened, so that the power can efficiently be transmitted from the output shaft 35 to the drive object. The gearbox 41 becomes the same vibrating system as the engine 5, which allows the vibration-proofing countermeasure to be simplified to easily achieve the cost reduction.

A starter motor 71 for starting the engine 5 is attached to the bracket 351. Therefore, the bracket dedicated to the starter motor 71 is not required, and the number of components is decreased, so that the cost reduction can easily be achieved.

An engine 5 according to a twelfth embodiment of the present invention will be described with reference to FIG. 36.

Figure 36:
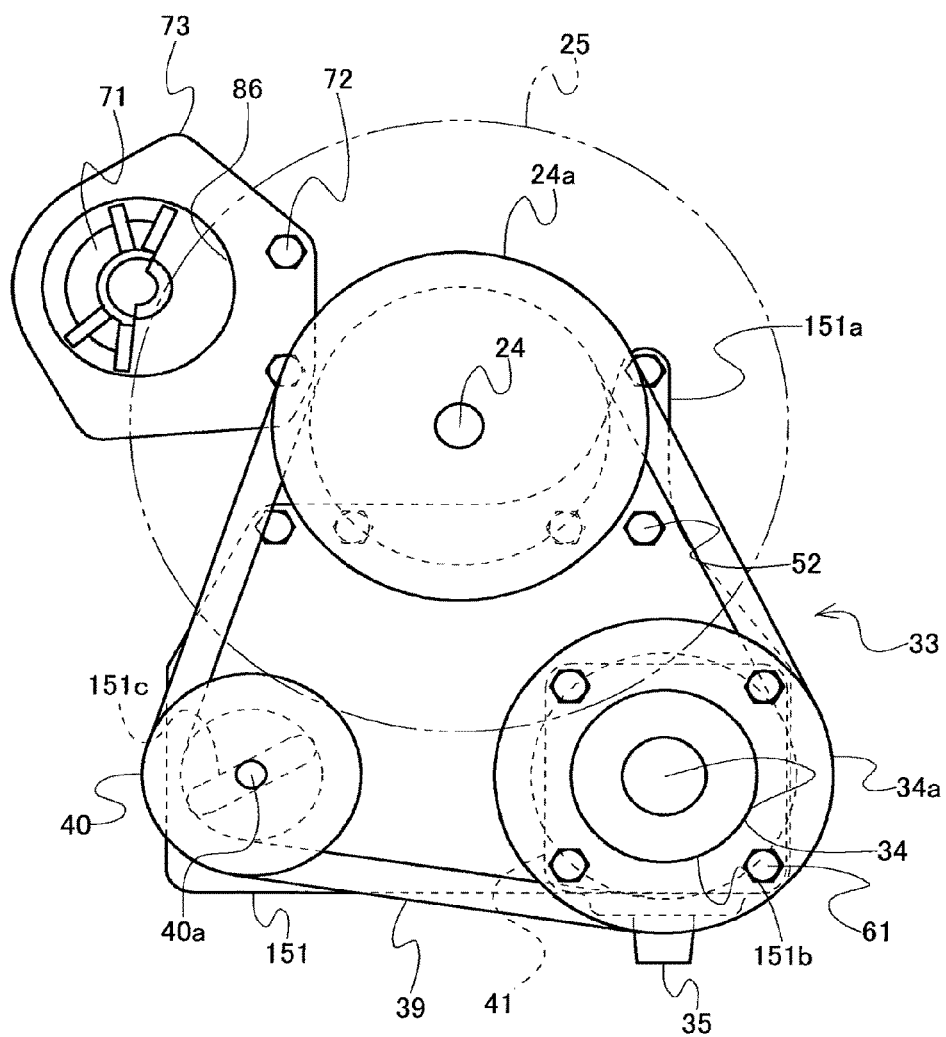
FIG. 36 is a rear view showing a state in which a gearbox is attached to an engine while a bracket is interposed therebetween in a twelfth embodiment of the present invention.

In the engine 5 of the twelfth embodiment, as shown in FIG. 36, the gearbox 41 is attached to the rear face of the engine 5 with the bracket 151 interposed therebetween. The bracket 151 is the plate-like member which is formed into the substantially reversely trapezoidal shape in the rear view, and the upper right portion of the bracket 151 is extended upward to form the arm portion 151a. The bracket 151 is securely and detachably attached to the rear face (see FIG. 2) of the cylinder block 22 by the plural bolts 52 (in the sixth embodiment, five bolts).

The attaching hole 151b is made in the lower right portion of the bracket 151 in order to attach the gearbox 41. The attaching hole 151b is disposed at the position biased (in the twelfth embodiment, rightward) in the crosswise direction with respect to the crankshaft 24. Therefore, the gearbox 41 is disposed upward as much as possible while avoiding the flywheel 25, which allows the engine 5 to be compactly formed. That is, the height of the engine 5 is lowered, and the minimum road clearance can be lowered when the engine 5 is mounted on the vehicle.

The long hole 151c is made in the obliquely lower left direction in the lower left portion of the bracket 151, and the pulley shaft 40a of the tension pulley 40 is slidably disposed in the long hole 151c. The tension pulley 40 is biased toward the lower left direction by the elastic member (not shown) such as spring while abutting on the inner peripheral side of the belt 39.

A starter motor bracket 73 is disposed at the upper left of the crankshaft 24. The starter motor bracket 73 is a plate-like member which is used to attach the starter motor 71 to the rear face of the engine 5. The attaching hole 86 is made in the starter motor bracket 73, and the starter motor 71 is attached into the attaching hole 86. The starter motor bracket 73 is securely and detachably attached to the rear face of the cylinder block 22 by plural bolts 72 (in the twelfth embodiment, two bolts).

The starter motor 71 and the alternator are disposed at the left with respect to the crankshaft 24 while the gearbox 41 is disposed at the right with respect to the crankshaft 24. That is, the gearbox 41 is disposed across the crankshaft 24 from the engine accessories (such as starter motor 71 and the alternator) which are of the heavy load. Therefore, because the right and left weight balance is stabilized in the engine 5, the vibration of the engine 5 is reduced and the balance is established in the vehicle.

Thus, in the engine 5 of the twelfth embodiment, the gearbox 41 is disposed while biased in the horizontal direction (one of the right and left) with respect to the crankshaft 24. Therefore, the gearbox 41 is disposed upward as much as possible while avoiding the flywheel 25, whereby the engine 5 is compactly formed to easily realize the miniaturization of the vehicle.

An engine 5 according to a thirteenth embodiment of the present invention will be described with reference to FIG. 37.

Figure 37:
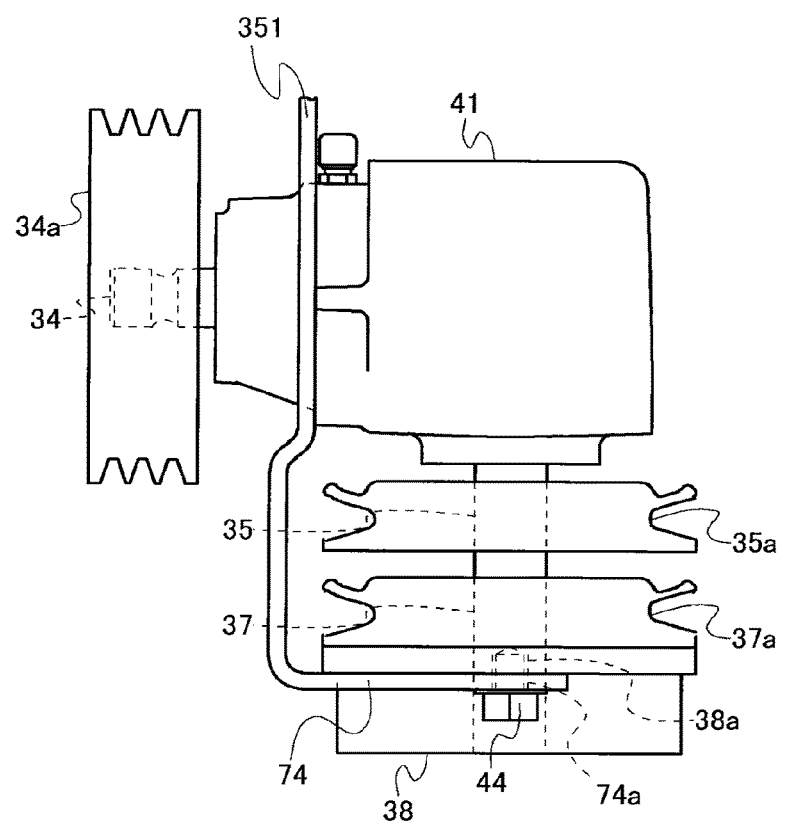
FIG. 37 is a side view showing a state in which an electromagnetic clutch is attached to a bracket according to a thirteenth embodiment of the present invention.

In the engine 5 of the thirteenth embodiment, as shown in FIG. 37, instead of the boss 54 provided in the gearbox 41, an attaching seat 74 is provided in lower portion of the bracket 351 in order to attach the electromagnetic clutch 38. The attaching seat 74 is formed into a substantial L-shape in the lateral view, and the electromagnetic clutch 38 is received by a horizontal portion of the L-shape. Specifically, the attaching seat 74 is folded from the lower end portion of the bracket 351 along the corner portion of the first output pulley 35a and extended rearward (horizontal direction) (extended leftward in FIG. 37). Then the attaching seat 74 is folded downward (vertical direction) and extended. Then the attaching seat 74 is substantially vertically folded toward the electromagnetic clutch 38 and extended forward (horizontal direction) (extended rightward in FIG. 37).

The attaching seat 74 and the bracket 351 are integrally molded. Therefore, because the work for attaching the attaching seat 74 to the bracket 351 is not required, the efficiency of the attaching work is improved. The integrally molding decreases the number of components to easily achieve the cost reduction. Alternatively, the attaching seat 74 and the bracket 351 may separately be molded to attach the attaching seat 74 to the lower portion of the bracket 351.

Plural bolt holes 74a (in the thirteenth embodiment, two bolt holes) are made on right and left sides of the attaching seat 74 (horizontal portion). On the other hand, in the electromagnetic clutch 38, the bolt holes 38a are projected at positions overlapping the bolt holes 74a in the planar view. In the configuration of FIG. 37, the right and left sides of the electromagnetic clutch 38 are placed on the horizontal portion of the attaching seat 74, and the bolts 44 are screwed from below the bolt holes 38a while the bolt holes 74a of the attaching seat 74 and the bolt holes 38a of the electromagnetic clutch 38 are matched with one another in the planar view, which allows the electromagnetic clutch 38 to be attached to the attaching seat 74.

Thus, the engine 5 of the thirteenth embodiment includes the electromagnetic clutch 38 which transmits and cuts off the power from the first output shaft 35, and the electromagnetic clutch 38 can be attached to the bracket 351 (attaching seat 74). Therefore, the usability of the engine 5 is improved because the transmission and cutoff of the power from the first output shaft 35 to the drive object can be switched. The efficiency of the attaching work is improved because the electromagnetic clutch 38 can previously be attached to the engine 5 to form the modular structure. The electromagnetic clutch 38 can be attached to the engine 5 with a simple configuration by utilizing the bracket 351. The electromagnetic clutch 38 becomes the same vibrating system as the engine 5, which allows the vibration-proofing countermeasure to be simplified to easily achieve cost reduction.

A power transmission device 100 according to a fourteenth embodiment of the present invention will be described with reference to FIGS. 38 to 42.

Figure 41:
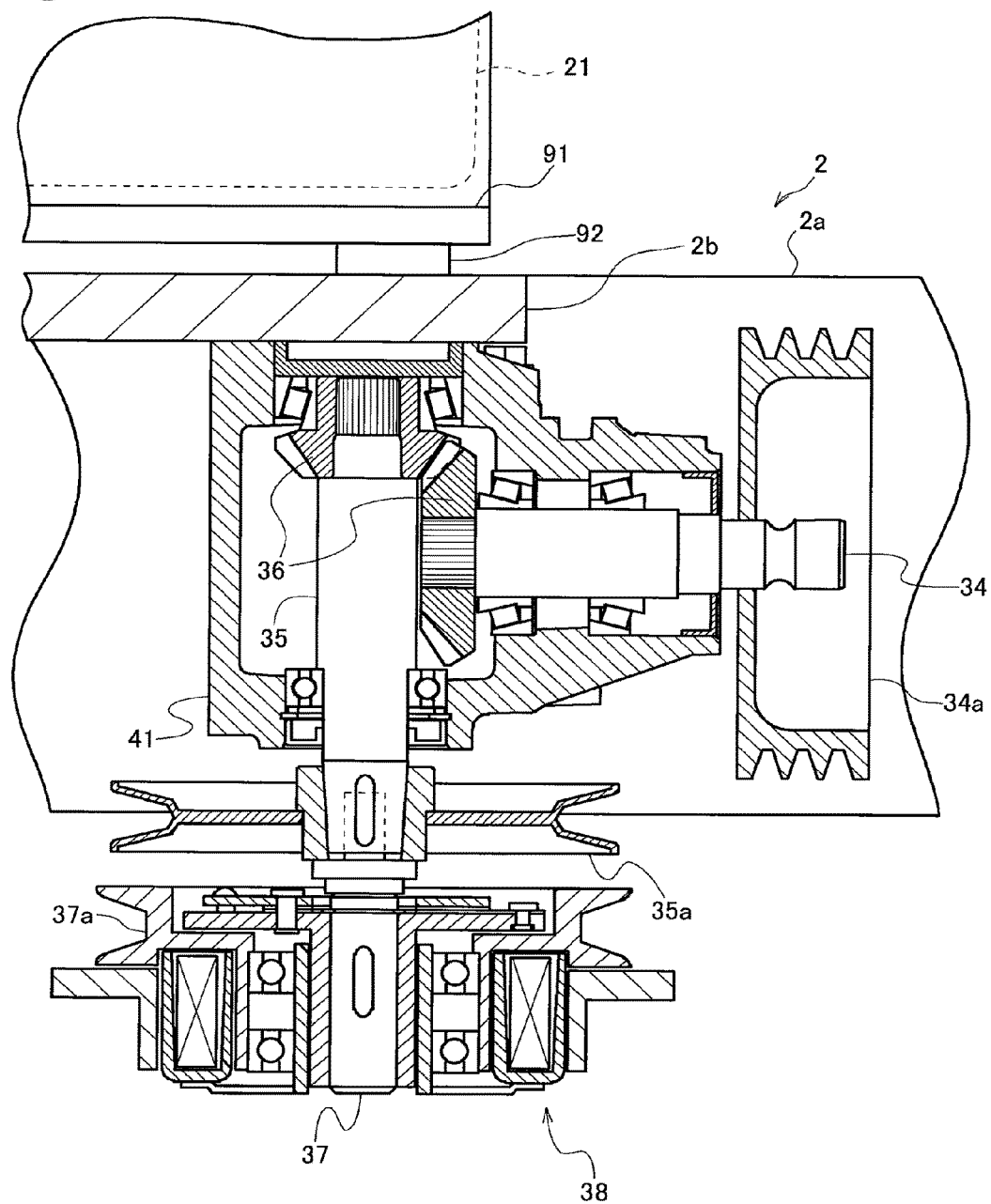
FIG. 41 is a sectional side view showing a gearbox in the power transmission device of the fourteenth embodiment.

Referring to FIG. 41, the power transmission device 100 of the present invention includes the gearbox 41 which is of an embodiment of the power transmission case, and the gearbox 41 accommodates the drive shaft 34, the first driven shaft 35, and the bevel gears 36 and 36 therein. The power from the crankshaft 24 is fed into the drive shaft 34, the first driven shaft 35 supplies the power from the drive shaft 34, and the bevel gears 36 and 36 transmit the power of the drive shaft 34 to the first driven shaft 35.

Figure 39:
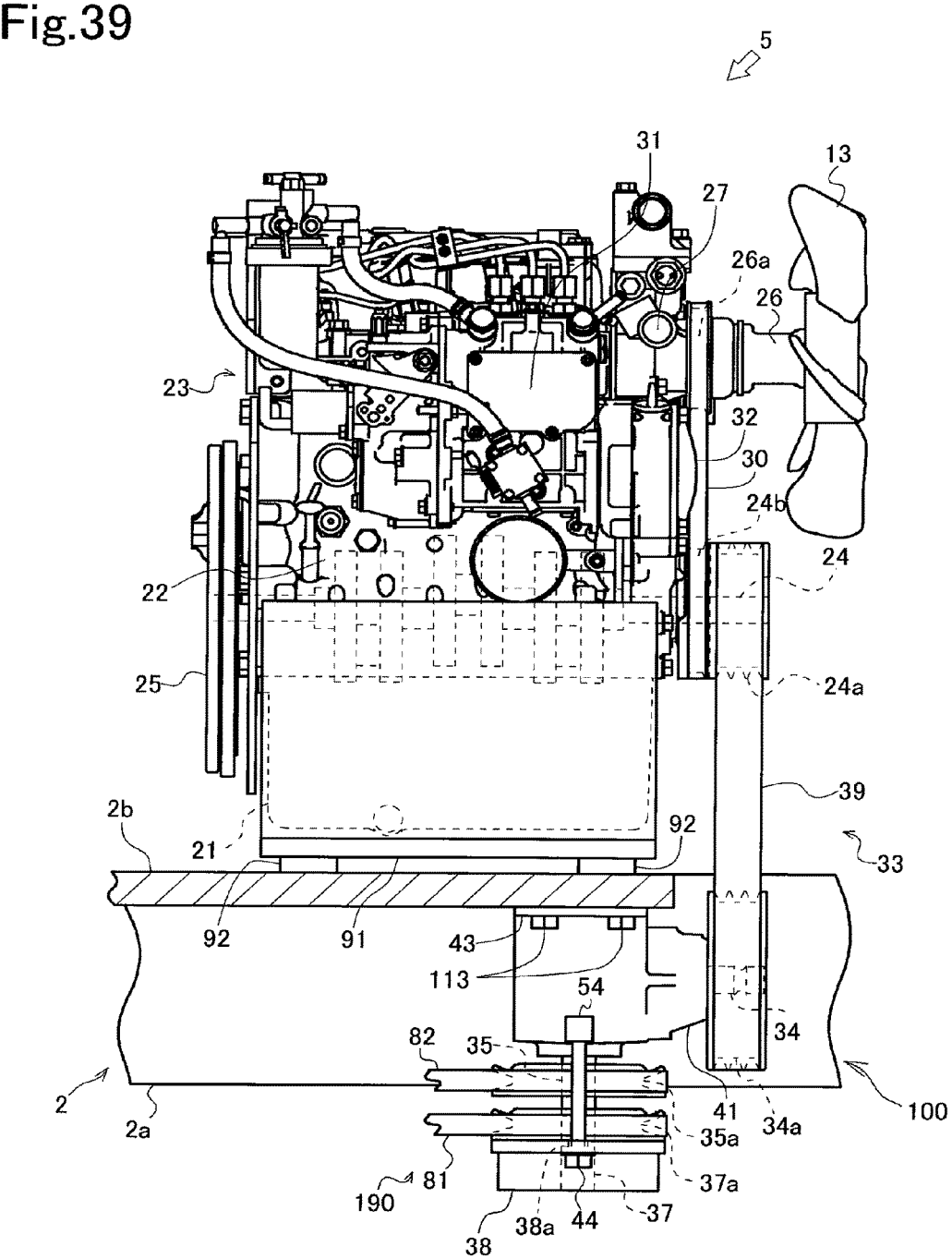
FIG. 39 is a side view showing an engine and the power transmission device in the fourteenth embodiment.
Figure 40:
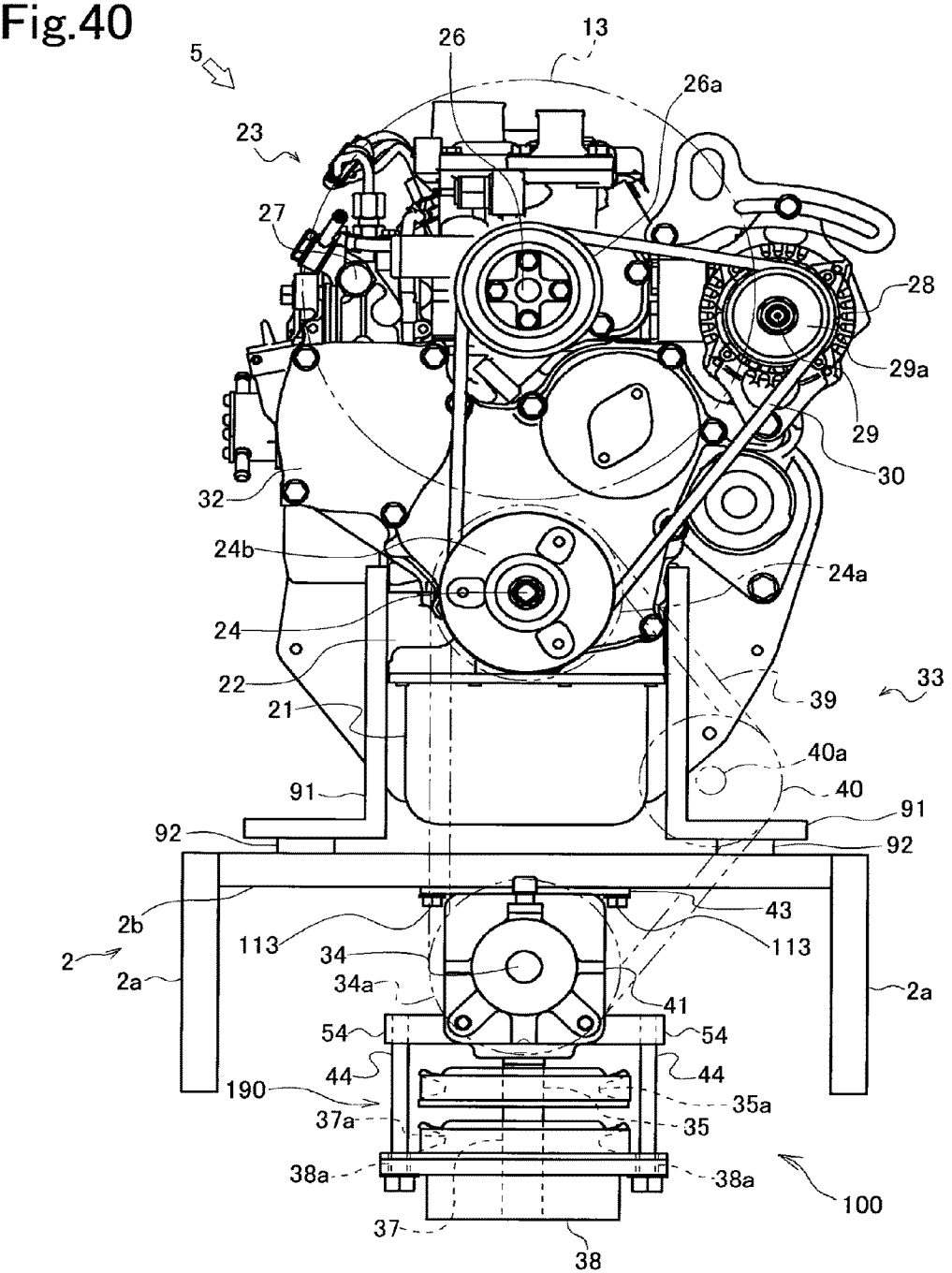
FIG. 40 is a front view showing the engine and the power transmission device of FIG. 39.

Referring to FIGS. 39 and 40, the attaching portion 43 is provided on the top of the gearbox 41. The attaching portion 43 is fixed to (or integrally molded along with the gearbox 41) the top of the gearbox 41, and the right and left end portions of the attaching portion 43 are projected from the right and left side faces of the gearbox 41 in the front view (FIG. 40). The upper surface of the attaching portion 43 and the lower surface of an upper plate 2b of the vehicle frame 2 abut on each other, and bolts 113 are screwed from below in the projected portion of the attaching portion 43, which allows the gearbox 41 to be attached to the vehicle frame 2.

The method for attaching the gearbox 41 to the vehicle frame 2 is not limited to the method of the fourteenth embodiment, but any method may be adopted as long as the gearbox 41 can be attached to the vehicle frame 2.

In the configuration of the fourteenth embodiment, the gearbox 41 is attached to the vehicle frame 2. However, the present invention is not limited thereto. That is, any configuration may be formed as long as the gearbox 41 is attached onto a frame side of the work vehicle 1. Examples of the "frame side" of the work vehicle 1 include the vehicle frame 2, the front axle support case 4a of the front axle support device 4, the rear axle drive case 3a of the rear axle drive device 3, and the transmission case (not shown). The "frame side" of the work vehicle 1 shall mean a member except for the engine 5, and the "frame side" of the work vehicle 1 has the rigidity to an extent in which the gearbox 41 can be supported as a structure of the work vehicle 1.

The drive shaft 34 is disposed below the crankshaft 24 in parallel with the crankshaft 24 (lengthwise horizontal direction). The drive shaft 34 is accommodated in the gearbox 41 so as to be projected from the front portion of the gearbox 41, and the drive shaft 34 is rotatably supported by the gearbox 41 with a bearing interposed therebetween (see FIG. 41).

The drive pulley 34a is fixed to the front end portion of the input shaft 34.

Figure 42:
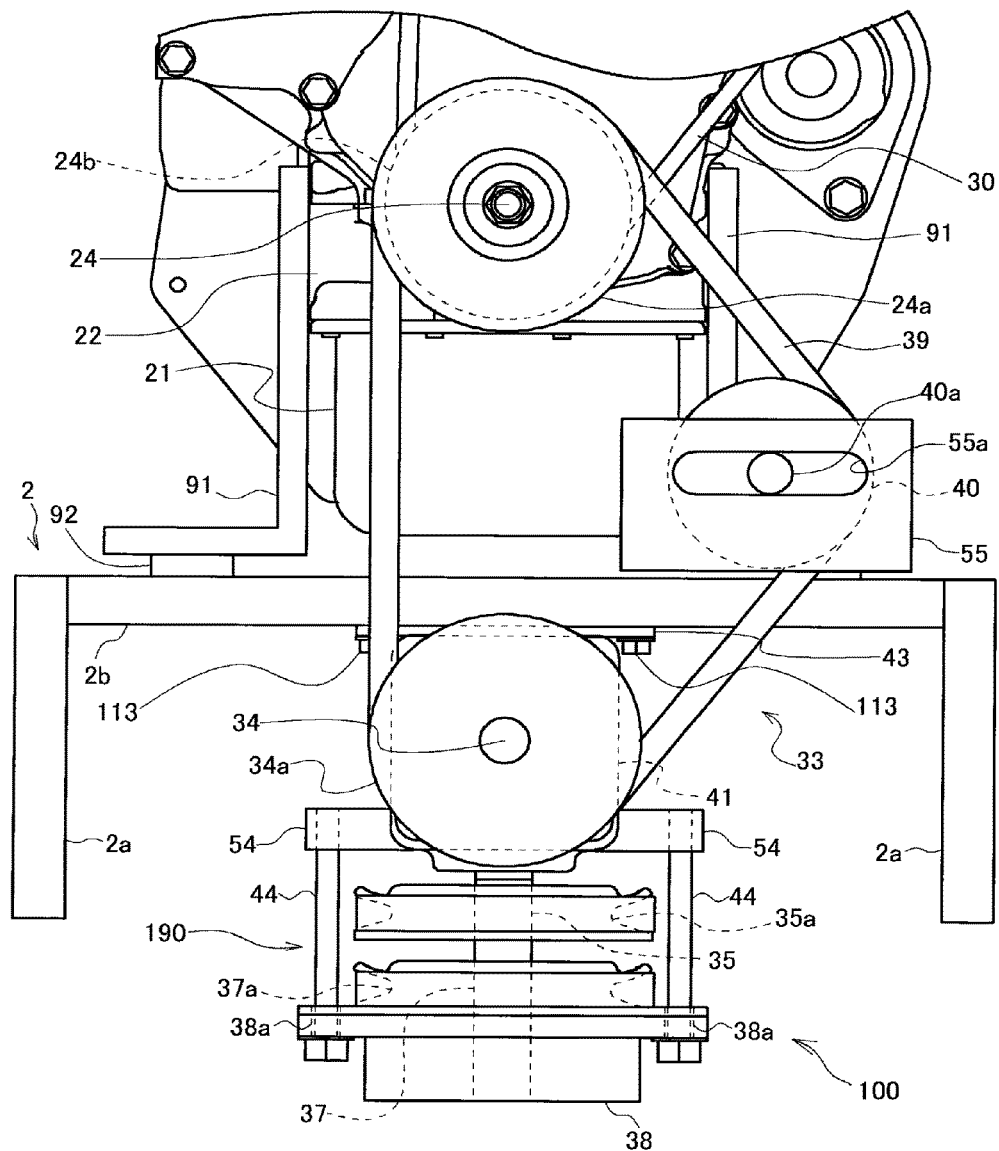
FIG. 42 is a front view showing a belt mechanism in the power transmission device of the fourteenth embodiment.

Referring to FIG. 42, the belt 39 is entrained about the drive pulley 34a of the drive shaft 34 and the first crank pulley 24a of the crankshaft 24. The first crank pulley 24a of the crankshaft 24, the drive pulley 34a of the drive shaft 34, and the belt 39 constitute the belt mechanism 33 which is of an embodiment of the first endless belt mechanism according to the present invention.

The tension pulley 40 abuts on the inner peripheral side of the belt 39, and the tension pulley 40 constitutes the tension member which imparts the tension to the belt 39. In the front view (FIG. 42), the tension pulley 40 is biased rightward by the elastic member (not shown) such as spring, thereby imparting the tension to the belt 39. The tension pulley 40 is attached to the member such as the cylinder block 22 which constitutes the engine 5 while the bracket 55 is interposed between the tension pulley 40 and the member, or the tension pulley 40 is attached to the member such as the vehicle frame 2 which constitutes the work vehicle 1 except for the engine 5 while the bracket 55 is interposed between the tension pulley 40 and the member. The long hole 55a is opened in the bracket 55 while the crosswise direction of the bracket 55 is set at the lengthwise direction of the long hole 55a, and the pulley shaft 40a of the tension pulley 40 is slidably disposed in the long hole 55a.

Referring to FIGS. 39 and 40, the first output shaft 35 is disposed perpendicular (vertical direction) to the crankshaft 24. That is, the first output shaft 35 is also disposed perpendicular to the drive shaft 34. The first output shaft 35 is accommodated in the gearbox 41 so as to be projected from the bottom of the gearbox 41, and the first output shaft 35 is rotatably supported by the gearbox 41 with the bearing interposed therebetween (see FIG. 41).

As shown in FIG. 41, the bevel gears 36 and 36 which are of one embodiment of the gear train of the present invention are used to transmit the power of the drive shaft 34 to the first output shaft 35. In the gearbox 41, one of the bevel gears 36 is fixed to the end portion (rear end portion) of the input shaft 34, and the other bevel gear 36 engaged with one of the bevel gears 36 is fixed to the end portion (upper end portion) of the first driven shaft 35.

The first idler pulley 35a is fixed to the lower end portion of the first driven shaft 35 in the key-fitting manner, and the second driven shaft 37 is coaxially and detachably connected to the first driven shaft 35. The belt 82 is entrained about the first idler pulley 35a and the pulley 83a fixed to an upper end of the input shaft 83 (see FIG. 38).

The second idler pulley 37a is rotatably supported on the second output shaft 37, and the electromagnetic clutch 38 which is of an embodiment of the clutch of the present invention is interposed between the second driven shaft 37 and the second idler pulley 37a. The electromagnetic clutch 38 switches the transmission and cutoff of the power from the second driven shaft 37 to the second idler pulley 37a. When an electric power is supplied to the electromagnetic clutch 38 by manipulation of manipulation means disposed near the driver seat 16, pressure contact of a clutch plate interposed between the second driven shaft 37 and the second idler pulley 37a is performed by an electromagnetic force of a solenoid, thereby transmitting the power. The belt 81 is entrained about the second idler pulley 37a and the input pulley 6a fixed to the upper end of the input shaft 6 (see FIG. 38).

The first idler pulley 35a, the pulley 83a, and the belt 82 and the second idler pulley 37a, the input pulley 6a, and the belt 81 constitute the belt mechanism 190 which is of an embodiment of the second endless belt mechanism according to the present invention.

The clutch is not limited to the electromagnetic clutch 38. For example, a hydraulic clutch may be used as the clutch.

Referring to FIGS. 39 and 40, the bosses 54 are provided in the right and left side faces of the gearbox 41 in order to attach the electromagnetic clutch 38. The thread groove is formed in the inner peripheral surface of the boss 54. In the electromagnetic clutch 38, the bolt holes 38a are projected at the positions overlapping the bosses 54 in the planar view.

In the configuration of FIGS. 39 and 40, the bolts 44 are screwed from the bottom of the bolt holes 38a while the bosses 54 of the gearbox 41 and the bolt holes 38a of the electromagnetic clutch 38 are matched with one another in the planar view, which allows the electromagnetic clutch 38 to be attached to the gearbox 41. The configuration in which the electromagnetic clutch 38 is attached to the gearbox 41 is not limited to the configuration of the fourteenth embodiment.

The drive shaft 34, the first driven shaft 35, the second driven shaft 37, the belt mechanism 33, the bevel gears 36 and 36, the belt mechanism 190, and the gearbox 41 constitute the power transmission device 100 which is of an embodiment of the power transmission device according to the present invention.

Figure 38:
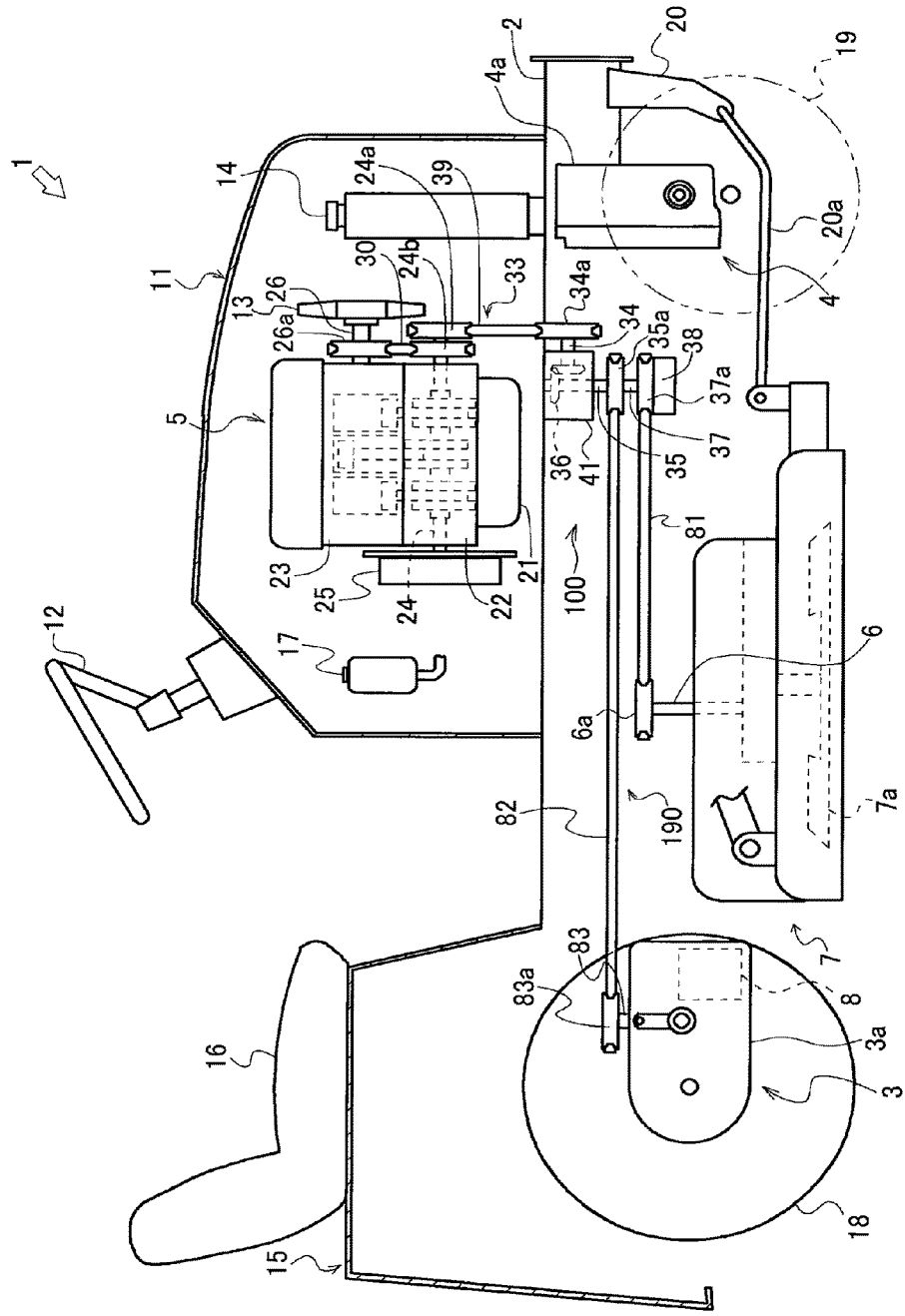
FIG. 38 is a side view showing a work vehicle provided with a power transmission device according to a fourteenth embodiment of the present invention.

In the engine 5 having the above-described configuration, as shown in FIGS. 39 and 40, the power of the crankshaft 24 is transmitted to the drive shaft 34 through the first crank pulley 24a, the belt 39, and the drive pulley 34a. As shown in FIG. 41, the power of the drive shaft 34 is transmitted to the first driven shaft 35 through the bevel gears 36 and 36. As shown in FIG. 38, the power of the first driven shaft 35 is transmitted to a hydraulic pump (not shown) through the first idler pulley 35a, the belt 82, the pulley 83a, and the input shaft 83, thereby driving the hydraulic motor 8. The power of the first driven shaft 35 is transmitted to the second driven shaft 37, the second idler pulley 37a, the belt 81, the input pulley 6a, and the input shaft 6, thereby driving the rotary blade 7a of the mower 7.

Thus, the power of the crankshaft 24 disposed while the lengthwise direction of the crankshaft 24 is set at the horizontal direction can be transmitted to the input shafts 83 and 6 disposed while the lengthwise directions of the input shafts 83 and 6 are set at the vertical direction.

Thus, the power transmission device 100 of the fourteenth embodiment includes the gearbox 41 which is attached to the work vehicle 1; the drive shaft 34 which is disposed in parallel with the horizontal crankshaft 24 of the engine 5 mounted on the work vehicle 1, the drive shaft 34 being accommodated in the gearbox 41; the first and second driven shafts 35 and 37 which are disposed perpendicular to the crankshaft 24, the first and second driven shafts 35 and 37 being accommodated in the gearbox 41; the bevel gear 36 and 36 which are accommodated in the gearbox 41 to transmit the power of the drive shaft 34 to the driven shaft 35 and 37; the belt mechanism 33 which is interposed between the crankshaft 24 and the drive shaft 34 to transmit the power of the crankshaft 24 to the drive shaft 34; and the belt mechanism 190 which is interposed between the first and second driven shafts 35 and 37 and a vertical input shafts 6 and 83 of the mower 7 or the rear axle drive device 3 to transmit the powers of the first and second driven shafts 35 and 37 to the input shafts 6 and 83, the mower 7 or the rear axle drive device 3 being attached to the work vehicle 1.

Therefore, the belt 82 and belt 39 are not twisted while assembled in the work vehicle 1, so that the shortening of the serviceable lifetimes of the belt 82 and belt 39 can be prevented. The need to twist the belt 82 and belt 39 does not arise in assembling the belt 82 and belt 39 in the work vehicle 1, so that the improvement of the work efficiency can be achieved. Additionally, the gearbox 41 is not directly attached to the engine 5, so that the generation of trouble with the power transmission device 100 caused by the vibration of the engine 5 can be prevented.

The gearbox 41 is separated from the engine 5, and the gearbox 41 is attached to the vehicle frame 2. Therefore, the need to replace the gearbox 41 does not arise when the engine 5 is replaced for another engine, so that the versatility of the power transmission device 100 can be improved.

The gearbox 41 of the fourteenth embodiment is attached to the vehicle frame 2 of the work vehicle 1.

Therefore, the gearbox 41 can be attached to the work vehicle 1 with a simple configuration by utilizing the vehicle frame 2. The power transmission device 100 is attached to the vehicle frame 2 having the high rigidity, whereby the power transmission device 100 can more strongly be attached to the work vehicle 1.

The belt mechanism 190 includes the electromagnetic clutch 38 which connects and disconnects the transmission of the power from the second driven shaft 37 to the input shaft 6.

Therefore, the usability of the engine 5 is improved because the transmission and cutoff of the power to the mower 7 which is of the drive object of the engine 5 can be switched.

The electromagnetic clutch 38 is attached to the gearbox 41.

Therefore, the electromagnetic clutch 38 becomes the same vibrating system as the gearbox 41, which allows the vibration-proofing countermeasure to be simplified to easily achieve the cost reduction.

In the fourteenth embodiment, the first driven shaft 35 and the second driven shaft 37 are separately formed. However, the present invention is not limited thereto, but the first driven shaft 35 and the second driven shaft 37 may be integrally formed (in one driven shaft).

In the fourteenth embodiment, the power transmission device 100 includes the two pulleys (first idler pulley 35a and second idler pulley 37a) which supply the power. However, the present invention is not limited thereto, but the power transmission device 100 may include one or at least three pulleys.

In the fourteenth embodiment, the power transmission device 100 includes the electromagnetic clutch 38. However, the present invention is not limited thereto, but the power transmission device 100 may include plural electromagnetic clutches 38.

In the fourteenth embodiment, the power transmission device 100 transmits the power to the rear axle drive device 3 to drive the rear wheels 18 and 18. However, the present invention is not limited thereto, but the power transmission device 100 may drive the front wheels 19 and 19 or the power transmission device 100 may drive the front wheels 19 and 19 and the rear wheels 18 and 18.

A power transmission device 100 according to a fifteenth embodiment of the present invention will be described with reference to FIG. 43.

Figure 43:
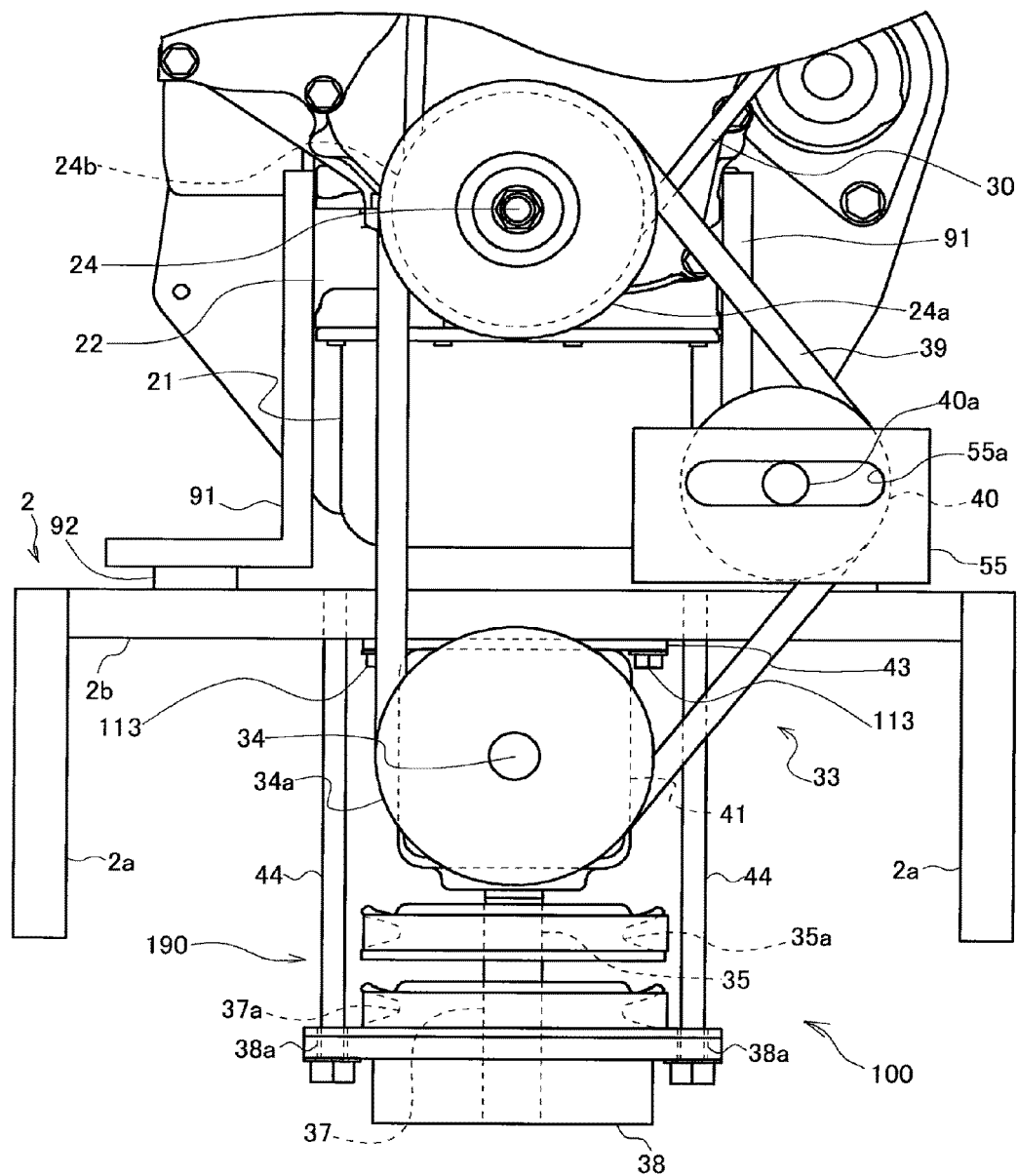
FIG. 43 is a front view showing a power transmission device according to a fifteenth embodiment of the present invention.

Referring to FIG. 43, in the fifteenth embodiment, the electromagnetic clutch 38 is fixed to not the gearbox 41 but the vehicle frame 2. In the fifteenth embodiment, the need to provide the bosses 54 in the gearbox 41 does not arise, but the bolts 44 can be crewed from below the bolt holes 38a to attach the electromagnetic clutch 38 to the upper plate 2b of the vehicle frame 2.

The method for fixing the electromagnetic clutch 38 to the vehicle frame 2 is not limited thereto.

A power transmission device 100 according to a sixteenth embodiment of the present invention will be described with reference to FIG. 44.

Figure 44:
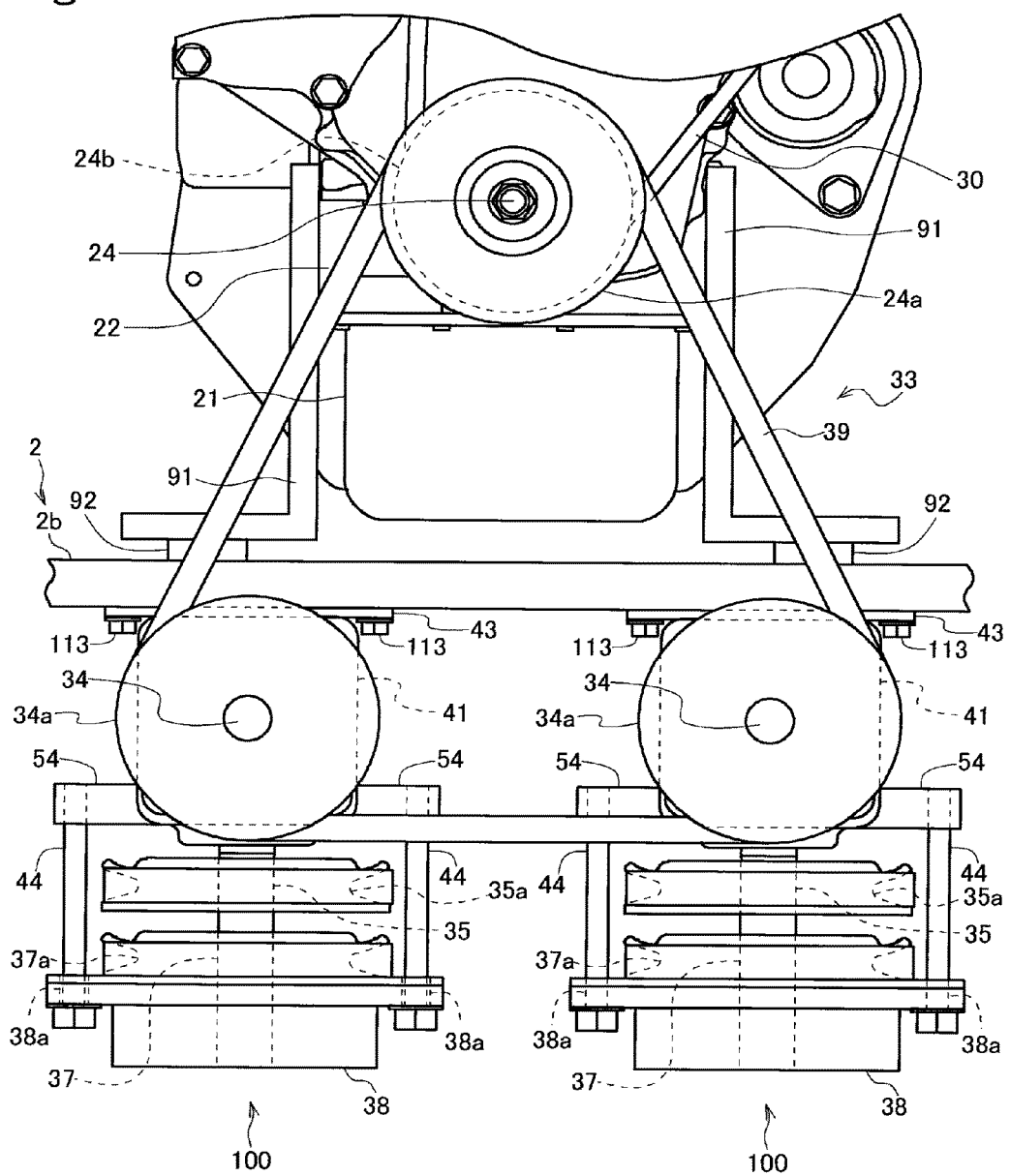
FIG. 44 is a front view showing a power transmission device according to a sixteenth embodiment of the present invention.

Referring to FIG. 44, in the sixteenth embodiment, the work vehicle 1 includes plural pieces (in the sixteenth embodiment, two pieces) of power transmission device 100. The first crank pulley 24a of the crankshaft 24 is shared by the two pieces of power transmission device 100, the belt 39 is entrained about the first crank pulley 24a and the drive pulleys 34a and 34a, and the power of the crankshaft 24 is transmitted to the drive pulleys 34a and 34a by the belt 39.

In the configuration of FIG. 44, the number of revolutions of each piece of power transmission device 100 can be set at the desired number of revolutions by changing a diameter of the drive pulley 34a of the power transmission device 100. Therefore, the optimum number of revolutions can be set in the rear axle drive device 3 or the mower 7 which is of the work device, and the working efficiency can be improved.

The present invention is not limited to the configuration of FIG. 44 in which the two pieces of power transmission device 100 are provided, but at least three pieces of power transmission device 100 may be provided. The plural belts 39 are provided, and each drive pulley 34a may be driven by the independent belt 39.

A power transmission device 100 according to a seventeenth embodiment of the present invention will be described with reference to FIG. 45.

Figure 45:
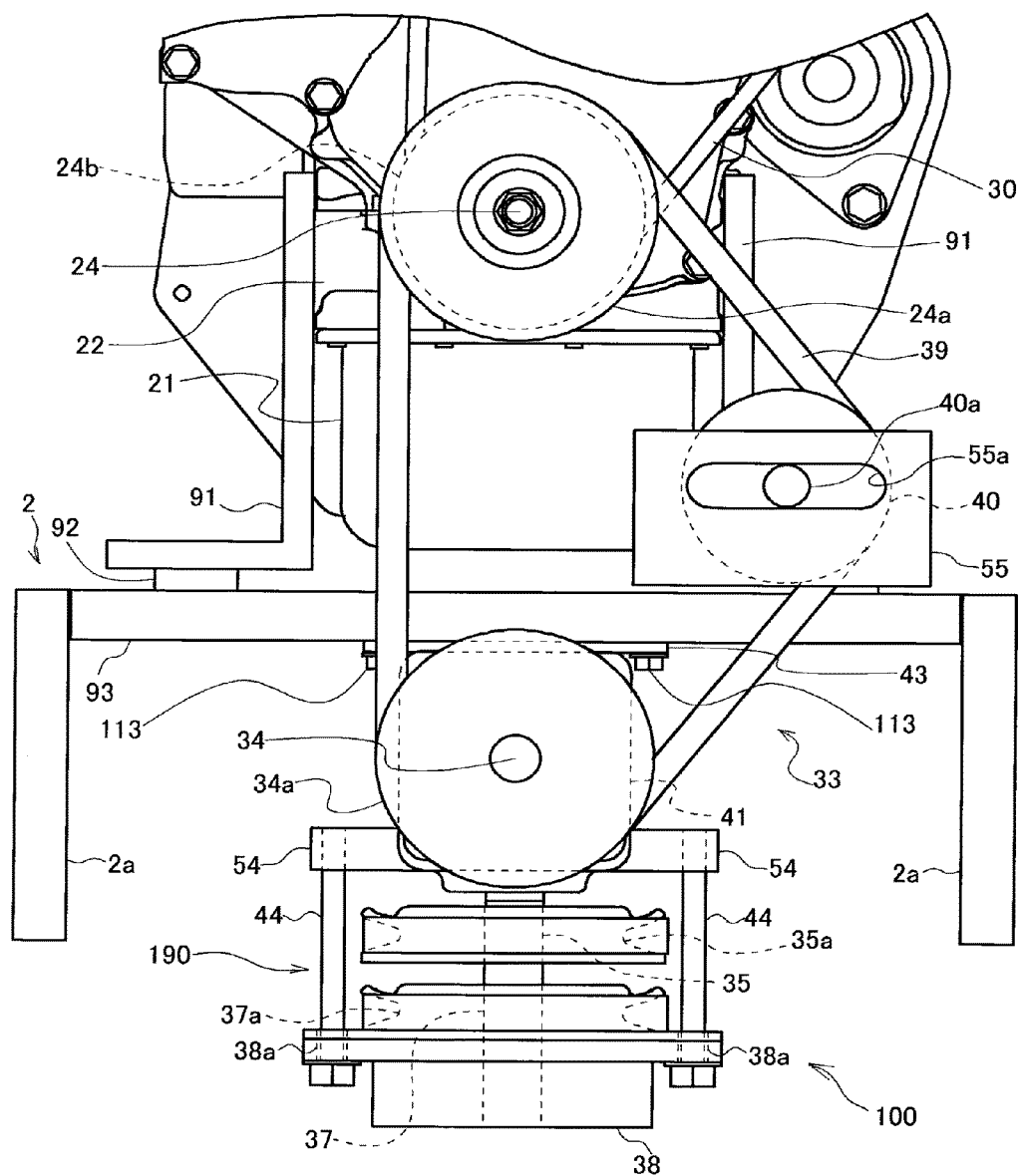
FIG. 45 is a front view showing a support structure of a power transmission device of a seventeenth embodiment of the present invention.

Referring to FIG. 45, in the seventeenth embodiment, the gearbox 41 is attached to the vehicle frame 2 with a support member 93 interposed therebetween.

The support member 93 is formed into a rectangular plate. The support member 93 laterally bridges upper ends of side plates 2a and 2a in a portion where an upper plate 2b of the vehicle frame 2 does not exist, and the support member 93 is fixed to the side plates 2a and 2a by an appropriate method.

The engine 5 is fixed to the support member 93 while engine brackets 91 and 91 and damping members 92 and 92 are interposed between the engine 5 and the support member 93.

The gearbox 41 is attached to the lower surface of the upper plate 2b by bolts 113.

Thus, the gearbox 41 of the seventeenth embodiment is attached to the vehicle frame 2 of the work vehicle 1 with the support member 93 interposed therebetween.

Therefore, in a case where the gearbox 41 cannot directly be attached to the vehicle frame 2 (for example, in a case where there is a need to attach the gearbox 41 to the portion where the upper plate 2b of the vehicle frame 2 does not exist), the gearbox 41 can be attached to the work vehicle 1 with the support member 93 interposed therebetween. The power transmission device 100 can more strongly attached to the work vehicle 1 by indirectly attaching the power transmission device 100 to the vehicle frame 2 having the high rigidity.

A power transmission device 100 according to an eighteenth embodiment of the present invention will be described with reference to FIG. 46.

Figure 46:
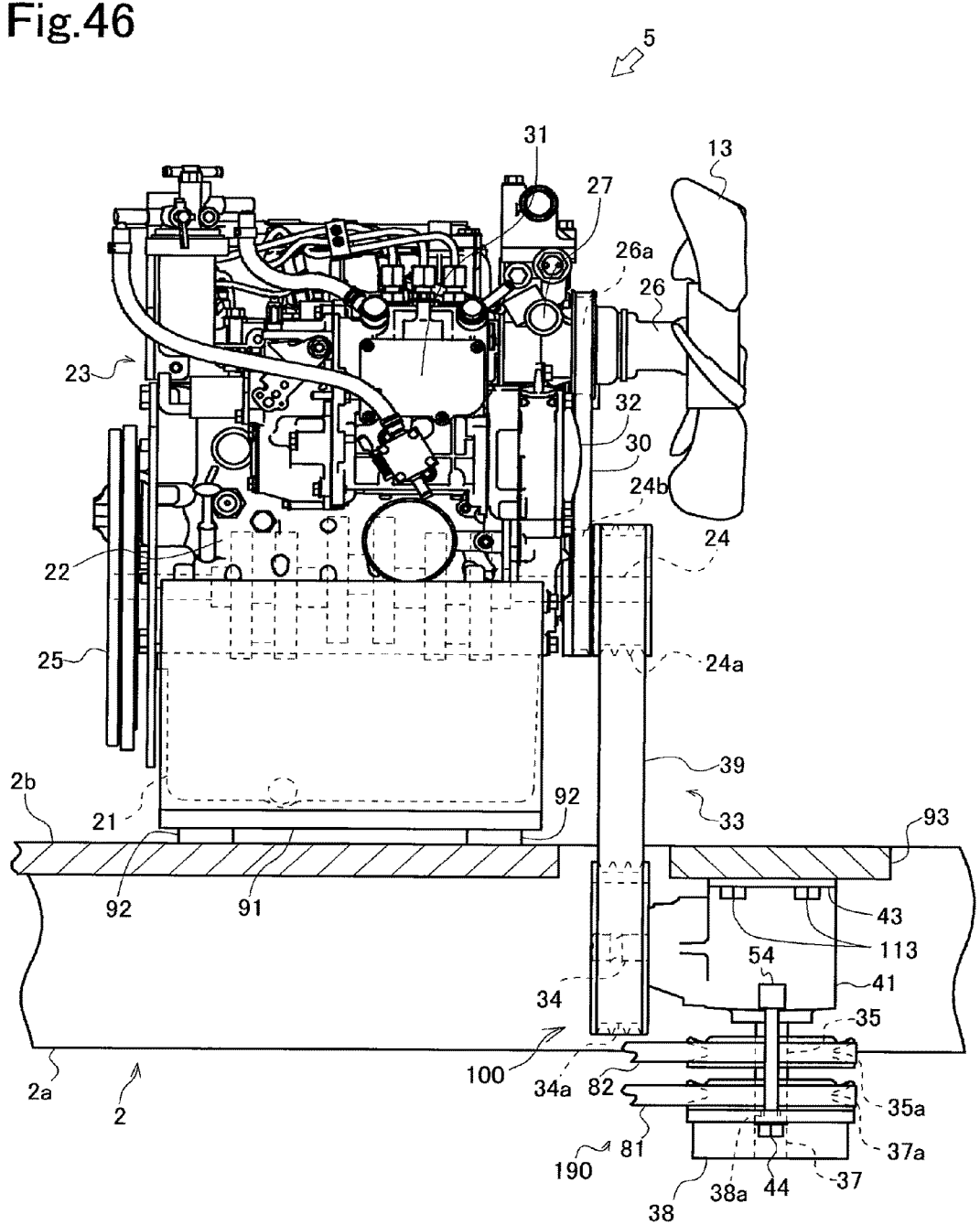
FIG. 46 is a side view showing a support structure of a power transmission device of an eighteenth embodiment of the present invention.

As shown in FIG. 46, in a case where the gearbox 41 cannot be disposed below the engine 5 (upper plate 2b of the vehicle frame 2) (for example, in a case where another device is disposed below the upper plate 2b), the gearbox 41 can be attached to the vehicle frame 2 with the support member 93 interposed therebetween by disposing the support member 93 in front of the upper plated 2b. At this point, the engine 5 is supported by the upper plate 2b, and the gearbox 41 is supported by the support member 93.

A power transmission device 100 according to a nineteenth embodiment of the present invention will be described with reference to FIG. 47.

Figure 47:
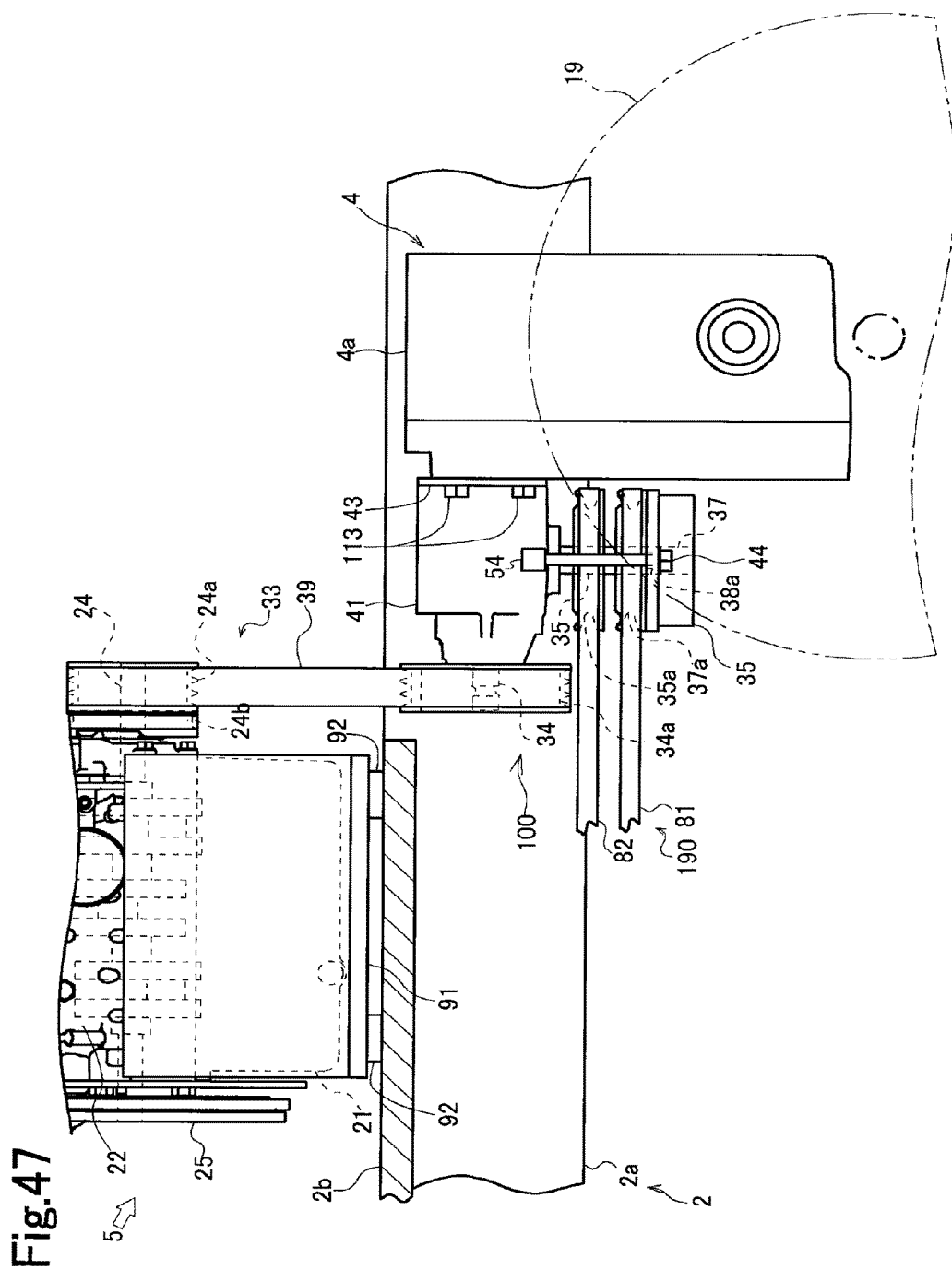
FIG. 47 is an enlarged side view showing a support structure of a power transmission device of a nineteenth embodiment of the present invention.
Figure 48:
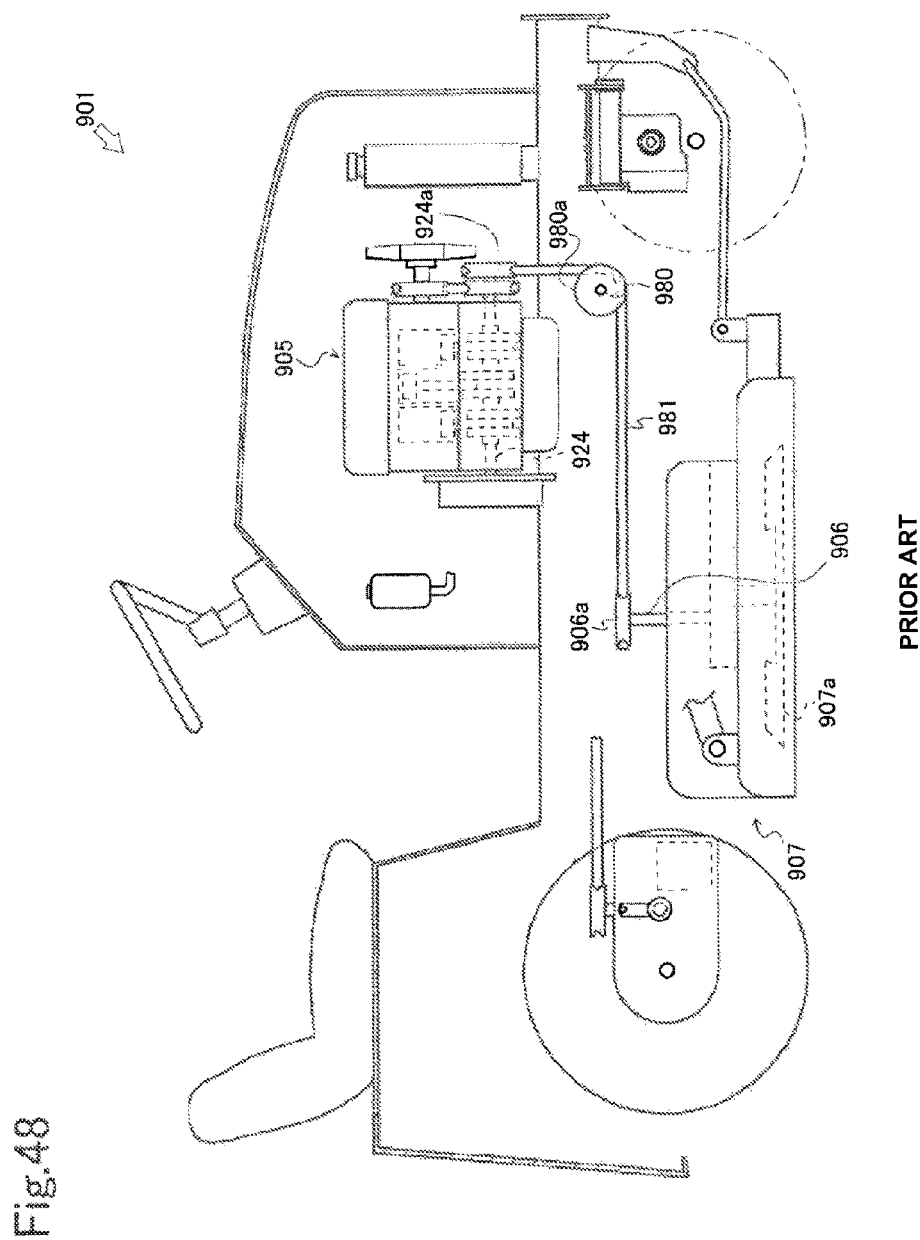
FIG. 48 is a side view showing a work vehicle provided with a conventional engine.

As shown in FIG. 47, in the nineteenth embodiment, the gearbox 41 is attached to the front axle support case 4a.

The attaching portion 43 is provided in the front portion of the gearbox 41. The front face of the attaching portion 43 and the rear face of the front axle support case 4a abut on each other, and the bolts 113 are screwed from behind the attaching portion, which allows the gearbox 41 to be attached to the front axle support case 4a. In a case where the front portion of the gearbox 41 is attached to the front axle support case 4a, the drive shaft 34 can be projected from the rear portion of the gearbox 41 as shown in FIG. 47.

The method for attaching the gearbox 41 to the front axle support case 4a is not limited to the method of the nineteenth embodiment, but any method may be adopted as long as the gearbox 41 can be attached to the front axle support case 4a. In the nineteenth embodiment, the front face of the gearbox 41 and the rear face of the front axle support case 4a are attached to each other. However, invention is not limited thereto, but the attaching position can appropriately be determined based on the shapes of the gearbox 41 and front axle support case 4a and the positional relationship between the gearbox 41 and front axle support case 4a. For example, the lower surface of the gearbox 41 and the upper surface of the front axle support case 4a may be attached to each other.

Thus, the gearbox 41 of the nineteenth embodiment is attached to the front axle support case 4a of the work vehicle 1.

Therefore, the gearbox 41 can be attached to the work vehicle 1 with a simple configuration by utilizing the front axle support case 4a. The power transmission device 100 can more strongly be attached to the work vehicle 1 by attaching the power transmission device 100 to the front axle support case 4a having the high rigidity.

What is claimed is:

1. An engine comprising:
a crankshaft which is disposed in a substantially horizontal direction;
first power transmission means;
an input shaft which is disposed below the crankshaft in parallel with the crankshaft, the input shaft receiving a power from the crankshaft through the first power transmission means;
a first output shaft which is disposed vertically so as to be perpendicular to the crankshaft to supply the power from the input shaft;
second power transmission means for transmitting the power of the input shaft to the first output shaft; and
a power transmission case which accommodates the input shaft, the first output shaft, and the second power transmission means therein.

2. The engine according to claim 1, wherein the vertical first output shaft is entirely disposed within a range onto which the engine is projected in a planar view.

3. The engine according to claim 1, comprising an oil pan which is located in a lower portion of the engine, wherein the power transmission case is attached to the oil pan.

4. The engine according to claim 3, wherein a notch is formed in a lower portion of the oil pan, and the power transmission case is disposed in the notch.

5. The engine according to claim 1, comprising an oil pan which is located in a lower portion of the engine, wherein the power transmission case is attached to a cylinder block of the engine while fastened along with the oil pan.

6. The engine according to claim 1, comprising an oil pan which is located in a lower portion of the engine, wherein the oil pan and the power transmission case are integrally molded.

7. The engine according to claim 1, wherein a first output member is provided on the first output shaft,
a second output shaft is coaxially connected to the first output shaft, the second output shaft receiving the power of the first output shaft, and
a second output member is provided on the second output shaft.

8. The engine according to claim 7, wherein a clutch is interposed in at least one of a gap between the first output member and the first output shaft and a gap between the second output member and the second output shaft.

9. The engine according to claim 8, wherein the clutch can be attached to the power transmission case.

10. The engine according to claim 1, wherein the first power transmission means is formed by an endless belt mechanism.

11. The engine according to claim 10, comprising a tension member which imparts a tension to an endless belt of the endless belt mechanism.

12. The engine according to claim 1, wherein a power taking-out PTO shaft is provided coaxially to at least one of the crankshaft and the input shaft.

13. The engine according to claim 1, wherein the input shaft includes a cooling fan.

14. The engine according to claim 1, further comprising:
a cooling fan which is disposed above the crankshaft to cool the engine, the cooling fan being located on one of sides of the engine; and
a first endless belt mechanism which is disposed on one of sides of the engine to transmit a power of the crankshaft to the cooling fan,
wherein the first power transmission means is a second endless belt mechanism which is disposed on one of sides of the engine outside of the first endless belt mechanism.

15. The engine according to claim 1, further comprising:
a cooling fan which is disposed above the crankshaft to cool the engine, the cooling fan being located on one of sides of the engine; and
a first endless belt mechanism which is disposed on one of sides of the engine to transmit a power of the crankshaft to the cooling fan;
wherein the first power transmission means is a second endless belt mechanism which is disposed on one of sides of the engine outside of the first endless belt mechanism.

16. The engine according to claim 1, further comprising:
a flywheel which is disposed on one of sides of the engine,
wherein the power transmission means is an endless belt mechanism which is disposed on one of sides of the engine outside of the flywheel.

17. The engine according to claim 1, further comprising:
a flywheel which is disposed on one of sides of the engine,
wherein the power transmission means is an endless belt mechanism which is disposed on one of sides of the engine outside of the flywheel.

18. The engine according to claim 14, wherein the first output shaft is disposed within a range onto which the engine is projected in a planar view.

19. The engine according to claim 14, wherein a first output member is provided on the first output shaft,
a second output shaft is coaxially connected to the first output shaft, the second output shaft receiving the power of the first output shaft, and
a second output member is provided on the second output shaft.

20. The engine according to claim 19, wherein a clutch is interposed in at least one of a gap between the first output member and the first output shaft and a gap between the second output member and the second output shaft.

21. The engine according to claim 14, comprising a tension member which imparts a tension to an endless belt of the endless belt mechanism.

22. The engine according to claim 14, wherein the input shaft includes the cooling fan.

23. The engine according to claim 1, further comprising:
a bracket interposed between a cylinder block of the engine and the power transmission case,
wherein the power transmission case is attached to a cylinder block of the engine with the bracket.

24. The engine according to claim 23, wherein the power transmission case and the bracket are integrally molded.

25. The engine according to claim 23, comprising a clutch which connects and disconnects the power from the output shaft, wherein the clutch can be attached to the bracket.

26. The engine according to claim 1, further comprising:
a flywheel which is disposed on one of sides of the engine; and
a bracket interposed between the power transmission case and the flywheel,
wherein the power transmission case is attached onto the flywheel side of the engine with the bracket.

27. The engine according to claim 26, wherein a starter motor for starting the engine is attached to the bracket.

28. The engine according to claim 26, comprising a clutch which connects and disconnects the power from the output shaft, wherein the clutch can be attached to the power transmission case.

29. The engine according to claim 26, comprising a clutch which connects and disconnects the power from the output shaft, wherein the clutch can be attached to the bracket.

30. The engine according to claim 26, wherein the power transmission case is eccentrically disposed in the horizontal direction with respect to the crankshaft.

* * * * *